United States Patent
Harper et al.

(10) Patent No.: US 10,877,660 B2
(45) Date of Patent: Dec. 29, 2020

(54) DEVICES AND METHODS FOR PROCESSING INPUTS USING GESTURE RECOGNIZERS

(71) Applicant: Apple Inc., Cupertino, CA (US)

(72) Inventors: John S. Harper, London (GB); Jacob A. Xiao, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/427,203

(22) Filed: May 30, 2019

(65) Prior Publication Data

US 2019/0369864 A1  Dec. 5, 2019

Related U.S. Application Data

(60) Provisional application No. 62/679,970, filed on Jun. 3, 2018.

(51) Int. Cl.
*G06F 3/0488* (2013.01)

(52) U.S. Cl.
CPC ............ *G06F 3/04883* (2013.01); *G06F 2203/04808* (2013.01)

(58) Field of Classification Search
CPC ............ G06F 3/04883; G06F 2203/04808
See application file for complete search history.

(56) References Cited

U.S. PATENT DOCUMENTS

| | | | | |
|---|---|---|---|---|
| 2011/0179387 A1* | 7/2011 | Shaffer | ............... | G06F 3/04883 715/835 |
| 2012/0056818 A1 | 3/2012 | Shafi et al. | | |
| 2012/0133579 A1* | 5/2012 | Prieur | .................... | G06F 3/017 345/156 |
| 2012/0280918 A1 | 11/2012 | Stewart et al. | | |
| 2013/0212541 A1* | 8/2013 | Dolenc | ................... | G06F 3/017 715/863 |
| 2014/0361982 A1 | 12/2014 | Shaffer et al. | | |
| 2017/0046038 A1 | 2/2017 | Hajas et al. | | |

FOREIGN PATENT DOCUMENTS

WO   WO-2011151501 A1 * 12/2011 ............. G06F 3/017

OTHER PUBLICATIONS

International Search Report and Written Opinion, dated Sep. 16, 2019, received in International Publication No. PCT/US2019/034839, which corresponds with U.S. Appl. No. 16/427,203, 17 pages.

* cited by examiner

*Primary Examiner* — Michael Pervan
(74) *Attorney, Agent, or Firm* — Morgan, Lewis & Bockius LLP

(57) ABSTRACT

An electronic device detects an input via an input device. In response to detecting the input, the device monitors the input using a gesture recognizer. The gesture recognizer includes a plurality of component gesture recognizers that define requirements for recognition of a gesture. A first component gesture recognizer from the plurality of component gesture recognizers defines a first requirement for recognition of the gesture, and a second component gesture recognizer from the plurality of component gesture recognizers defines a second requirement for recognition of the gesture. In accordance with a determination that the input satisfies first gesture recognition criteria that include the first requirement of the first component gesture recognizer and the second requirement of the second component gesture recognizer, the device recognizes a first gesture using the gesture recognizer.

48 Claims, 39 Drawing Sheets

710 The first component gesture recognizer has a current state of a plurality of available states; and
   the second component gesture recognizer has a current state of the plurality of available states 712 Determine a current state of the gesture recognizer based on the current state of the first component gesture recognizer and the current state of the second component gesture recognizer 714 Monitoring the input using the gesture recognizer includes:
   receiving, at the gesture recognizer, first information that describes the input at a first point in time;
   processing the first information using the first component gesture recognizer to determine a current state of the first component gesture recognizer, of the plurality of available states, for the first point in time;
   processing the first information using the second component gesture recognizer to determine a current state of the second component gesture recognizer, of the plurality of available states, for the first point in time;
   receiving, at the gesture recognizer, second information that describes a change in the input at a second point in time later than the first point in time;
   processing the second information using the first component gesture recognizer to determine a current state of the first component gesture recognizer, of the plurality of available states, for the second point in time; and
   processing the second information using the second component gesture recognizer to determine a current state of the second component gesture recognizer, of the plurality of available states, for the second point in time 716 One or more component gesture recognizers in the gesture recognizer include one or more parameters that describe the input; and monitoring the input using the gesture recognizer includes determining values of the one or more parameters using the one or more component gesture recognizers in the gesture recognizer

Figure 7B

718 The gesture recognizer is a gesture recognition tree having a plurality of nodes, where each node of the gesture recognition tree includes a respective component gesture recognizer, and where monitoring the input using the gesture recognizer includes:
    conveying information that describes the input at a respective point in time from component gesture recognizers at respective nodes having child nodes in the gesture recognition tree to component gesture recognizers at the child nodes in the gesture recognition tree; and
    determining states of component gesture recognizers at respective nodes in the gesture recognition tree based on the information that describes the input at the respective point in time and, in accordance with a determination that a respective node has one or more child nodes, based on respective states of respective component gesture recognizers at the one or more child nodes determined based on the information that describes the input at the respective point in time > 720 Monitoring the input using the gesture recognizer further includes:
>     conveying the determined states of the component gesture recognizers at child nodes in the gesture recognition tree to component gesture recognizers at parent nodes of the child nodes in the gesture recognition tree;
>     where determining whether the input satisfies the first gesture recognition criteria for recognizing the first gesture includes determining a state of the gesture recognition tree based on the determined states of the component gesture recognizers in the gesture recognition tree > 722 Monitoring the input using the gesture recognizer includes:
>     determining values of one or more component gesture recognizers at respective nodes in the gesture recognition tree based on the information that describes the input at the respective point in time;
>     where determining a state of a respective component gesture recognizer at a respective node is further based on a determined value of a component gesture recognizer at a child node of the respective node, in accordance with a determination that the component gesture recognizer at the child node has a determined value 724 The plurality of component gesture recognizers in the gesture recognizer are selected from a plurality of available component gesture recognizers that include:
    combiners that combine information from two or more component gesture recognizers and define requirements for recognition of a gesture based on relationships between the component gesture recognizers combined using the combiners; and
    input parameter recognizers that determine values of parameters that describe the input and/or define threshold requirements for parameters that describe the input

Figure 7C

726 The gesture recognizer is associated with an application, and the plurality of component gesture recognizers in the gesture recognizer are instances of respective component gesture recognizers in a plurality of available component gesture recognizers provided by an application-independent module 728 The gesture recognizer includes a third component gesture recognizer that defines a third requirement for recognition of a gesture based on a relationship between the first component gesture recognizer and the second component gesture recognizer;
 monitoring the input using the gesture recognizer includes monitoring the state of the first component gesture recognizer and the state of the second component gesture recognizer using the third component gesture recognizer to determine whether the first component gesture recognizer and the second component gesture recognizer satisfy the third requirement; and
 the first gesture recognition criteria include the third requirement that is based on the predefined relationship between the first component gesture recognizer and the second component gesture recognizer 730 The third component gesture recognizer is an exclusive combiner, and the third requirement specifies that the first component gesture recognizer must fail in order for the second component gesture recognizer to succeed 732 The third component gesture recognizer is a simultaneous combiner, and the third requirement requires, at a respective point in time, success of at least one of the first component gesture and the second component gesture recognizer in order for the third component gesture recognizer to succeed 734 The third component gesture recognizer is a sequential combiner, and the third requirement requires, in order for the third component gesture recognizer to succeed, success of the first component gesture recognizer and, after the first component gesture recognizer succeeds, success of the second component gesture recognizer 736 The first requirement of the first component gesture recognizer requires that values of a parameter that describes the input satisfy a specified threshold

Figure 7D

738 The gesture recognizer is a tap gesture recognizer, where:
    the first component gesture recognizer is a distance component gesture recognizer that stores an initial location of the input corresponding to a point in time when the input was first detected and receives a current location of the input at a respective point in time, where the first requirement defined by the first component gesture recognizer requires that a distance between the initial location of the input and the current location of the input be within a threshold distance; and
    the second component gesture recognizer is a duration component gesture recognizer that stores an initial timestamp corresponding to the point in time when the input was first detected and receives a current timestamp corresponding to the respective point in time, where the second requirement defined by the second component gesture recognizer requires that an amount of time between the initial timestamp and the current timestamp be within a threshold amount of time;
    where the tap gesture recognizer further includes:
        a location component gesture recognizer that determines that the input has a current location at the respective point in time;
        a first gating combiner that requires success of the second component gesture recognizer and success of the location component gesture recognizer in order to succeed; and
        a second gating combiner that requires success of the first gating combiner and success of the first component gesture recognizer in order to succeed

Figure 7E

816 The gesture recognition hierarchy includes a component gesture recognizer that defines the second relationship between the first gesture recognizer and the second gesture recognizer by requiring that the first gesture recognizer fail in order for the second gesture recognizer to succeed 818 The gesture recognition hierarchy includes a component gesture recognizer that defines the second relationship between the first gesture recognizer and the second gesture recognizer in the gesture recognition hierarchy, and processing the input using the gesture recognition hierarchy includes:
   receiving, at the gesture recognition hierarchy, information that describes the input;
   conveying the information that describes the input to the component gesture recognizer;
   conveying the information that describes the input from the component gesture recognizer to at least one of the first gesture recognizer and the second gesture recognizer based on the second relationship between the first gesture recognizer and the second gesture recognizer;
   in accordance with a determination that the information that describes the input is conveyed to the first gesture recognizer, processing the information that describes the input using the first gesture recognizer; and
   in accordance with a determination that the information that describes the input is conveyed to the second gesture recognizer, processing the information that describes the input using the second gesture recognizer 820 Processing the information that describes the input using the first gesture recognizer determines a current state of the first gesture recognizer, processing the information that describes the input using the second gesture recognizer determines a current state of the second gesture recognizer, and the method includes:
   conveying the current state of the first gesture recognizer from the first gesture recognizer to the component gesture recognizer;
   conveying the current state of the second gesture recognizer from the second gesture recognizer to the component gesture recognizer;
   processing, using the component gesture recognizer, the information that describes the input, the current state of the first gesture recognizer, and the current state of the second gesture recognizer, to determine a current state of the component gesture recognizer

Figure 8B

822 The first view includes a third gesture recognizer;
 the gesture recognition hierarchy includes the third gesture recognizer and a component gesture recognizer that defines a third relationship between the first gesture recognizer and the third gesture recognizer in the gesture recognition hierarchy; and
 the method includes determining a gesture recognition state of the first view, including:
  conveying information that describes the input to the component gesture recognizer, the first gesture recognizer, and the third gesture recognizer;
  processing the information that describes the input using the first gesture recognizer to determine a current state of the first gesture recognizer, and conveying the current state of the first gesture recognizer from the first gesture recognizer to the component gesture recognizer;
  processing the information that describes the input using the third gesture recognizer to determine a current state of the third gesture recognizer, and conveying the current state of the third gesture recognizer from the third gesture recognizer to the component gesture recognizer;
  processing, using the component gesture recognizer, the information that describes the input, the current state of the first gesture recognizer, and the current state of the third gesture recognizer, to determine the gesture recognition state of the first view

Figure 8C

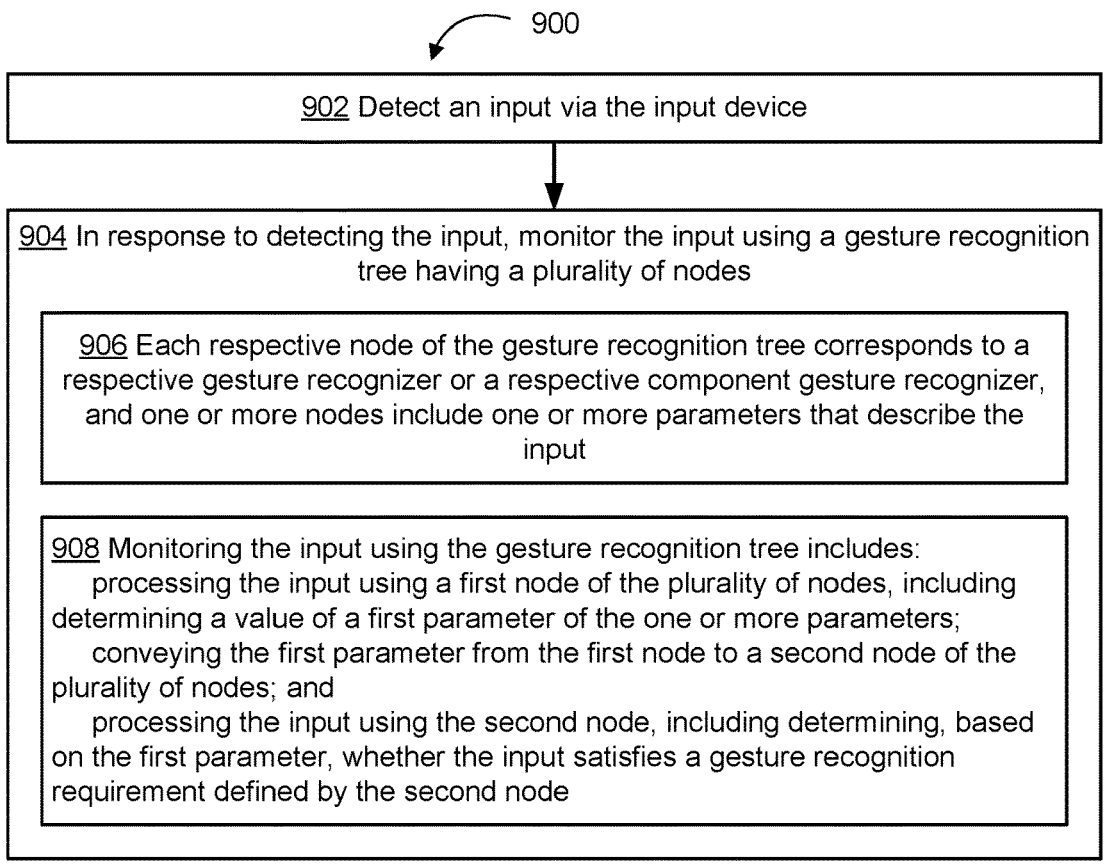

900

902 Detect an input via the input device

904 In response to detecting the input, monitor the input using a gesture recognition tree having a plurality of nodes 906 Each respective node of the gesture recognition tree corresponds to a respective gesture recognizer or a respective component gesture recognizer, and one or more nodes include one or more parameters that describe the input 908 Monitoring the input using the gesture recognition tree includes:
　　processing the input using a first node of the plurality of nodes, including determining a value of a first parameter of the one or more parameters;
　　conveying the first parameter from the first node to a second node of the plurality of nodes; and
　　processing the input using the second node, including determining, based on the first parameter, whether the input satisfies a gesture recognition requirement defined by the second node 910 The one or more parameters that describe the input include one or more of: a location at which the input was initially detected, a current location of the input, a distance traveled by the input, a velocity of the input, a contact intensity, an initial timestamp corresponding to a time at which the input was first detected, and a current timestamp 912 The first parameter is a location of the input;
　　the gesture recognition requirement defined by the second node requires that a distance between an initial location of the input and a current location of the input satisfy a threshold distance;
　　processing the input using the first node includes determining, using the first node, the current location of the input; and
　　processing the input using the second node includes determining, using the second node, whether the distance between the initial location of the input and the current location of the input conveyed from the first node satisfies the threshold distance

Figure 9A

914 The first parameter is a timestamp corresponding to a respective point in time at which the input is detected;
  the gesture recognition requirement defined by the second node requires that an amount of time between an initial timestamp corresponding to a first point in time at which the input was first detected and a current timestamp corresponding to a second point in time at which the input is detected satisfy a threshold amount of time;
  processing the input using the first node includes determining, using the first node, the current timestamp corresponding to the second point in time at which the input is detected; and
  processing the input using the second node includes determining, using the second node, whether the amount of time between the initial timestamp of the input and the current timestamp of the input conveyed from the first node satisfies the threshold amount of time 916 Process the input using one or more of the plurality of nodes in the gesture recognition tree to determine values of the one or more parameters without regard to whether a gesture has been recognized by the gesture recognition tree 918 In response to detecting the input, receive, at the gesture recognition tree, first information that describes the input, where the value of the first parameter is determined from the first information, and where determining whether the input satisfies the gesture recognition requirement defined by the second node includes comparing the value of the first parameter to a prior value determined from second information received at the gesture recognition tree prior to receiving the first information

Figure 9B

DEVICES AND METHODS FOR PROCESSING INPUTS USING GESTURE RECOGNIZERS

RELATED APPLICATIONS

This application claims priority to U.S. Provisional Patent Application No. 62/679,970, filed Jun. 3, 2018, which is hereby incorporated by reference in its entirety.

TECHNICAL FIELD

This relates generally to electronic devices with input devices such as touch-sensitive surfaces, including but not limited to electronic devices that use gesture recognition techniques to process inputs.

BACKGROUND

Input devices such as touch-sensitive surfaces are widely used to provide input to electronic devices to manipulate user interfaces and objects therein on a display. But conventional methods for performing these manipulations are cumbersome, inefficient, and limited. In some cases, conventional methods of processing inputs are limited in functionality with respect to the complexity and number of inputs that can be recognized. In some cases, conventional methods of processing inputs impose increased computational load on the electronic device as the complexity and number of inputs that must be recognized increases. In addition, conventional methods take longer than necessary, thereby wasting energy. This latter consideration is particularly important in battery-operated devices.

SUMMARY

Accordingly, there is a need for electronic devices with improved methods and interfaces for processing inputs and recognizing gestures. Such methods and interfaces optionally complement or replace conventional methods for processing inputs and recognizing gestures. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with an input device. The method includes detecting an input via the input device, and, in response to detecting the input, monitoring the input using a gesture recognizer. The gesture recognizer includes a plurality of component gesture recognizers that define requirements for recognition of a gesture. A first component gesture recognizer from the plurality of component gesture recognizers defines a first requirement for recognition of the gesture, and a second component gesture recognizer from the plurality of component gesture recognizers defines a second requirement for recognition of the gesture. The method includes, in accordance with a determination that the input satisfies first gesture recognition criteria that include the first requirement of the first component gesture recognizer and the second requirement of the second component gesture recognizer, recognizing a first gesture using the gesture recognizer.

In accordance with some embodiments, a method is performed at an electronic device with a display and an input device. The method includes displaying, on the display, a user interface of an application. The user interface includes a plurality of views arranged in a view hierarchy. The view hierarchy defines a first relationship between a first view and a second view. The first view includes a first gesture recognizer, and the second view includes a second gesture recognizer. The method includes detecting, via the input device, an input at a first location that corresponds to the displayed user interface, and processing the input using a gesture recognition hierarchy that includes the first gesture recognizer and the second gesture recognizer. A second relationship between the first gesture recognizer and the second gesture recognizer is determined based on the first relationship between the first view and the second view in the view hierarchy.

In accordance with some embodiments, a method is performed at an electronic device with an input device. The method includes detecting an input via the input device, and, in response to detecting the input, monitoring the input using a gesture recognition tree having a plurality of nodes. Each respective node of the gesture recognition tree corresponds to a respective gesture recognizer or a respective component gesture recognizer, and one or more nodes include one or more parameters that describe the input. Monitoring the input using the gesture recognition tree includes: processing the input using a first node of the plurality of nodes, including determining a value of a first parameter of the one or more parameters; conveying the first parameter from the first node to a second node of the plurality of nodes; and processing the input using the second node, including determining, based on the first parameter, whether the input satisfies a gesture recognition requirement defined by the second node.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for processing inputs and recognizing gestures, thereby increasing the effectiveness, efficiency, and user satisfaction with such devices. Such methods and interfaces may complement or replace conventional methods for processing inputs and recognizing gestures.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7E are flow diagrams for processing inputs using gesture recognizers assembled from component gesture recognizers in accordance with some embodiments.

FIGS. 8A-8C are flow diagrams for generating gesture recognition hierarchies from view hierarchies of views in a user interface in accordance with some embodiments.

FIGS. 9A-9B are flow diagrams for processing inputs using gesture recognizers to which values of parameters that describe the inputs have been associated in accordance with some embodiments.

DESCRIPTION OF EMBODIMENTS

Many electronic devices have graphical user interface and input devices, such as touch-sensitive surfaces, for receiving inputs by a user. As the number and complexity of input gestures increases, processing inputs and recognizing such gestures becomes more difficult and imposes greater computational loads on electronic devices that use conventional gesture recognition techniques. The embodiments disclosed herein provide more efficient ways for an electronic device to process inputs and recognize gestures (e.g., using modular gesture recognizers that divide larger sets of input processing requirements into smaller subsets).

Figure 2:
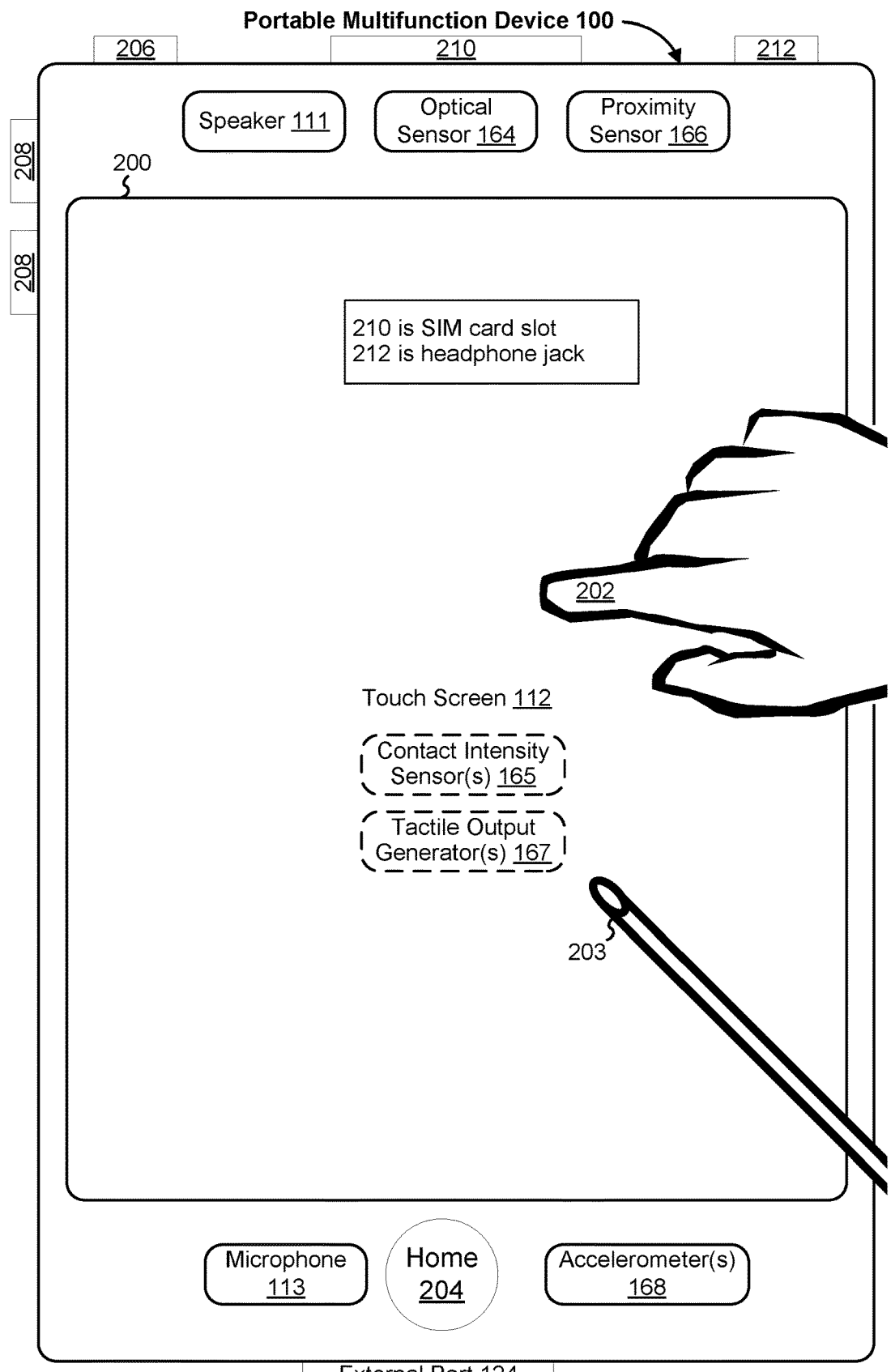
FIG. 2 illustrates a portable multifunction device having a touch screen in accordance with some embodiments.
Figure 3:
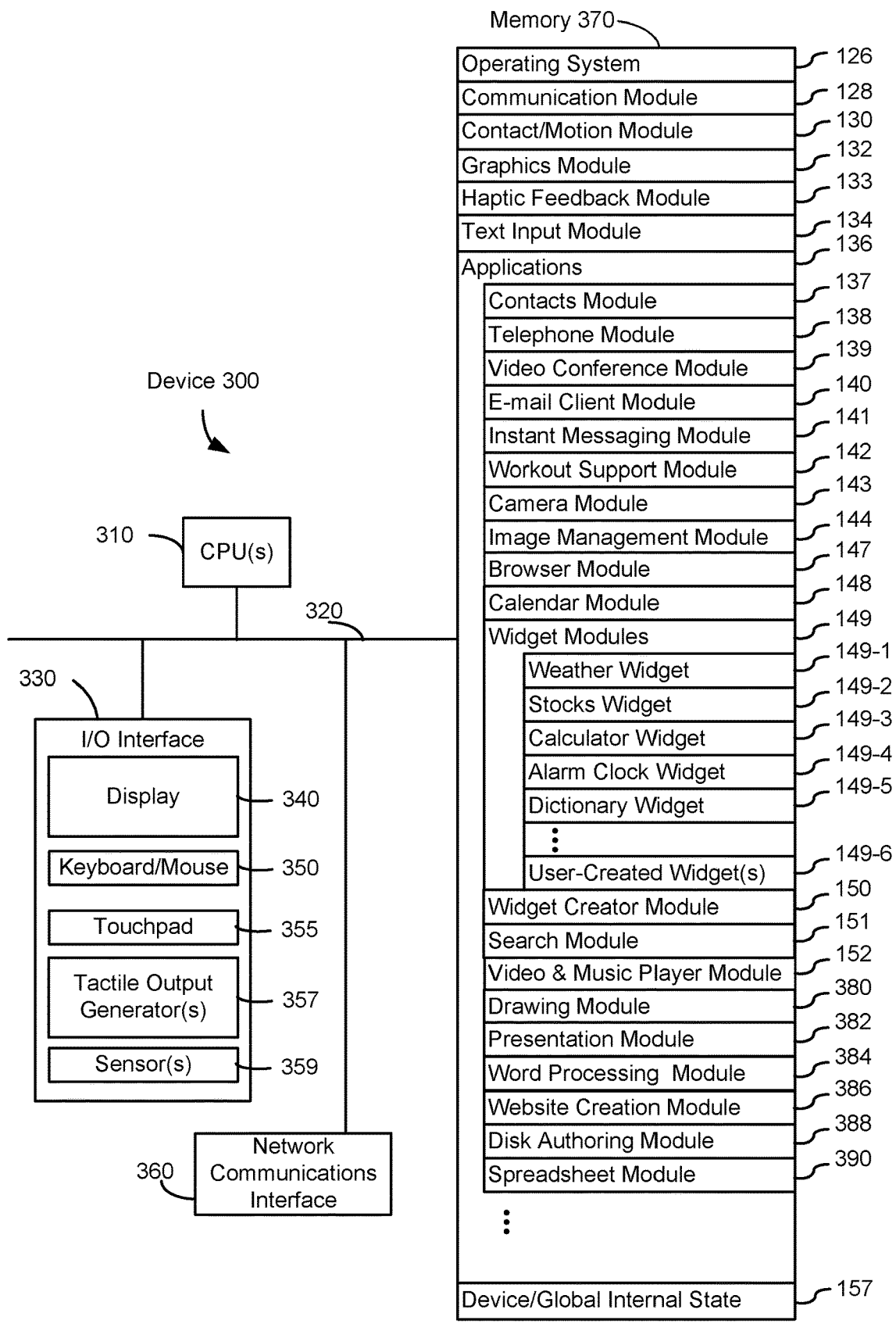
FIG. 3 is a block diagram of an example multifunction device with a display and a touch-sensitive surface in accordance with some embodiments.
Figure 4A:
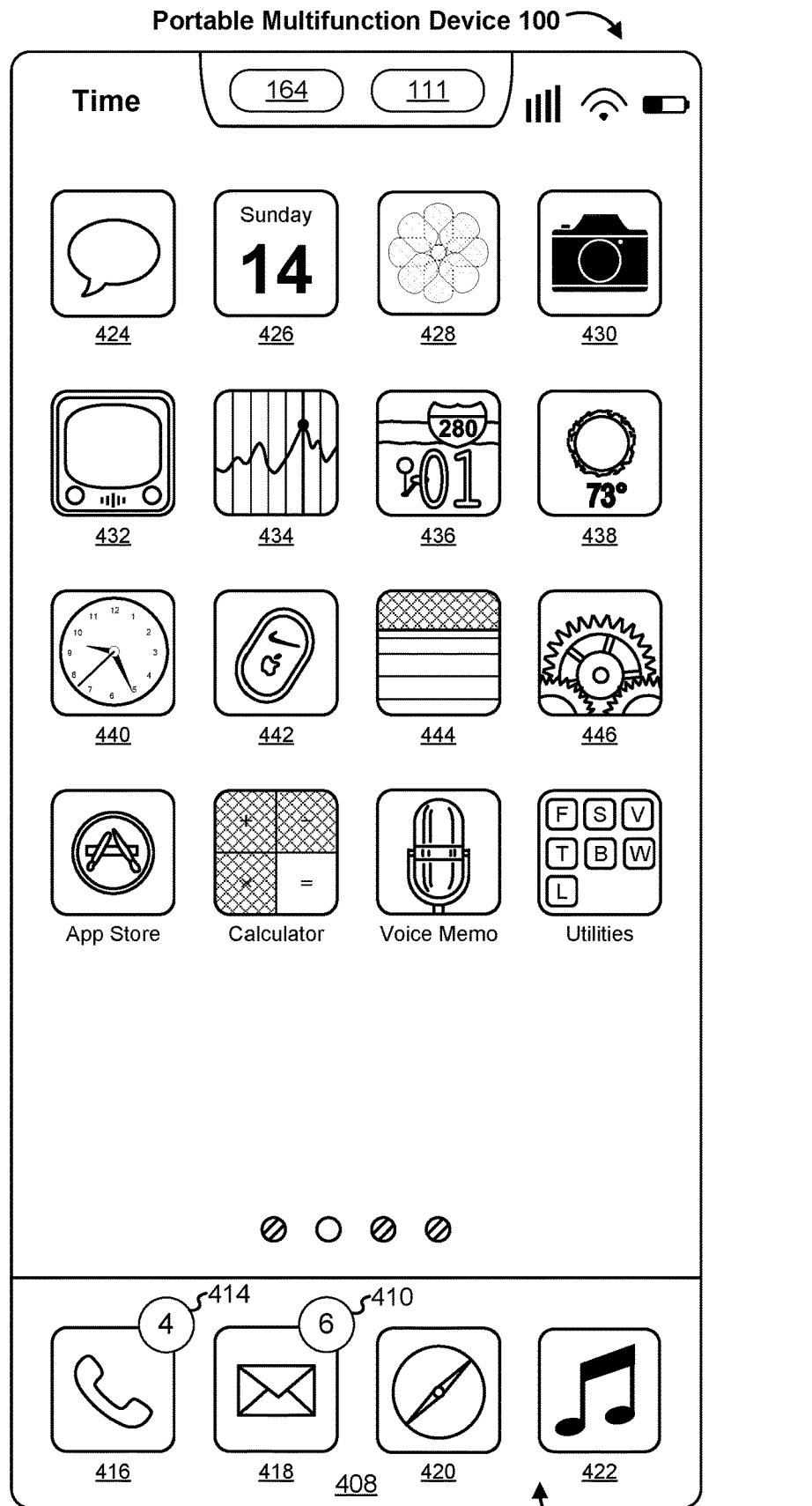
FIG. 4A illustrates an example user interface for a menu of applications on a portable multifunction device in accordance with some embodiments.
Figure 4B:
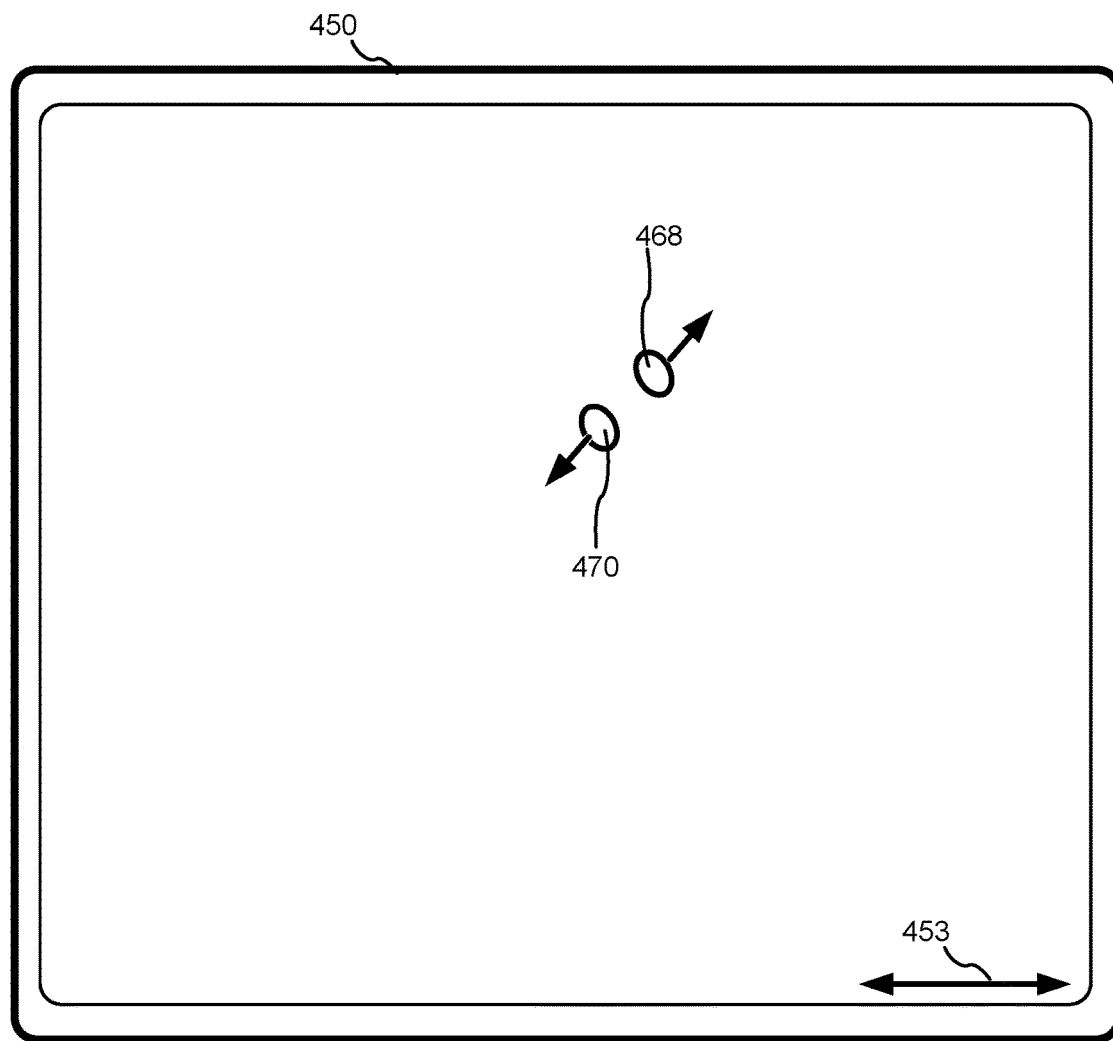
FIG. 4B illustrates an example user interface for a multifunction device with a touch-sensitive surface that is separate from the display in accordance with some embodiments.
Figure 4B:
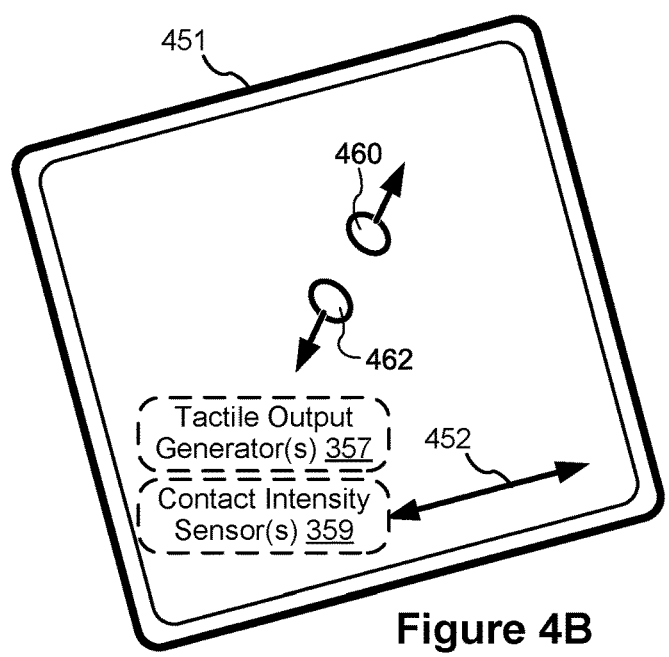
Figure 5A:
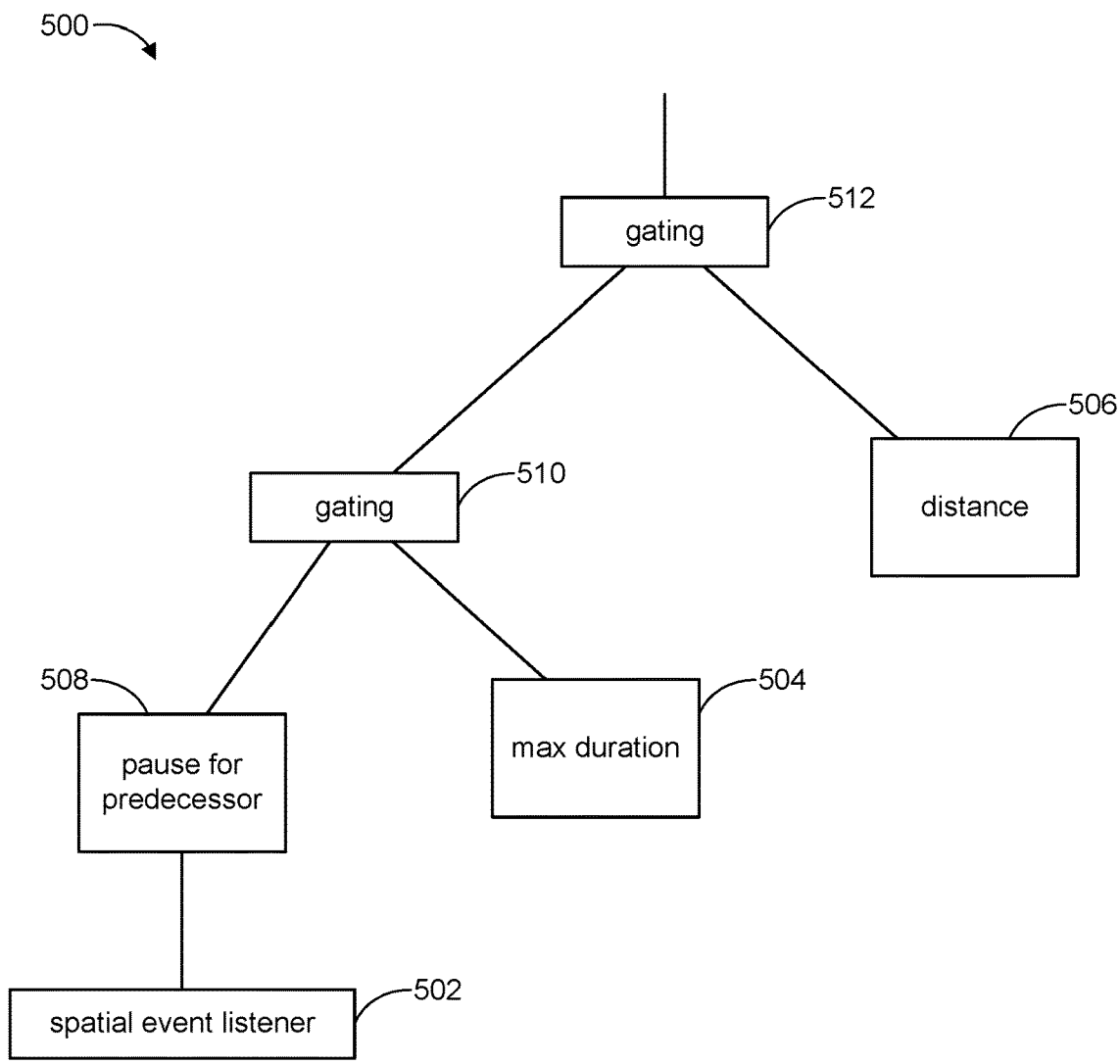
FIGS. 5A-5Q illustrate example gesture recognizers for processing inputs (such as touch inputs) and their operation in accordance with some embodiments.
Figure 8A:
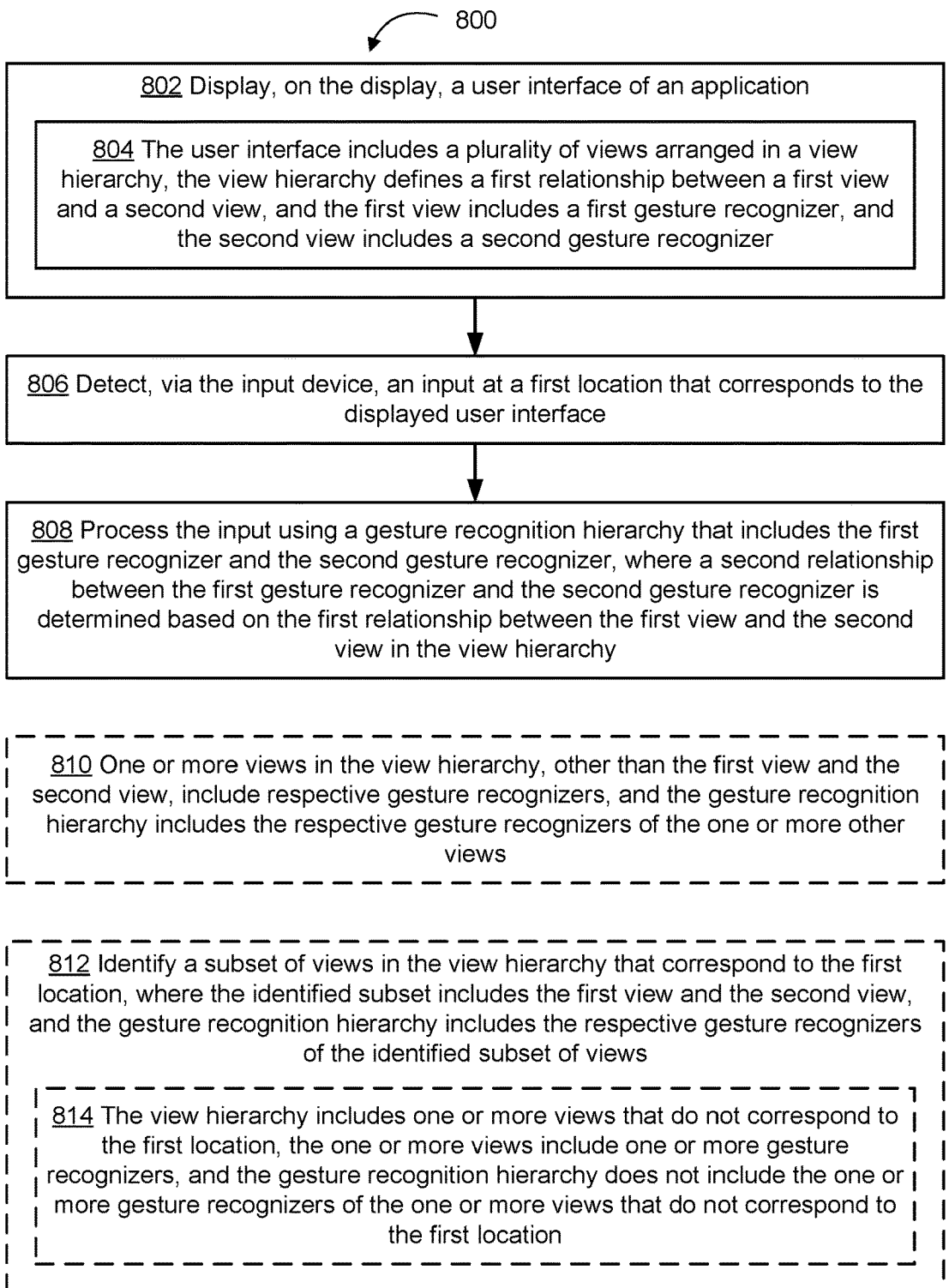

Below, FIGS. 1A-1B, 2, and 3 show example devices. FIGS. 4A-4B illustrate example user interfaces for example devices on which the embodiments disclosed herein are implemented. FIGS. 5A-5Q illustrate example gesture recognizers for processing inputs (such as touch inputs) and their operation. FIGS. 6A-6C illustrate examples of gesture recognition hierarchies generated from view hierarchies of views in a user interface. FIGS. 7A-7E illustrate a flow diagram of a method of processing inputs using gesture recognizers assembled from component gesture recognizers. FIGS. 8A-8C illustrate a flow diagram of a method of generating gesture recognition hierarchies from view hierarchies of views in a user interface. FIGS. 9A-9B illustrate a flow diagram of a method of processing inputs using gesture recognizers to which values of parameters that describe the inputs have been associated. The gesture recognizers, view hierarchies, and gesture recognition hierarchies in FIGS. 5A-5Q and 6A-6C are used to illustrate the processes in FIGS. 7A-7E, 8A-8C, and 9A-9B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
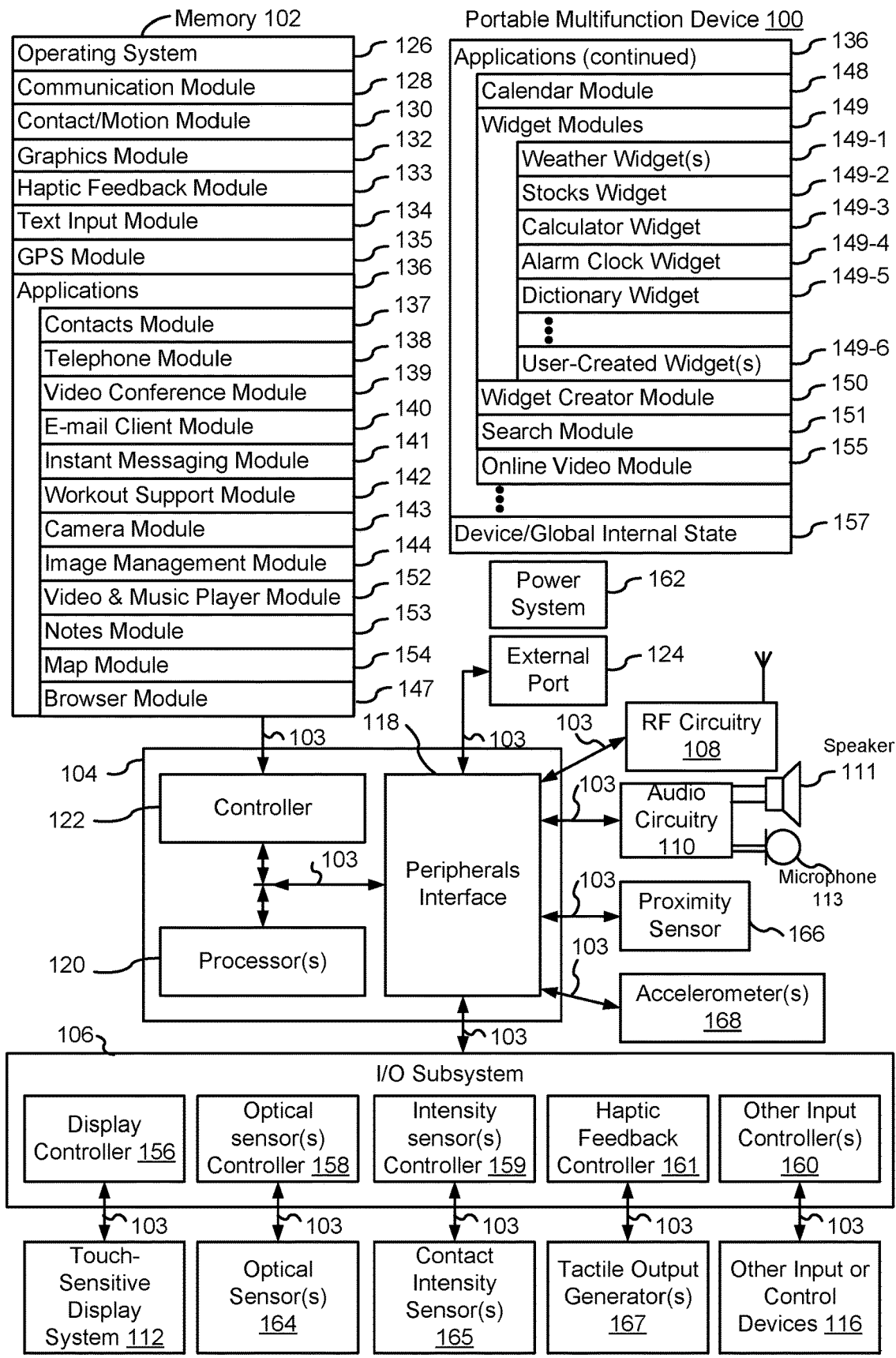
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
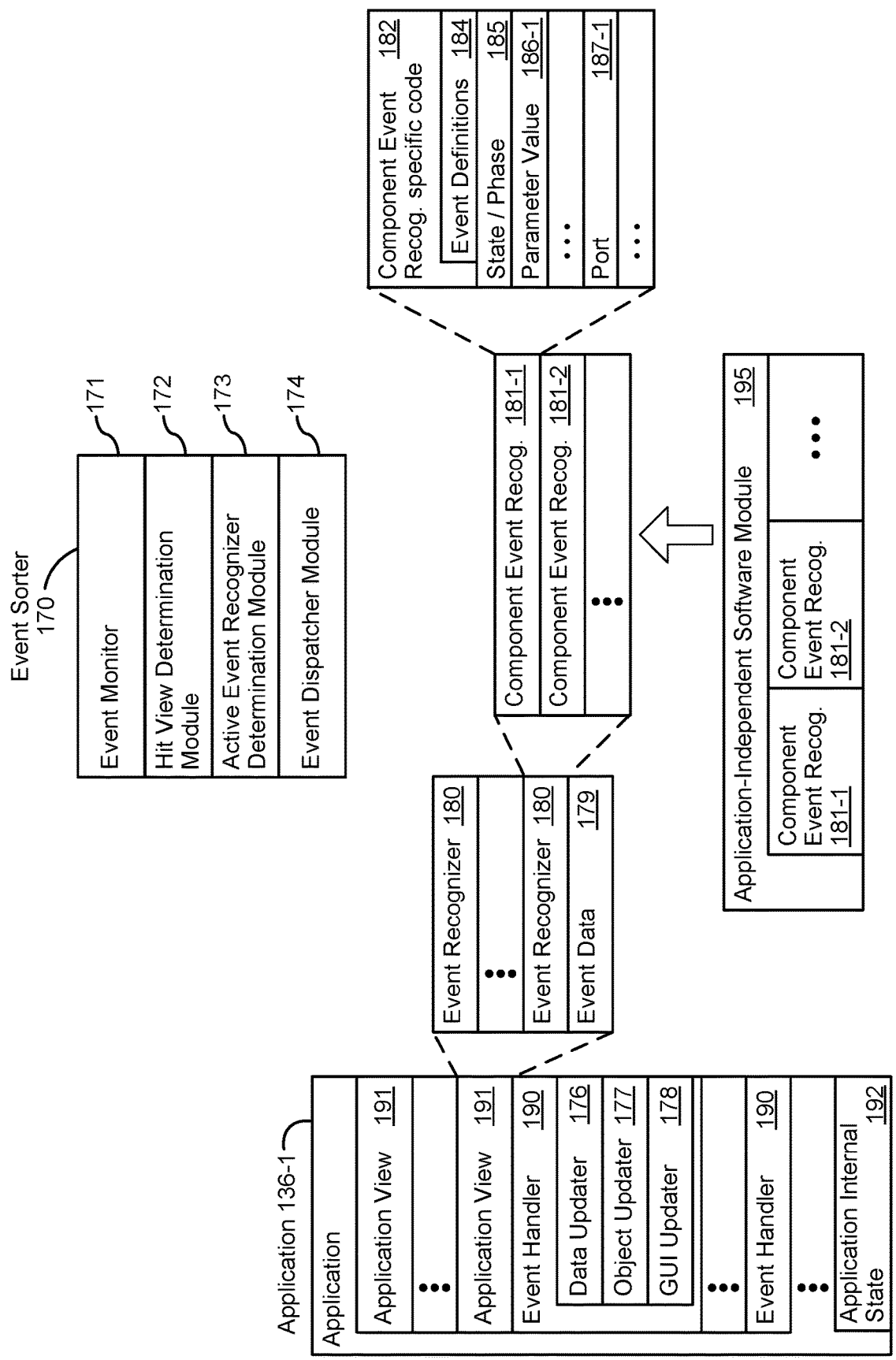
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (sometimes referred to simply as an "event" or "input event") (e.g., a user touch on touch-sensitive display system 112, as part of a multi-touch gesture, or a movement of a touch across touch-sensitive display system 112, or a press of a mouse button, etc.). Event information for an input (e.g., a touch) may include one or more of: a location, timestamp, direction, and speed of the input. Peripherals interface 118 transmits information it receives from I/O subsystem 106 (e.g., from touch-sensitive display system 112, one or more sensor(s) 164, 165, and/or one or more input devices 350, 355) or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

While a view is often thought of as being a window or other portion of a user interface, more technically a view is the portion of an application that manages a particular area or region of the application's user interface. A view is typically implemented as an instance of a particular class, or one of its subclasses, and manages a rectangular area in an application window. Thus, a view is an object having an associated display region or user interface portion, and also one or more computer programs, sometimes called "methods," associated with the class of which the view is an instance. Views are responsible for drawing content, handling multitouch events, and managing the layout of any subviews. Drawing content involves using various graphics technologies to draw shapes, images, and text inside a view's rectangular area. A view responds to touch events in its rectangular area either by using gesture recognizers or by handling touch events directly. In the view hierarchy, parent views are responsible for positioning and sizing their child views and can do so dynamically. This ability to modify child views dynamically enables views to adjust to changing conditions, such as interface rotations and animations.

Views can be viewed as building blocks that a programmer or application developer uses to construct the user interface of an application. Rather than use one view to present all content for the application, several views are typically used to build a view hierarchy. Each view in the hierarchy presents a particular portion of the application's user interface and is often optimized for a specific type of content. For example, an application can have distinct views specifically for presenting images, text and other types of content.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as application-independent software module 195 (e.g., a user interface kit) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes a plurality of component event recognizers 181. In some embodiments, the component event recognizers 181 used to form an event recognizer 180 are provided by application-independent software module 195.

A respective component gesture recognizer 181 of an event recognizer 180 includes component event recognizer-specific code 182, which optionally includes event definitions 184. Component gesture recognizer 181 also includes state/phase information 185 and one or more ports 187. In some embodiments, component event recognizer 181 also includes one or more parameter values 186.

Component event recognizer 181 receives event information from port 187-1. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Component event recognizer-specific code 182 is used to compare the event information to predefined event or sub-event definitions and, based on the comparison, determines an event or sub-event, or determines or updates the state of an event or sub-event. In some embodiments, component event recognizer-specific code 182 includes event definitions 184. Event definitions 184 contain definitions of requirements that must be satisfied in order for an event recognizer 180 to recognize the event (or gesture) defined by its component event recognizers 181 (e.g., a location requirement, a minimum and/or maximum movement requirement, a minimum or maximum timing requirement, an intensity threshold requirement, etc.). In some embodiments, a requirement is associated with a particular sub-event including, for example, touch begin, touch end, touch stationary, touch movement, touch cancellation, and multiple touching. In some embodiments, the event definitions 184 also include information for (e.g., identifying) one or more associated event handlers 190.

A respective component event recognizer 181 also includes a state/phase 185, which indicates the state of a state machine for the respective component event recognizer; state/phase 185 can have various state values, such as "event possible," "event active," "event ended", "event failed" and others. When a respective component event recognizer 181 of a respective event recognizer 180 determines that a respective sub-event does not match the event definitions 184, the respective component event recognizer 181 enters the "failed" state, which causes the respective event recognizer 180 to enter an event impossible or event failed state, after which it disregards subsequent sub-events of the touch-based gesture. In this situation, other event recognizers, if any, that remain active for the hit view continue to track and process sub-events of an ongoing touch-based gesture.

In some embodiments, a respective component event recognizer 181 includes a plurality of ports 187 that indicate how the event delivery system should perform sub-event delivery to component event recognizers 181 in actively involved event recognizers 180. In some embodiments, ports 187 define the relationships (e.g., the connections, and thus the flow of information) of component event recognizers in a gesture recognition tree structure. In some embodiments, a respective component event recognizer includes one or more parameter values 186 that store values of different properties from earlier-received input events or sub-events of a touch input, for comparison with later-received input events or sub-events. For example, a component event recognizer includes an initial location parameter that stores the initial location of a touch input as identified from the earliest-received input event for the touch input, for comparison with current locations of the touch input as identified from later-received input events to determine whether the touch input has moved across the touch-sensitive surface, and by how much.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. In some embodiments, the examples that follow are carried out using inputs on touch screen display 112 (where the touch sensitive surface and the display are combined). Alternatively, in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
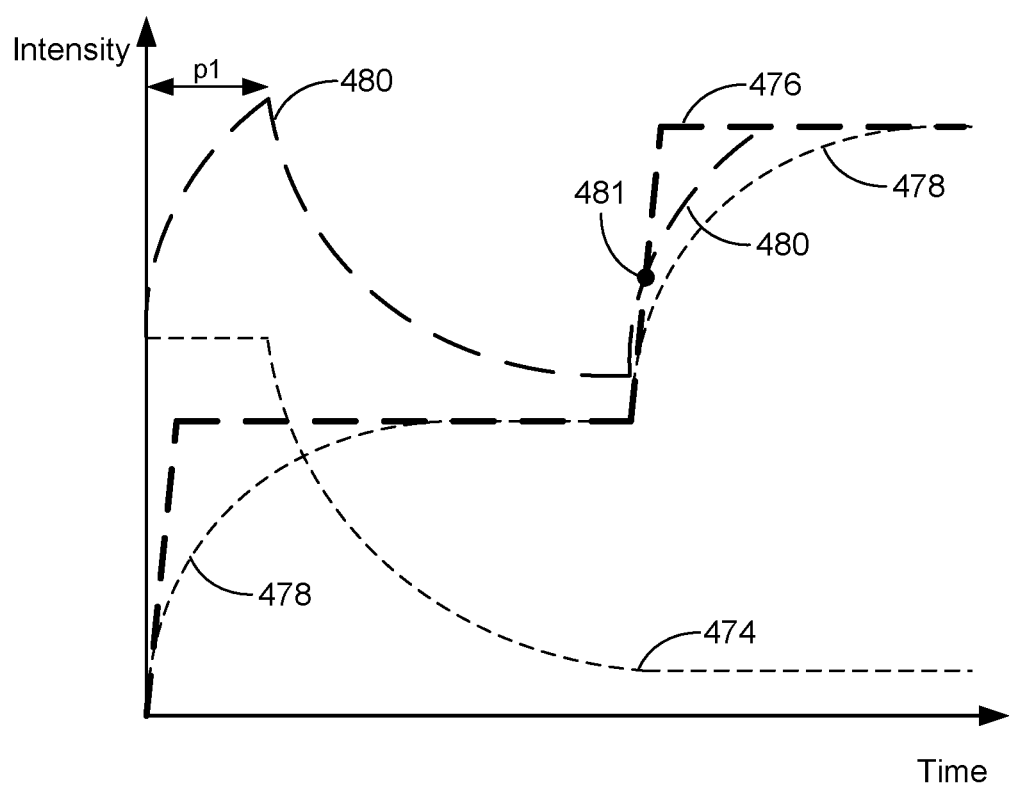
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
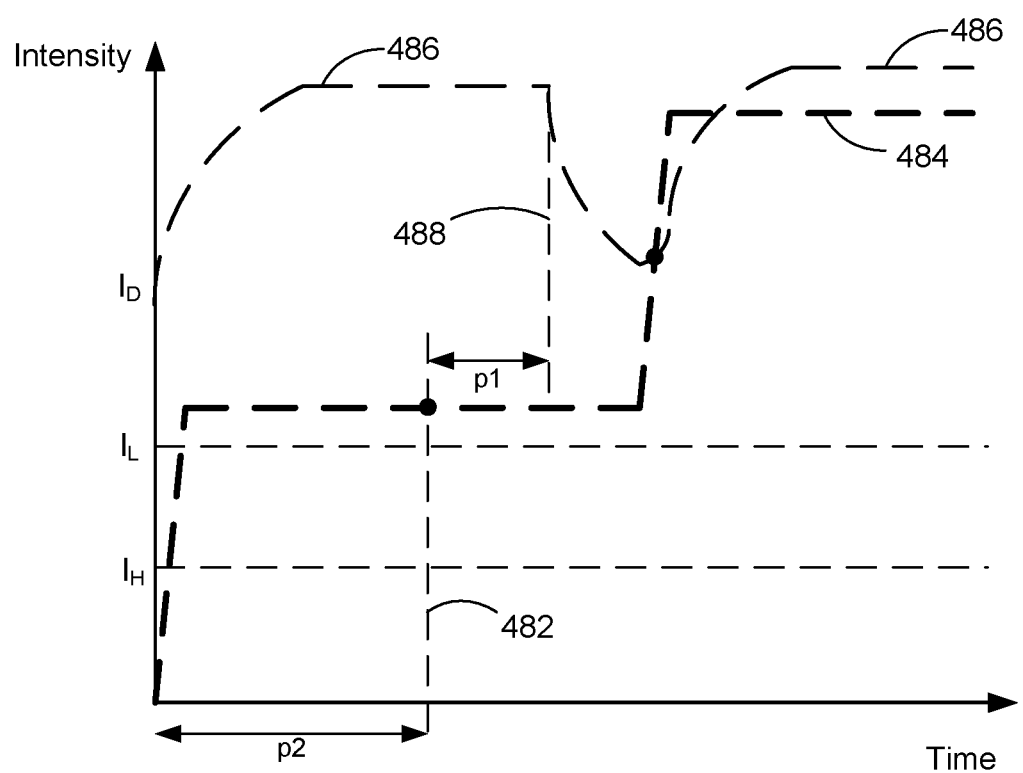

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
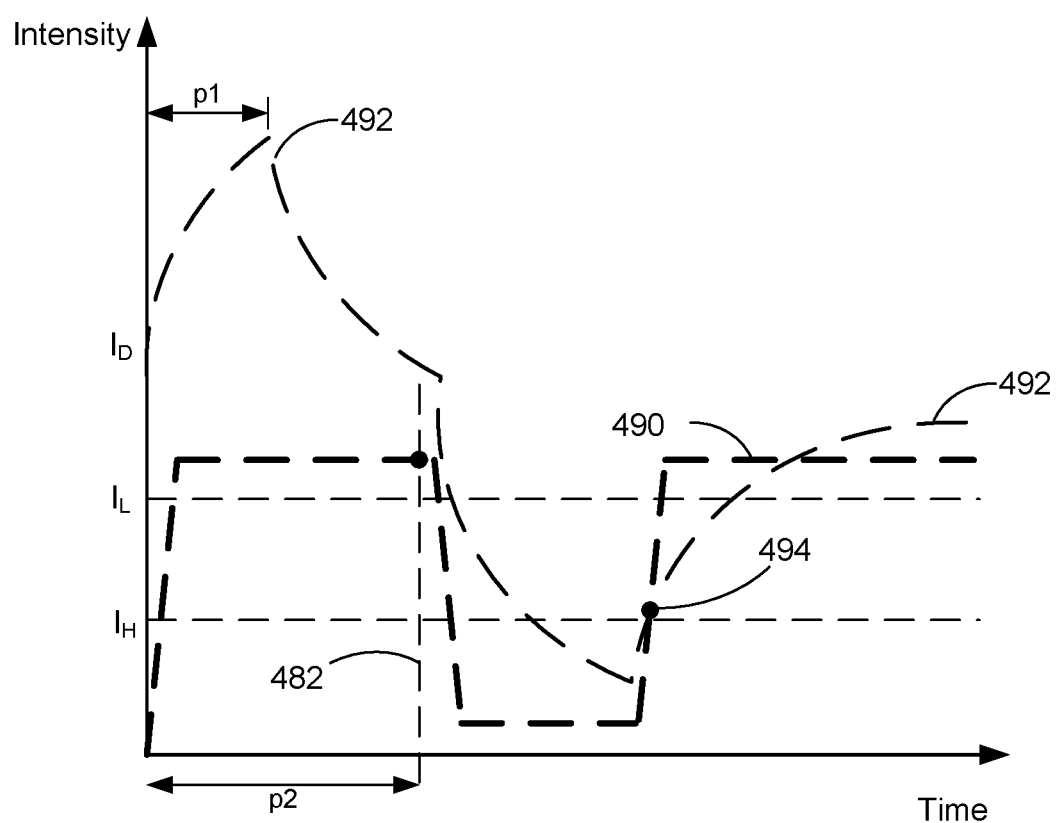

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A-5Q illustrate example gesture recognizers for processing inputs (such as touch inputs) and their operation in accordance with some embodiments. FIGS. 6A-6C illustrate examples of gesture recognition hierarchies (sometimes called gesture recognition trees) generated from a view hierarchy of views in a user interface based on received inputs. The gesture recognizers, view hierarchies, and gesture recognition hierarchies in these figures are used to illustrate the processes described below, including the processes in FIGS. 7A-7E, 8A-8C, and 9A-9B. For convenience of explanation, some of the embodiments will be discussed with reference to operations performed on a device with a touch-sensitive display system 112 in response to receiving inputs on the touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to receiving inputs on the touch-sensitive surface 451, or on a device with a keyboard/mouse 350 in response to receiving inputs via the mouse.

FIGS. 5A-5Q illustrate example gesture recognizers and their operation while processing inputs in accordance with some embodiments.

FIGS. 5A-5F illustrate an example tap gesture recognizer 500 and its operation while processing inputs. FIG. 5A shows that tap gesture recognizer 500 includes a plurality of component gesture recognizers that define requirements for recognition of a tap gesture, arranged in a tree structure. The plurality of component gesture recognizers of tap gesture recognizer 500 include:

spatial event listener 502, which requires that the location of a touch input received on the touch-sensitive surface be known by monitoring for input events that include location information;

maximum duration component 504, which requires that an amount of time that the touch input is maintained on the touch-sensitive surface be less than a predefined threshold amount of time $T_{th}$; and distance component 506, which requires that an amount of movement of the touch input across the touch-sensitive surface (if any) be less than a predefined threshold amount of movement $D_{max,th}$.

Tap gesture recognizer 500 also includes pause-for-predecessor component 508, which is optionally used to require that any gesture recognizer having priority over tap gesture recognizer 500 (e.g., any predecessor gesture recognizer) fail in order for a tap gesture to be recognized. Stated another way, pause-for-predecessor 508 prevents tap gesture recognizer 500 from succeeding while any predecessor gesture recognizer of tap gesture recognizer 500 is active, in certain situations described herein.

In addition, tap gesture recognizer 500 includes two gating combiners. Gating combiner 510 is controlled by pause-for-predecessor component 508 and maximum duration component 504. When maximum duration component 504 is in a failed state (e.g., an input has exceeded a predefined threshold amount of time, sometimes called the maximum threshold duration), gating combiner 510 is in a failed state. When maximum duration component 504 is in a state other than a failed state (e.g., an active state), gating combiner 510 passes through the input processing results (e.g., state and parameter values) received from pause-for-predecessor component 508. Similarly, gating combiner 512 is controlled by gating combiner 510 and distance component 506. When distance component 506 is in a failed state, gating combiner 512 is in a failed state. When distance component 506 is in a state other than a failed state (e.g., an active state), gating combiner 512 passes through the input processing results (e.g., state and parameter values) received from gating combiner 510. More generally, when the right-hand-side child component gesture recognizer of a gating combiner is in the failed state, the gating combiner is in the failed state, and when the right-hand-side child component gesture recognizer of the gating combiner is in a state other than the failed state, the gating combiner passes through the input processing results received from its left-hand-side child component gesture recognizer.

While FIGS. 5A-5F show only pause for predecessor component 508 having a spatial event listener 502 as a child component, in some embodiments, max duration component 504 and/or distance component 506 also have spatial event listeners (e.g., additional instances of spatial event listener 502) as a child component, or alternatively have input ports that are also coupled to spatial event listener 502.

Figure 5B:
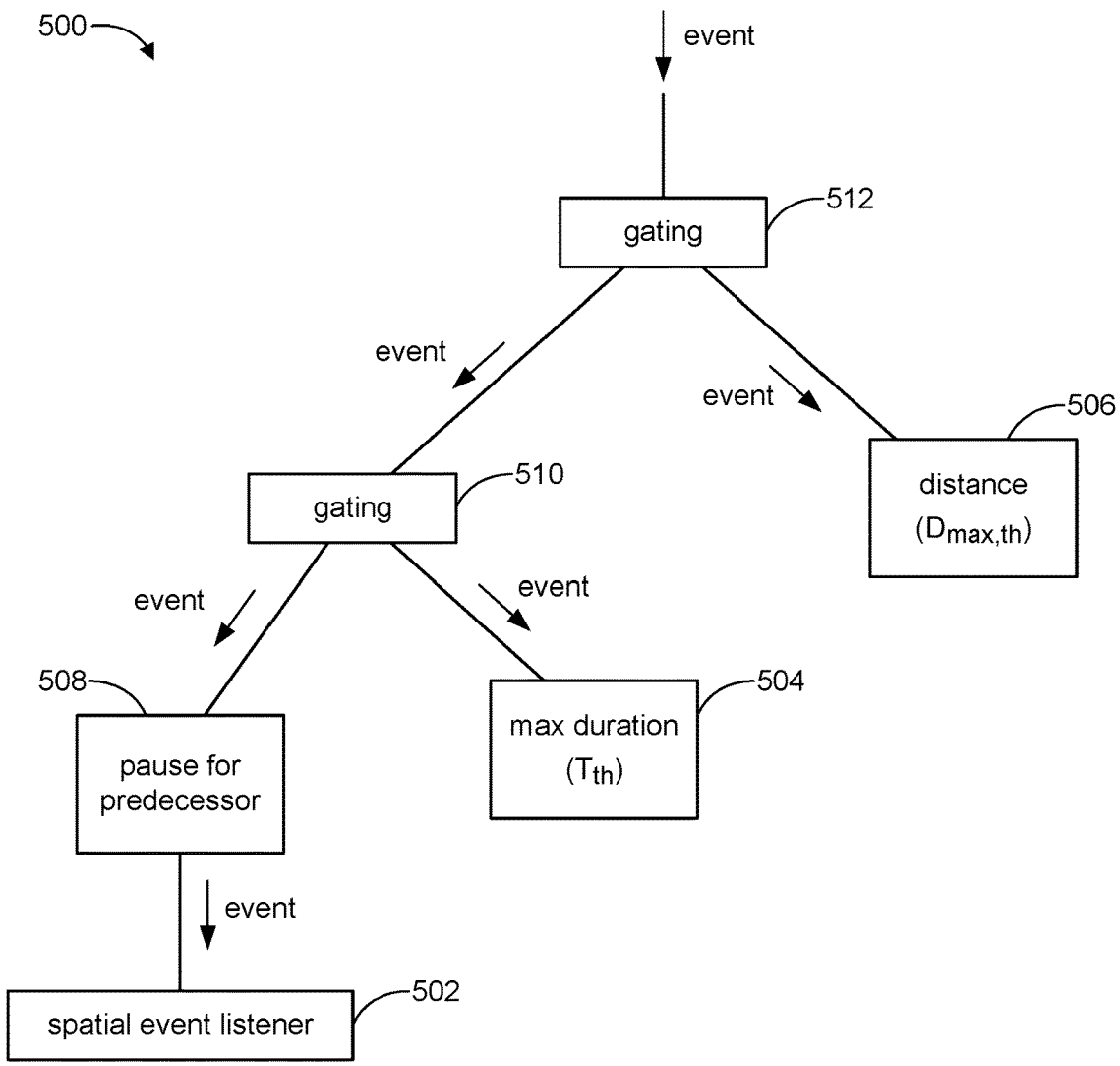

FIG. 5B illustrates receipt of an input event at tap gesture recognizer 500 (e.g., from event dispatcher module 174) in response to a touch input being received at the device. In particular, the input event is received at gating combiner 512, which is the root node of tap gesture recognizer 500. Input events received at a gesture recognizer are sometimes described as "flowing down the tree"—that is, the input events are conveyed from each respective node at a higher level in the tree to its associated nodes at the next lower level in the tree. In some cases, a combiner that has multiple child nodes conveys input events to its child nodes based on predefined information conveyance rules, as described in more detail herein. In the example shown in FIG. 5B, gating combiner 512 conveys the input event to both of its child nodes, gating combiner 510 and distance component 506. Similarly, gating combiner 510 conveys the input event to both of its child nodes, pause-for-predecessor component 508 and maximum duration component 504. In addition, pause-for-predecessor component 508 conveys the input event to its child node, spatial event listener 502.

Figure 5C:
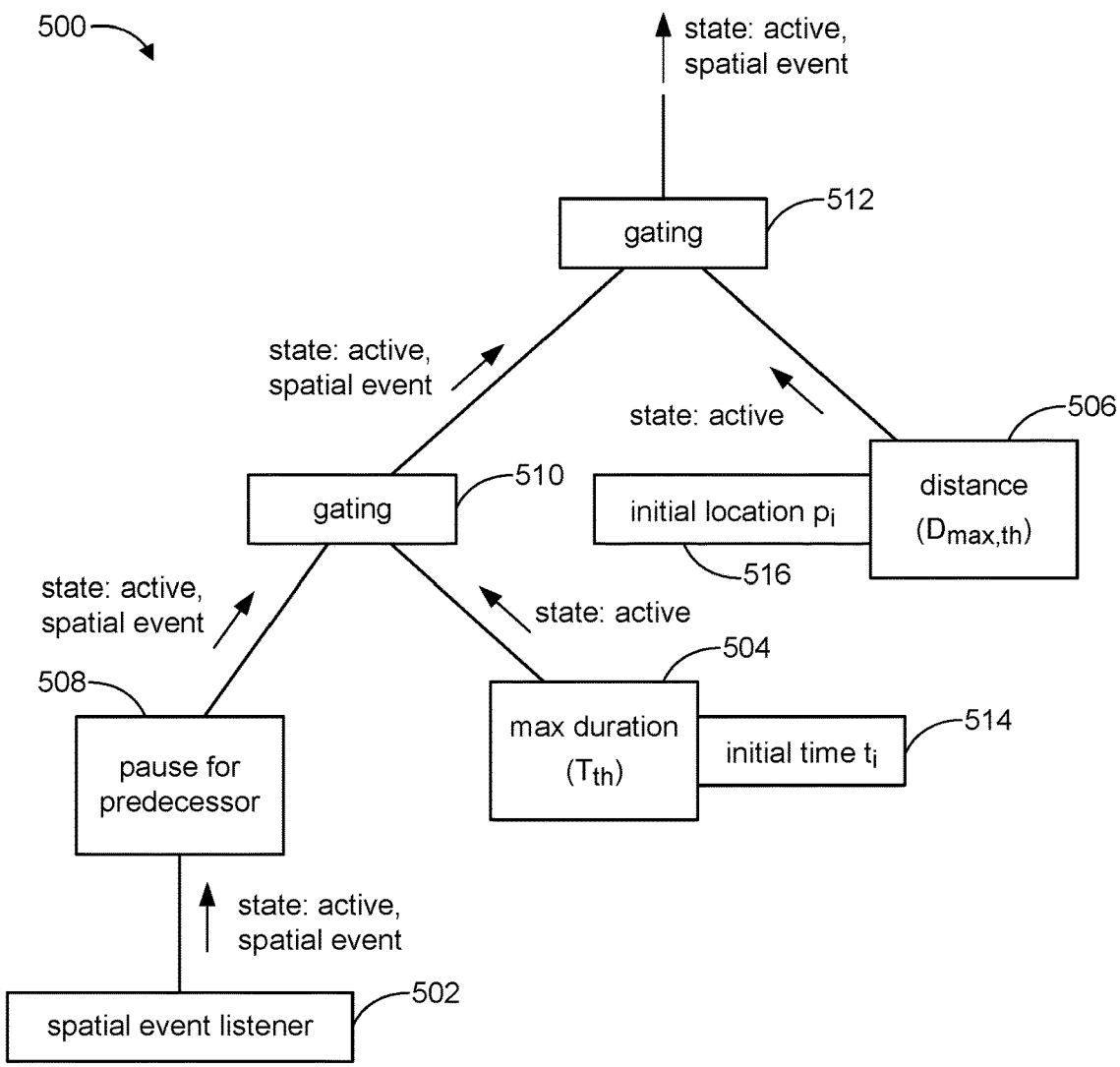

FIG. 5C illustrates the results of processing the input event shown in FIG. 5B by the component gesture recognizers in tap gesture recognizer 500. The results of processing an input event received at a gesture recognizer are sometimes described as being passed "up the tree"—that is, the input events are conveyed from each respective node at a lower level in the tree to its associated node at the next higher level in the tree. A respective node at a higher level in the tree that has multiple associated nodes at the next lower level in the tree determines its own results based on the combination of results from its multiple associated nodes.

In the example shown in FIGS. 5B-5C, the received input event is a "spatial event," that is, an event that includes (information about) the location of the received touch input, and includes the initial location $p_i$ of the touch input. The received input event is also the first input event for a newly-received touch input, and accordingly has a phase value of "touch begin" and an initial timestamp $t_i$ indicating the time at which the touch input was first received or detected. As shown in FIG. 5C, spatial event listener 502 has identified the input event as a spatial event for an ongoing touch input (as indicated by the "touch begin" phase value) and accordingly is in the "active" state. Spatial event listener 502 conveys its current "active" state and the spatial input event to its parent node, pause-for-predecessor 508.

Pause-for-predecessor component 508, in the example shown in FIG. 5C, is in the "active" state because tap gesture recognizer 500 has no predecessor gesture recognizer that is active (either because no other gesture recognizer has priority over tap gesture recognizer 500, or because every gesture recognizer having priority over tap gesture recognizer 500 has failed). Pause-for-predecessor component 508 conveys its current "active" state and the spatial input event to its parent node, gating combiner 510. In some embodiments, where another gesture recognizer (such as a double-tap gesture recognizer) has priority over tap gesture recognizer 500 (e.g., by using an exclusive combiner, as described herein), tap gesture recognizer 500 receives an indication, included with or in addition to the input event, as to whether a predecessor gesture recognizer is active. In such cases, pause-for-predecessor component 508 outputs an indication that recognition of a tap gesture by tap gesture recognizer 500 should be suspended or "paused" until an indication is received that the predecessor gesture recognizer has failed. If no such indication is received, tap gesture recognizer remains in the suspended state and does not successfully recognize a tap gesture (e.g., even though, in the case of a double-tap gesture recognizer having priority over the tap gesture recognizer and recognizing a double-tap gesture, the first tap gesture of the double-tap gesture would have been recognized by the tap gesture recognizer).

Maximum duration component 504 has identified the current timestamp $t_i$ of the input event. In addition, maximum duration component 504 has identified the input event as an event having a phase value of "touch begin." Accordingly, maximum duration component 504 has stored the identified current timestamp $t_i$ as the initial timestamp associated with the touch input. Maximum duration component 504 uses the initial timestamp to determine whether the touch input has remained on the touch-sensitive surface for more than the predefined threshold amount of time $T_{th}$. At initial detection of the touch input, when the timestamp is the initial timestamp $t_i$, the touch input has not yet remained on the touch-sensitive surface for more than the predefined threshold amount of time $T_{th}$, so maximum duration component 504 is in the "active" state. Maximum duration component 504 conveys its current "active" state to its parent node, gating combiner 510.

Gating combiner 510, as described above, is controlled by pause-for-predecessor component 508 and maximum duration component 504. Because maximum duration component 504 is in the "active" state and thus not in the "failed" state, gating combiner 510 passes through the input processing results received from pause-for-predecessor component 508. Accordingly, gating combiner 510 conveys the "active" state and the spatial event to its parent node, gating combiner 512.

Distance component 506 has identified the current location $p_i$ of the touch input from the input event. In addition, distance component 506 has identified the input event as an event having a phase value of "touch begin." Accordingly, distance component 506 has stored the identified current location $p_i$ as the initial location of the touch input. In general, distance components use the initial location to determine whether movement (if any) of a touch input satisfies a minimum amount of movement and/or a maximum amount of movement. In some embodiments, a distance component is used in gesture recognizers that require movement of a touch input to define a minimum threshold amount of movement. In some embodiments, a distance component is used in gesture recognizers that require a limit on the amount of movement of a touch input to define a maximum threshold amount of movement. In some embodiments, both a minimum threshold amount of movement and a maximum threshold amount of movement can be defined to require that movement of a touch input be within a predefined range.

In the example shown in FIG. 5C, distance component 506 uses the initial location to determine whether the touch input has moved across the touch-sensitive surface by more than the predefined maximum threshold amount $D_{max,th}$. At initial detection of the touch input, when the location is the initial location $p_i$, the touch input has not yet moved across the touch-sensitive surface, so distance component 506 is in the "active" state. Distance component 506 conveys its current "active" state to its parent node, gating combiner 512.

Gating combiner 512, as described above, is controlled by gating combiner 510 and distance component 506. Because distance component 506 is in the "active" state and thus not in the "failed" state, gating combiner 512 passes through the input processing results received from gating combiner 510. Accordingly, gating combiner 512 conveys the "active" state and the spatial event received from gating combiner 510. Because gating combiner 512 is the root node of tap gesture recognizer 500, the overall state of tap gesture recognizer 500 is the "active" state, and the overall output values of tap gesture recognizer 500 are those of the spatial event. In some embodiments, the overall state and output values of an assembled gesture recognizer (such as tap gesture recognizer 500) are conveyed by the gesture recognizer to a parent node of the gesture recognizer where the gesture recognizer is used as part of another gesture recognizer. For example, as described herein with reference to FIGS. 5G-5L, double-tap gesture recognizer 520 includes an assembled tap gesture recognizer 524 as a component, and thus the overall state and output values of tap gesture recognizer 524 are conveyed to other components (e.g., repeater 522, FIG. 5G) in double-tap gesture recognizer 520. In some embodiments, the overall state and output values of an assembled gesture recognizer are conveyed by the gesture recognizer to a parent node of the gesture recognizer where the gesture recognizer is a child node in a gesture recognition hierarchy. For example, as described herein with reference to FIG. 6A, gesture recognition hierarchy 640 includes an assembled tap gesture recognizer 614 as a child node, and thus the overall state and output values of tap gesture recognizer 614 are conveyed to other components (e.g., exclusive combiner 642, FIG. 6A) in gesture recognition hierarchy 640. In some embodiments, the overall state and output values of an assembled gesture recognizer are conveyed by the gesture recognizer to an application that is executing on the device and that includes the gesture recognizer (e.g., application 136-1, FIG. 1B).

Figure 5D:
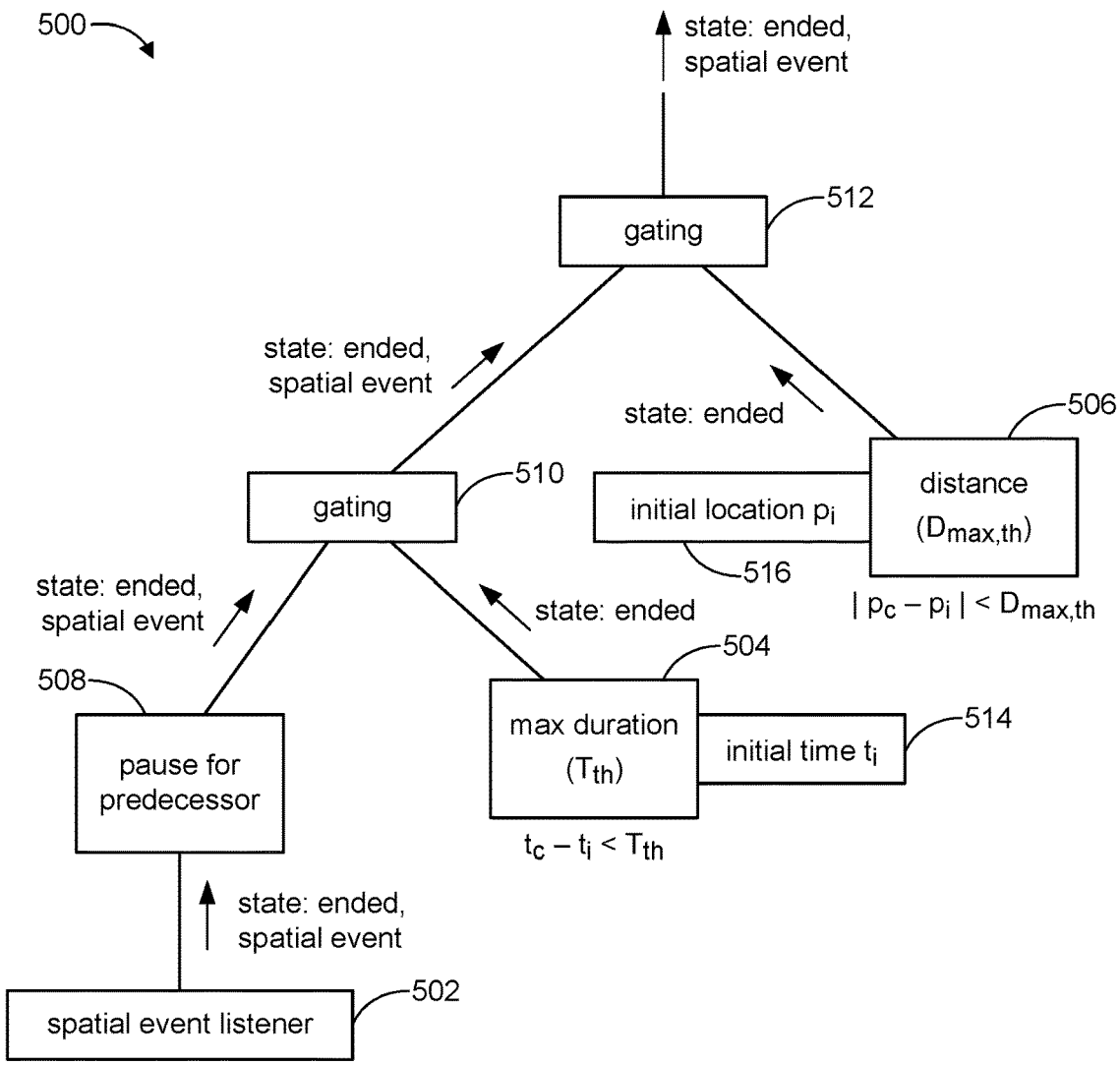

FIG. 5D illustrates an example of successful recognition of a tap gesture. In particular, FIG. 5D illustrates the results of processing a second input event that is associated with liftoff of the touch input described with respect to FIGS. 5B-5C with all of the gesture recognition requirements of tap gesture 500 being satisfied. The second input event is received after the (first) input event described with respect to FIGS. 5B-5C has been received (as shown in FIG. 5B) and processed (as shown in FIG. 5C). The second input event is another "spatial event," but has a phase value of "touch end" and includes the location $p_c$ of the touch input at the time of liftoff and the timestamp $t_c$ indicating the time of liftoff. As shown in FIG. 5D, spatial event listener 502 has identified the input event as a spatial event for a completed touch input (as indicated by the "touch end" phase value) and accordingly is in the "ended" state. Spatial event listener 502 conveys its current "ended" state and the spatial input event to its parent node, pause-for-predecessor 508.

Pause-for-predecessor component 508, in the example shown in FIG. 5D, is in the "ended" state because tap gesture recognizer 500 has no predecessor gesture recognizer that is active. Pause-for-predecessor component 508 conveys its current "ended" state and the spatial input event to its parent node, gating combiner 510.

Maximum duration component 504 has identified the current timestamp $t_c$ of the input event. Maximum duration component has compared the current timestamp $t_c$ to the stored initial timestamp $t_i$ to determine that the amount of time that touch input has remained on the touch-sensitive surface ($t_c$-$t_i$) is less than the predefined threshold amount of time $T_{th}$. Accordingly, maximum duration component 504 has not transitioned to the "failed" state. Instead, maximum duration component 504 has identified the input event as an event having a phase value of "touch end," and, having not transitioned to the "failed" state for any reason, has thus transitioned to the "ended" state. Maximum duration component 504 conveys its current "ended" state to its parent node, gating combiner 510.

Gating combiner 510, as described above, is controlled by pause-for-predecessor component 508 and maximum duration component 504. Because maximum duration component 504 is in the "ended" state and thus not in the "failed" state, gating combiner 510 passes through the input processing results received from pause-for-predecessor component 508. Accordingly, gating combiner 510 conveys the "ended" state and the spatial event to its parent node, gating combiner 512.

Distance component 506 has identified the current location $p_c$ of the touch input from the input event. Distance component 506 has compared the current location $p_c$ to the stored initial location $p_i$ to determine that the distance traveled by the touch input (the absolute value of $p_c$-$p_i$, $|p_c$-$p_i|$) is less than the predefined maximum threshold distance $D_{max,th}$. Accordingly, distance component 506 has not transitioned to the "failed" state. Instead, distance component 506 has identified the input event as an event having a phase value of "touch end," and, having not transitioned to the "failed" state for any reason, has thus transitioned to the "ended" state. Distance component 506 conveys its current "ended" state to its parent node, gating combiner 512.

Gating combiner 512, as described above, is controlled by gating combiner 510 and distance component 506. Because distance component 506 is in the "ended" state and thus not in the "failed" state, gating combiner 512 passes through the input processing results received from gating combiner 510. Accordingly, gating combiner 512 conveys the "ended" state and the spatial event received from gating combiner 510. Because gating combiner 512 is the root node of tap gesture recognizer 500, the overall state of tap gesture recognizer 500 is the "ended" state, and the overall output values of tap gesture recognizer 500 are those of the spatial event. With the transitioning of gating combiner 512 to the "ended" state, tap gesture recognizer 500 has successfully recognized the touch input as a tap gesture.

Figure 5E:
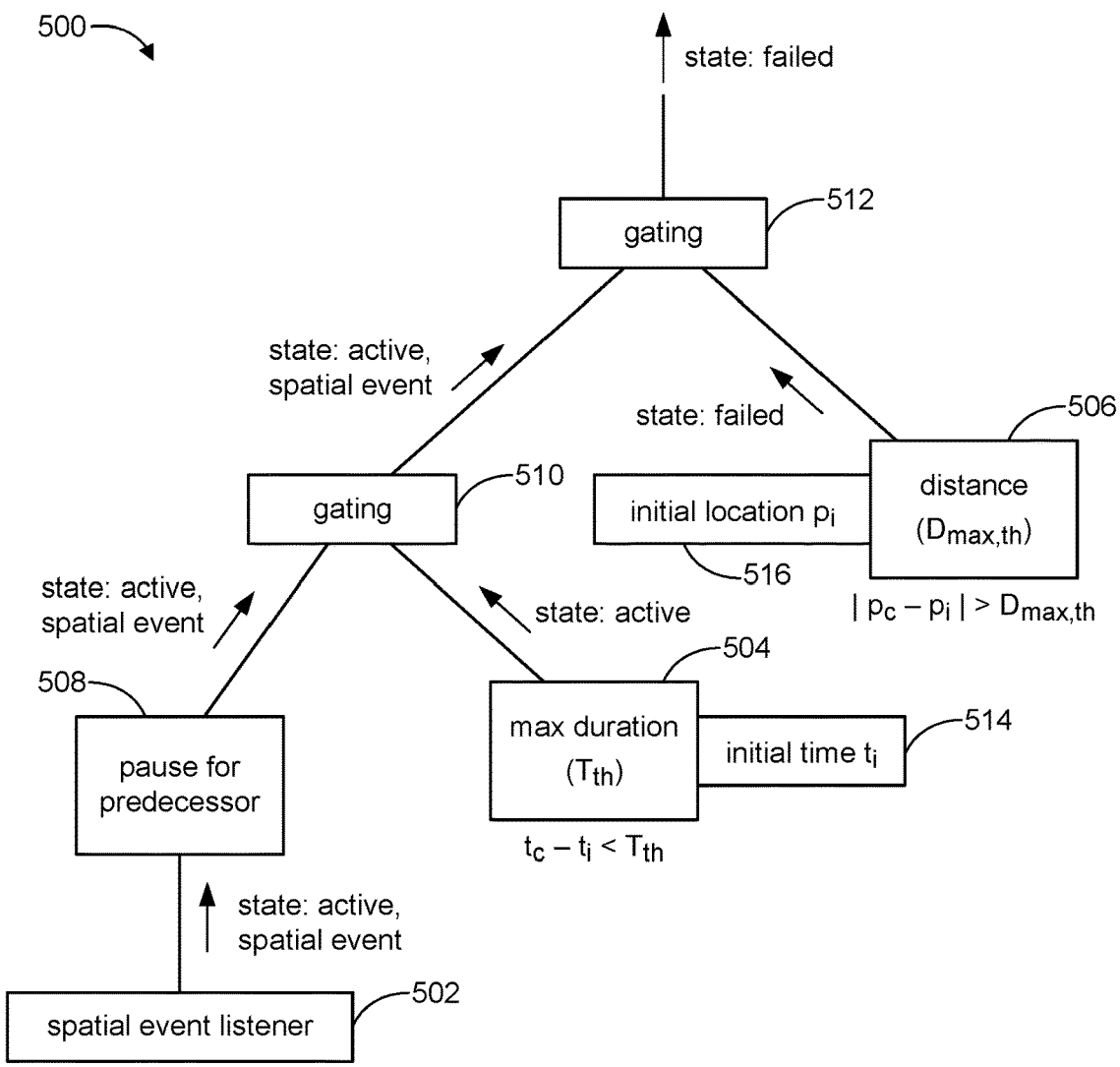

FIG. 5E illustrates an example of failure of a tap gesture recognizer 500 to recognize a touch input. In particular, FIG. 5E illustrates the results of processing a third input event that is associated with movement of the touch input described with respect to FIGS. 5B-5C, and that is received instead of the second input event described with respect to FIG. 5D. The third input event is received after the (first) input event described with respect to FIGS. 5B-5C has been received (as shown in FIG. 5B) and processed (as shown in FIG. 5C). The third input event is another "spatial event" but has a phase value of "touch movement" (or, in some embodiments, "touch change") and includes the current location $p_c$ of the touch input and the timestamp $t_c$ indicating the time associated with the third input event. As shown in FIG. 5E, spatial event listener 502 has identified the input event as a spatial event for an ongoing touch input (as indicated by the "touch movement" phase value) and accordingly is in the "active" state. Spatial event listener 502 conveys its current "active" state and the spatial input event to pause-for-predecessor 508.

Pause-for-predecessor component 508, in the example shown in FIG. 5D, is in the "active" state because tap gesture recognizer 500 has no predecessor gesture recognizer that is active. Pause-for-predecessor component 508 conveys its current "active" state and the spatial input event to gating combiner 510.

Maximum duration component 504 has identified the current timestamp $t_c$ of the input event. Maximum duration component has compared the current timestamp $t_c$ to the stored initial timestamp $t_i$ to determine that the amount of time that touch input has remained on the touch-sensitive surface ($t_c$-$t_i$) is less than the predefined threshold amount of time $T_{th}$. Accordingly, maximum duration component 504 has not transitioned to the "failed" state and, because the input event has a phase value of "touch movement" rather than "touch end," remains in the "active" state. Maximum duration component 504 conveys its current "active" state to gating combiner 510.

Because maximum duration component 504 is in the "active" state and thus not in the "failed" state, gating combiner 510 passes through the "active" state and the spatial event received from pause-for-predecessor component 508 to gating combiner 512.

Distance component 506 has identified the current location $p_c$ of the touch input and compared the current location $p_c$ to the stored initial location $p_i$ to determine that the distance traveled by the touch input ($|p_c$-$p_i|$) is greater than the predefined maximum threshold distance $D_{max,th}$. Accordingly, distance component 506 has transitioned to the "failed" state. Distance component 506 conveys its current "failed" state to gating combiner 512.

Gating combiner 512 is controlled by the "failed" state of distance component 506 such that gating component 512 is also in the "failed" state. Because gating combiner 512 is the root node of tap gesture recognizer 500, the overall state of tap gesture recognizer 500 is the "failed" state, and no tap gesture is recognized by tap gesture recognizer 500.

Figure 5F:
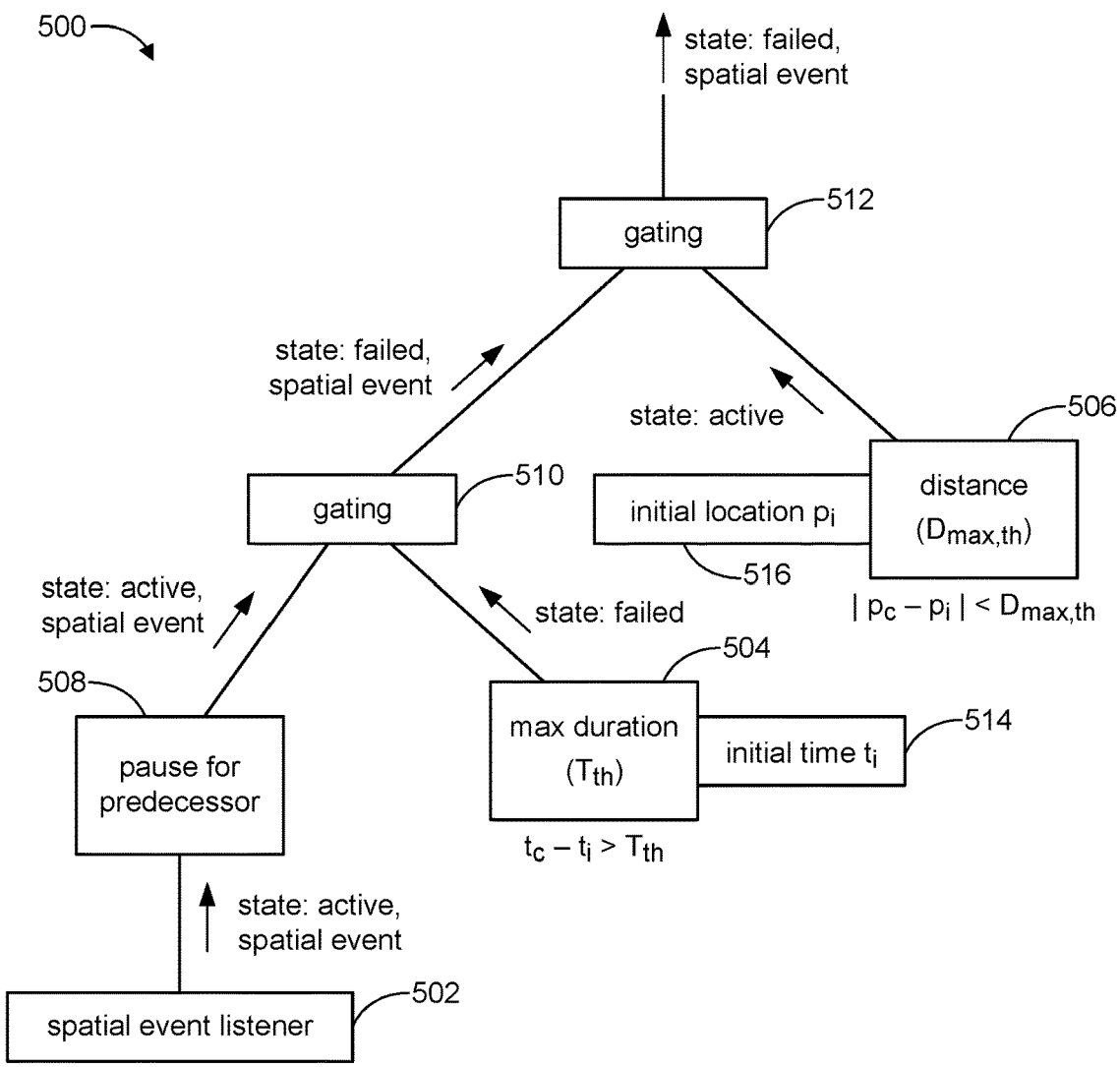

FIG. 5F illustrates another example of failure of tap gesture recognizer 500 to recognize a touch input. In particular, FIG. 5F illustrates the results of processing a fourth input event that is associated with the touch input described with respect to FIGS. 5B-5C being maintained on the touch-sensitive surface, and that is received instead of the second and third input events described with respect to FIGS. 5D-5E. The fourth input event is received after the (first) input event described with respect to FIGS. 5B-5C has been received (as shown in FIG. 5B) and processed (as shown in FIG. 5C). The fourth input event is another "spatial event" but has a phase value of "touch stationary" and includes the current location $p_c$ of the touch input and the timestamp $t_c$ indicating the time associated with the third input event.

Maximum duration component 504 has identified the current timestamp $t_c$ of the input event and compared the current timestamp $t_c$ to the stored initial timestamp $t_i$ to determine that the amount of time that touch input has remained on the touch-sensitive surface ($t_c$-$t_i$) has exceeded the predefined threshold amount of time $T_{th}$. Accordingly, maximum duration component 504 has transitioned to the "failed" state. Maximum duration component 504 conveys its current "failed" state to gating combiner 510, which controls gating combiner 510 to also be in the "failed" state (e.g., causes gating combiner 510 to transition to the "failed" state).

Distance component 506 has identified the current location $p_c$ of the touch input and compared the current location $p_c$ to the stored initial location $p_i$ to determine that the distance traveled by the touch input ($|p_c-p_i|$) is less than the predefined maximum threshold distance $D_{max,th}$. Accordingly, distance component 506 has not transitioned to the "failed" state and, because the input event has a phase value of "touch stationary" rather than "touch end," remains in the "active" state. Distance component 506 conveys its current "active" state to gating combiner 512.

Because distance component 506 is in the "active" state and thus not in the "failed" state, gating combiner 512 passes through the "failed" state and the spatial event received from gating combiner 510. Because gating combiner 512 is the root node of tap gesture recognizer 500, the overall state of tap gesture recognizer 500 is the "failed" state, and no tap gesture is recognized by tap gesture recognizer 500. In some embodiments, the passed-through spatial event output by tap gesture recognizer 500 is ignored because tap gesture recognizer 500 has failed.

Figure 5G:
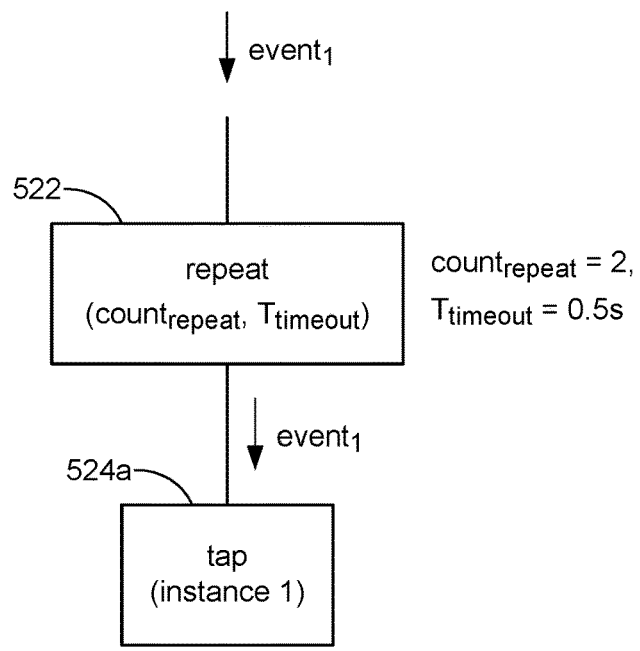

FIGS. 5G-5L illustrate an example double-tap gesture recognizer 520 and its operation while processing inputs. FIG. 5G shows that double-tap gesture recognizer 520 includes a plurality of component gesture recognizers that define requirements for a double-tap gesture, including:

repeater 522, which requires repeated success of its child component gesture recognizer or child gesture recognizer of (at least) a predefined number of times defined by a repeat count value ("$count_{repeat}$"), optionally subject to a timeout period ("$T_{timeout}$") such that each additional success must occur before the amount of time that has elapsed since the most-recent previous success reaches (or exceeds) the predefined timeout period; and tap gesture recognizer 524, which is a high-level representation of the various component gesture recognizers of a tap gesture recognizer as described herein with reference to example tap gesture recognizer 500 in FIGS. 5A-5F.

In the example shown in FIG. 5G, repeater 522 requires, in order for double-tap gesture recognizer 520 to succeed, recognition of two successful tap gestures (through setting $count_{repeat}$ to a value of "2") within 0.5 seconds of each other (through setting $T_{timeout}$ to a value of "0.5 s"). In some embodiments, as shown in FIGS. 5G-5L, repeater 522 uses a first instance 524a of the tap gesture recognizer to monitor for the first required tap gesture, and a second instance 524b of the tap gesture recognizer to monitor for the second required tap gesture (after the first required tap gesture is recognized). More generally, in some embodiments, a new/different instance of the child (component) gesture recognizer of a repeater is used to monitor for each successive occurrence of the gesture recognition requirements of the child (component) gesture recognizer being satisfied. In some embodiments, the repeater in a gesture recognizer reuses a single child (component) gesture recognizer (e.g., a same instance of the child (component) gesture recognizer) by resetting the state(s) and value(s) of the child (component) gesture recognizer each time the gesture recognition requirements of the child (component) gesture recognizer are satisfied. In some embodiments, the repeater tracks the number of times that its child (component) gesture recognizer has succeeded.

FIG. 5G further illustrates receipt of a first input event ("$event_1$") at double-tap gesture recognizer 520 (e.g., from event dispatcher module 174) in response to a first touch input being received at the device. In particular, the first input event is received at repeater 522, which is the root node of double-tap gesture recognizer 520. Repeater 522 conveys the first input event to its child node, tap gesture recognizer 524a. More specifically, because tap gesture recognizer 524a is itself a tree structure, repeater 522 conveys the first input event to the root node of tap gesture recognizer 524a (e.g., a gating combiner such as gating combiner 512, FIG. 5B), which in turn conveys the first input event to other nodes in tap gesture recognizer 524a (e.g., as described herein with reference to FIG. 5B). In some embodiments, repeater 532 adds the first instance 524a of the tap gesture recognizer to double-tap gesture recognizer 520 in response to receiving the first input event, and then conveys the first input event to the root node of tap gesture recognizer 524a to processing. In some embodiments, "adding" an instance of a first gesture recognizer (e.g., the tap gesture recognizer) or a first component gesture recognizer to a second gesture recognizer (e.g., the double-tap gesture recognizer) includes creating or generating an instance of the first gesture recognizer or first component gesture recognizer, setting or initializing one or more parameters of the generated instance (e.g., setting a threshold value, and/or setting one or more configuration parameters to control how the generated instance operates), and connecting the generated instance to the second gesture recognizer (e.g., connecting a port of the first gesture recognizer or first component gesture recognizer to a port of the second gesture recognizer).

Figure 5H:
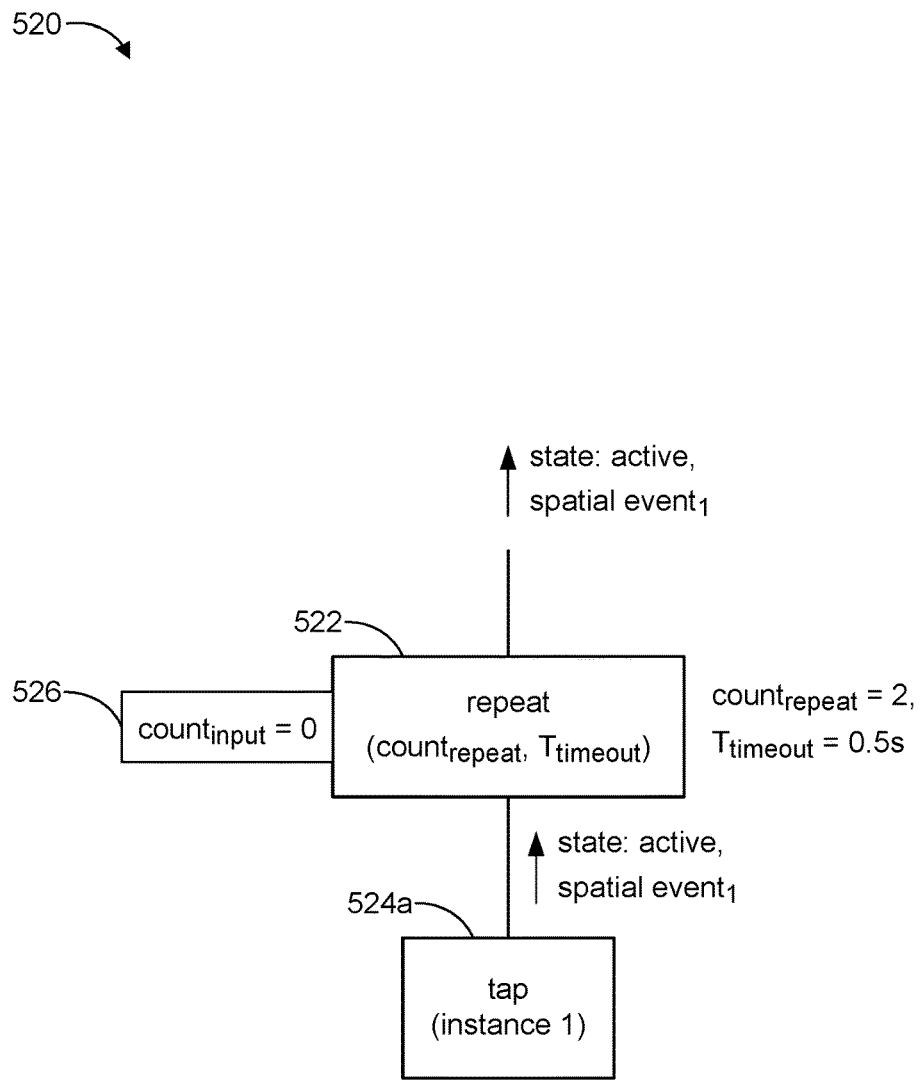

FIG. 5H illustrates the results of processing the first input event shown in FIG. 5G by the component gesture recognizers in double-tap gesture recognizer 520. In the example shown in FIG. 5H, the first input event has been determined to be a spatial event (e.g., by the spatial event listener of tap gesture recognizer 524a). The first input event describes an ongoing touch input (e.g., the first input event has a phase value of "touch begin" or "touch stationary") and includes the location of the received first touch input. Tap gesture recognizer 524a has processed the first input event (e.g., as described herein with reference to FIG. 5C) and accordingly has transitioned to the "active" state. In addition, tap gesture recognizer 524a has conveyed its current "active" state and the first input event ("spatial $event_1$") up the tree to repeater 522.

Repeater 522 includes an input count value ("$count_{input}$") 526 that tracks the number of times that tap gesture recognizer 524 (or a respective instance of tap gesture recognizer 524) has succeeded. Because tap gesture recognizer (instance 1) 524a has not yet succeeded (e.g., tap gesture recognizer 524a has not yet transitioned to the "ended" state), input count value 526 has a value of zero. In addition, repeater 522 has transitioned to the "active" state in response to the first touch input being received (but not yet ended). Repeater 522 conveys, as its output, its current "active" state and the first spatial event ("spatial $event_1$") received from tap gesture recognizer 524a. Because repeater 522 is the root node of double-tap gesture recognizer 520, the overall state of double-tap gesture recognizer 520 is the "active" state, and the overall output values of double-tap gesture recognizer 520 are those of the first spatial event.

Figure 5I:
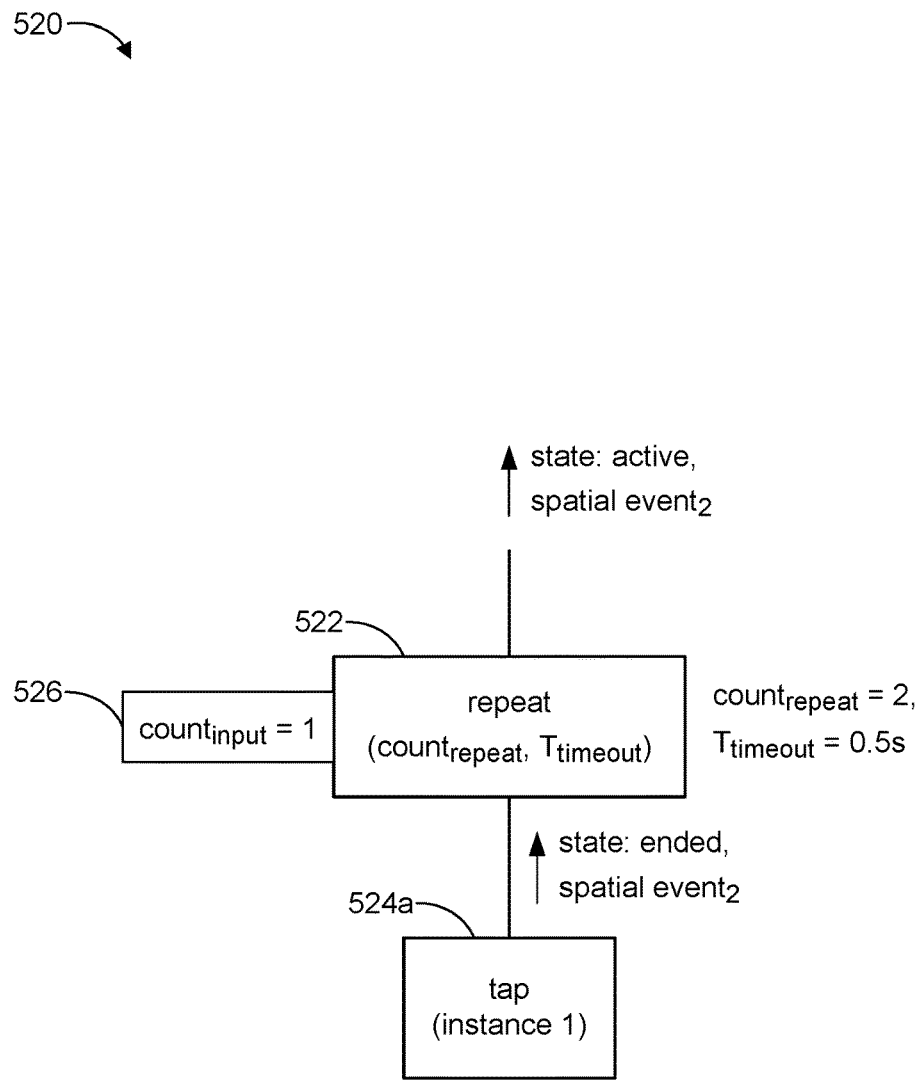

FIG. 5I illustrates the results of processing a second input event ("$event_2$") that has been received at double-tap gesture recognizer 520 and that is associated with liftoff of the first touch input described with respect to FIGS. 5G-5H. The second input event is received after the first input event has been received and processed (e.g., as described herein with respect to FIGS. 5G-5H). The second input event has been determined to be a spatial event ("spatial event₂") similar to the first input event, except that the second input event has a phase value of "touch end." As shown in FIG. 5I, tap gesture recognizer 524a has processed the second input event (e.g., as described herein with reference to FIG. 5D) and recognized the first touch input as a first tap gesture. Tap gesture recognizer 524a accordingly has transitioned to the "ended" state and has conveyed its current "ended" state and the second input event to repeater 522. In accordance with tap gesture recognizer 524a successfully recognizing a first tap gesture, repeater 522 increases input count value 526 to a value of one.

In some embodiments, after repeater 522 has transitioned to the "active" state in response to a touch input being received, repeater 522 remains in the "active" state either until tap gesture recognizer 524 (or a respective instance of tap gesture recognizer 524) transitions to the "failed" state, or until tap gesture recognizer 524 has succeeded the predefined number of times required by repeat count value ("count$_{repeat}$"). In FIG. 5I, because tap gesture recognizer 524a has not transitioned to the "failed" state, and because only one tap input has been detected, repeater 522 remains in the "active" state. Repeater 522 conveys, as its output, its current "active" state and the second spatial event ("spatial event₂") received from tap gesture recognizer 524a. Accordingly, the overall state of double-tap gesture recognizer 520 is the "active" state, and the overall output values of double-tap gesture recognizer 520 are those of the second spatial event.

Figure 5J:
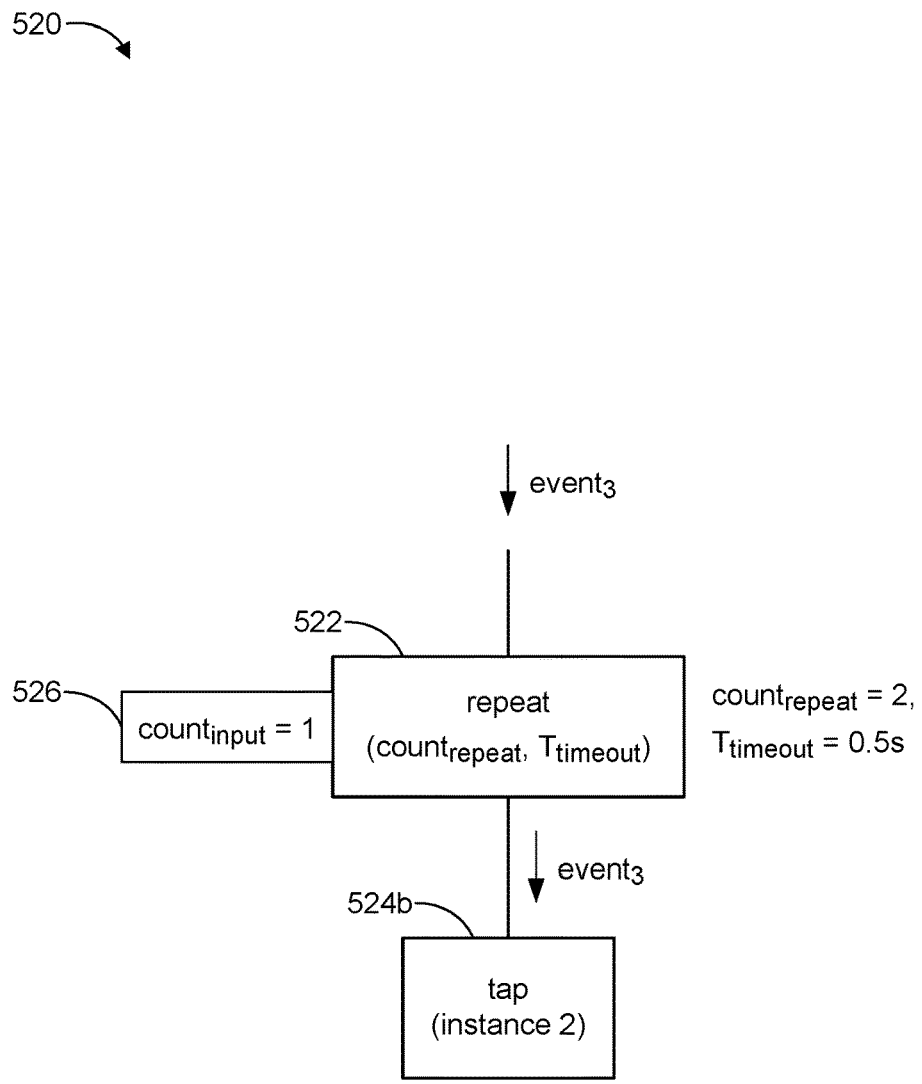

FIG. 5J illustrates receipt of a third input event ("event₃") at double-tap gesture recognizer 520 in response to a second touch input being received at the device. Because double-tap gesture recognizer 520 (and in particular, tap gesture recognizer (instance 1) 524a) has recognized a first tap input, the first instance 524a of the tap gesture recognizer has been replaced with a second instance 524b of the tap gesture recognizer (e.g., a second instance of tap gesture recognizer 500, FIG. 5B). In some embodiments, repeater 532 removes the first instance 524a of the tap gesture recognizer from double-tap gesture recognizer 520 in response to receiving a processed input from the first instance 524a, indicating that a first tap gesture has been recognized, and repeater 532 adds a second instance 524b of the tap gesture recognizer to double-tap gesture recognizer 520 in response to receiving the third input event. Repeater 522 conveys the third input event to tap gesture recognizer (instance 2) 524b for processing (e.g., as described herein with reference to FIG. 5C) to determine whether the second touch input is a tap gesture.

Figure 5K:
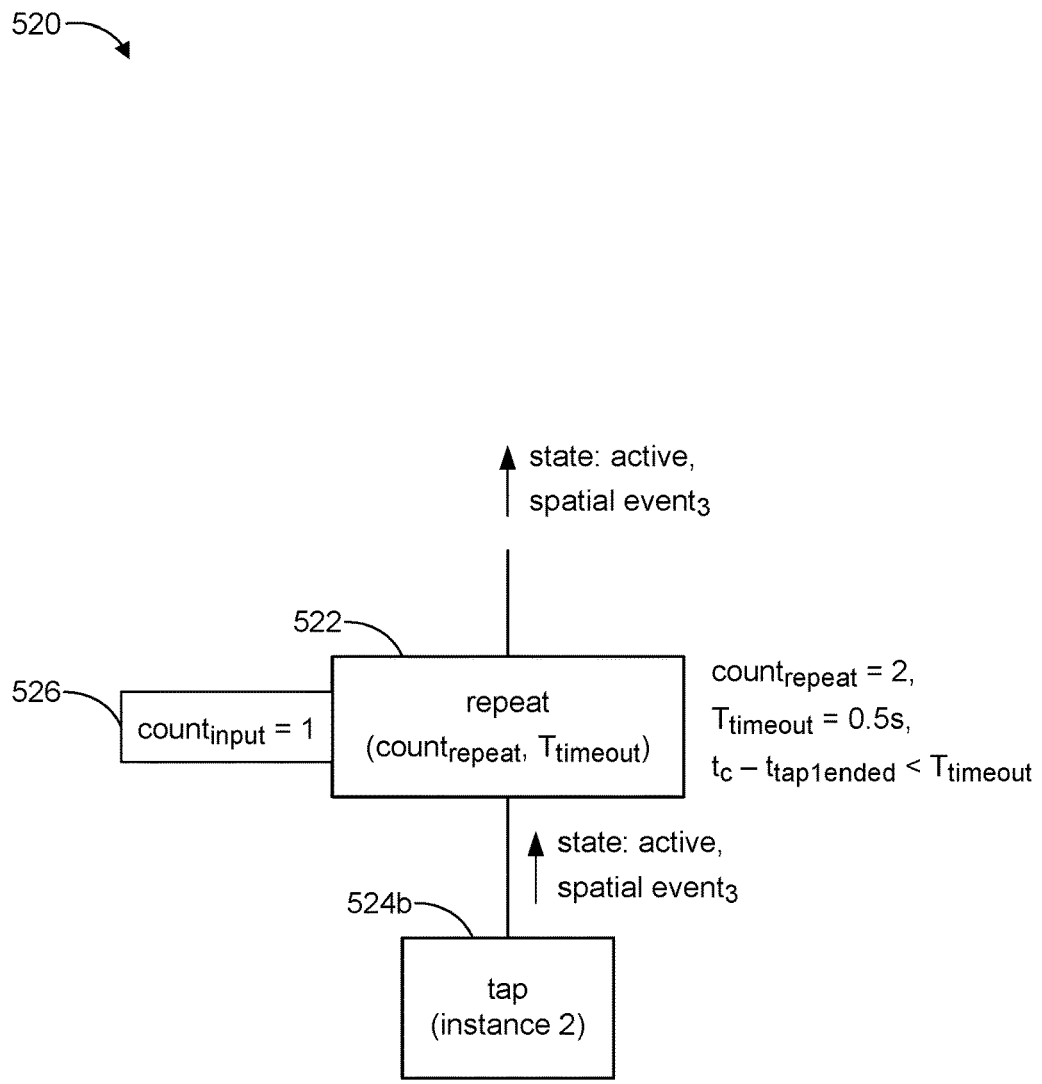

FIG. 5K illustrates the results of processing the third input event shown in FIG. 5J by the component gesture recognizers in double-tap gesture recognizer 520. In the example shown in FIGS. 5J-5K, the third input event has been determined to be a spatial event (e.g., by the spatial event listener of tap gesture recognizer 524b). The third input event describes an ongoing touch input (e.g., the third input event has a phase value of "touch begin" or "touch stationary") and includes the location of the received second touch input and a current timestamp $t_c$ associated with the third input event. Tap gesture recognizer 524b has processed the third input event (e.g., as described herein with reference to FIG. 5C) and accordingly has transitioned to the "active" state. In addition, tap gesture recognizer 524b has conveyed its current "active" state and the third input event ("spatial event₃") to repeater 522. Because tap gesture recognizer (instance 2) 524b has not yet succeeded (e.g., tap gesture recognizer 524b has not yet transitioned to the "ended" state), input count value 526 of repeater 522 is maintained with a value of one.

In addition, repeater 522 monitors an amount of time that has elapsed since a time corresponding to the most-recently recognized tap gesture. In some embodiments, repeater 522 monitors the amount of time that has elapsed from a beginning of the touch input that was identified as the most-recently recognized tap gesture (e.g., by identifying and storing the initial timestamp associated with the "touch begin" event for that touch input). In some embodiments, repeater 522 monitors the amount of time that has elapsed from an end of that touch input (e.g., by identifying and storing the ending timestamp associated with the "touch end" event for that touch input). For example, in FIG. 5K, repeater 522 monitors the time that has elapsed from the end of the first tap gesture ("$t_{tap1ended}$") that was most-recently successfully recognized by tap gesture recognizer 524a (FIG. 5I) to the current time associated with the third input event ("$t_c$"). Because the amount of time that has elapsed from the end of the first tap gesture ("$t_{tap1ended}$") to the current time associated with the third input event ("$t_c$") is less than the predefined timeout period ("$T_{timeout}$"), and because tap gesture recognizer 524b has transitioned to neither the "ended" state nor the "failed" state, repeater 522 remains in the "active" state. Repeater 522 conveys, as both its own output and as the overall output of double-tap gesture recognizer 520, its current "active" state and the third spatial event ("spatial event₃") received from tap gesture recognizer 524b.

Figure 5L:
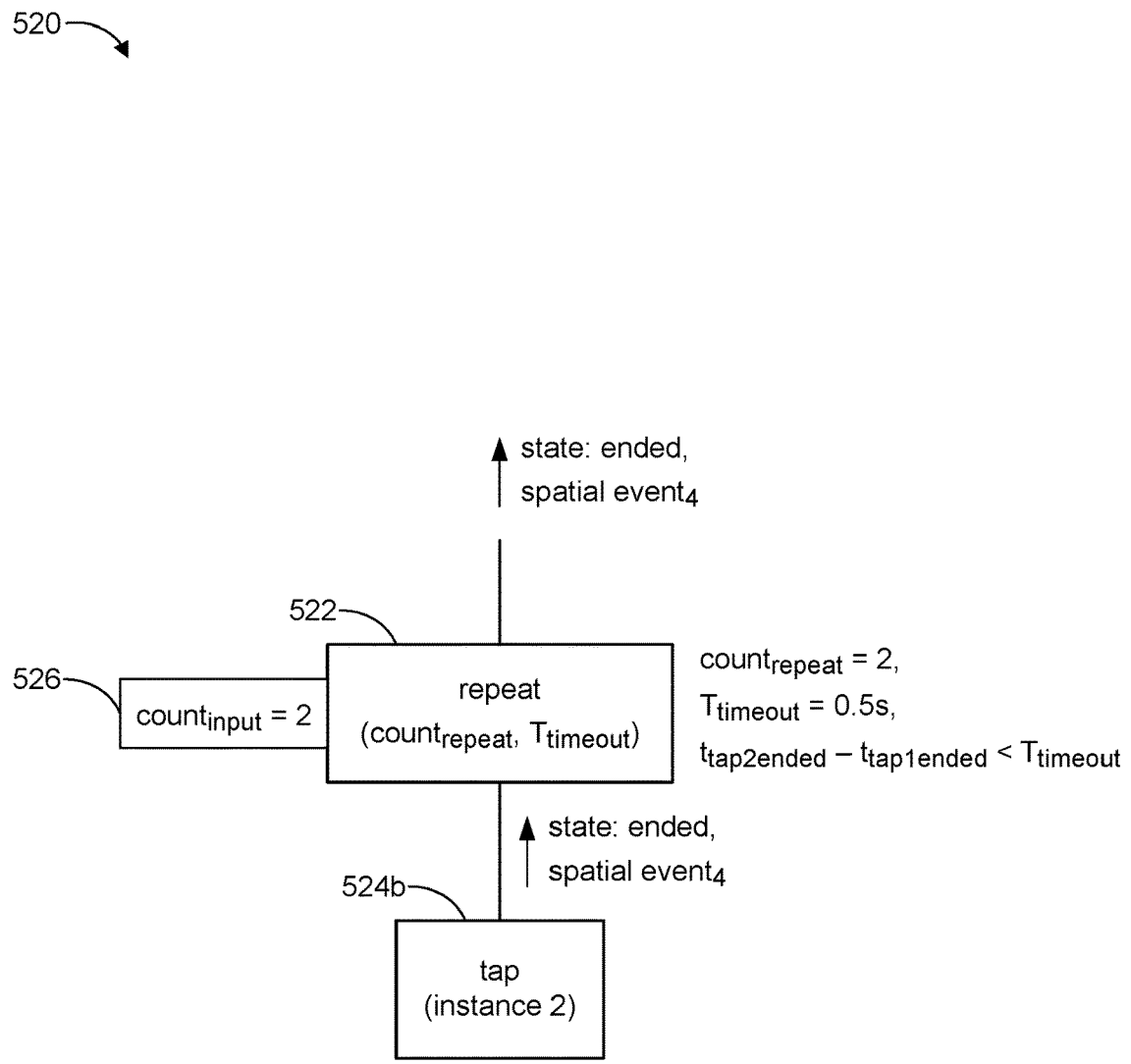

FIG. 5L illustrates the results of processing a fourth input event ("event₄") that has been received at double-tap gesture recognizer 520 and that is associated with liftoff of the second touch input described with respect to FIGS. 5J-5K. The fourth input event is received after the third input event has been received and processed (e.g., as described herein with respect to FIGS. 5J-5K). The fourth input event has been determined to be a spatial event ("spatial event₄") similar to the third input event, except that the fourth input event has a phase value of "touch end." As shown in FIG. 5L, tap gesture recognizer 524b has processed the fourth input event (e.g., as described herein with reference to FIG. 5D) and recognized the second touch input as a second tap gesture. Tap gesture recognizer 524b accordingly has transitioned to the "ended" state and has conveyed its current "ended" state and the fourth input event to repeater 522. In accordance with tap gesture recognizer 524b successfully recognizing a second tap gesture, repeater 522 increases input count value 526 to a value of two.

In addition, the amount of time that has elapsed from the end of the first tap gesture ("$t_{tap1ended}$") to the end of the second tap gesture ("$t_{tap2ended}$") is less than the predefined timeout period ("$T_{timeout}$"). Because the timing requirement remains satisfied, and because tap gesture recognizer 524b has transitioned to the "ended" state, repeater 522 transitions to the "ended" state. Repeater conveys, as both its own output and as the overall output of double-tap gesture recognizer 520, its current "ended" state and the fourth spatial event ("spatial event₄") received from tap gesture recognizer 524b. The outputting of the "ended" state by repeater 522 indicates that double-tap gesture recognizer 520 has successfully recognized a double-tap gesture.

In some embodiments, if either instance of tap gesture recognizer 524 were to have transitioned to the "failed" state, repeater 522 would have transitioned to the "failed" state, and no double-tap gesture would have been recognized. Furthermore, if the end of a second tap gesture had not been received before the predefined timeout period ("$T_{timeout}$") had elapsed since the first recognized tap gesture, repeater 522 would have transitioned to the "failed" state, and no double-tap gesture would have been recognized.

Figure 5M:
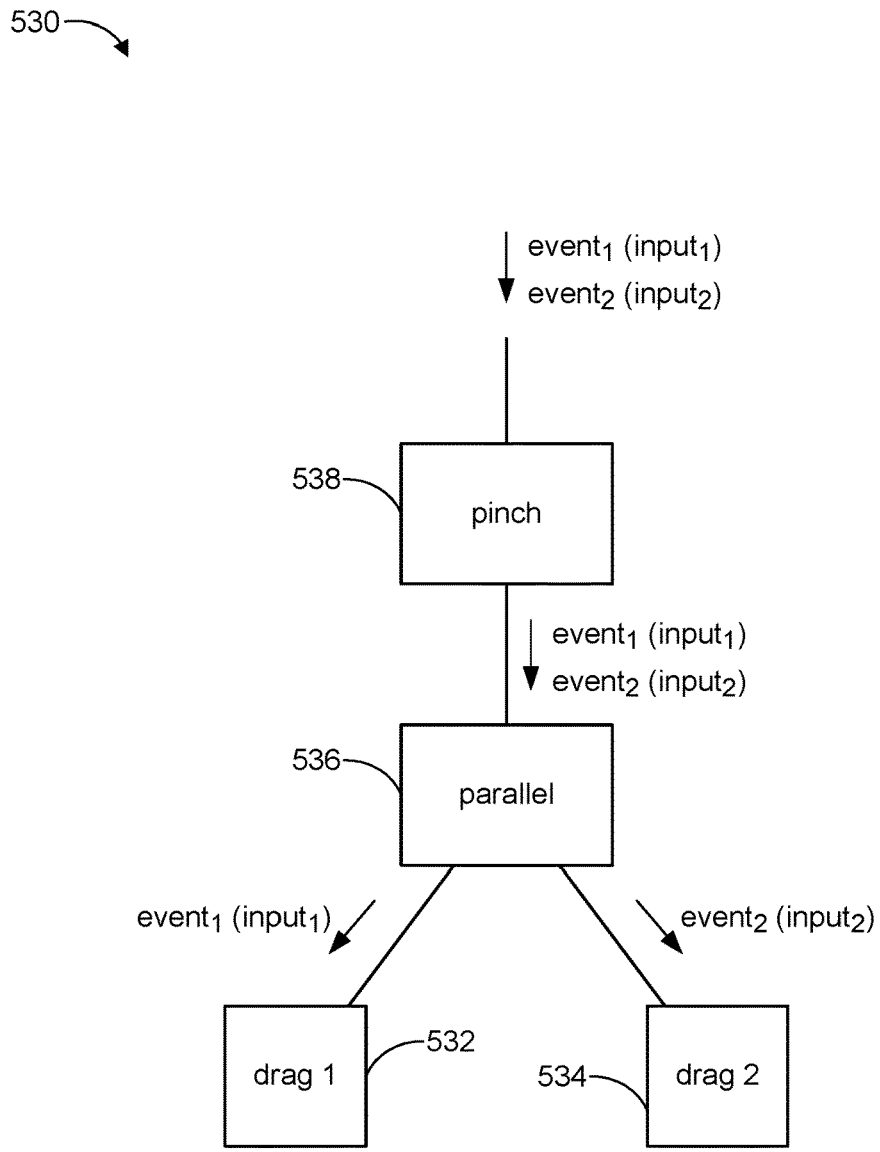
Figure 5N:
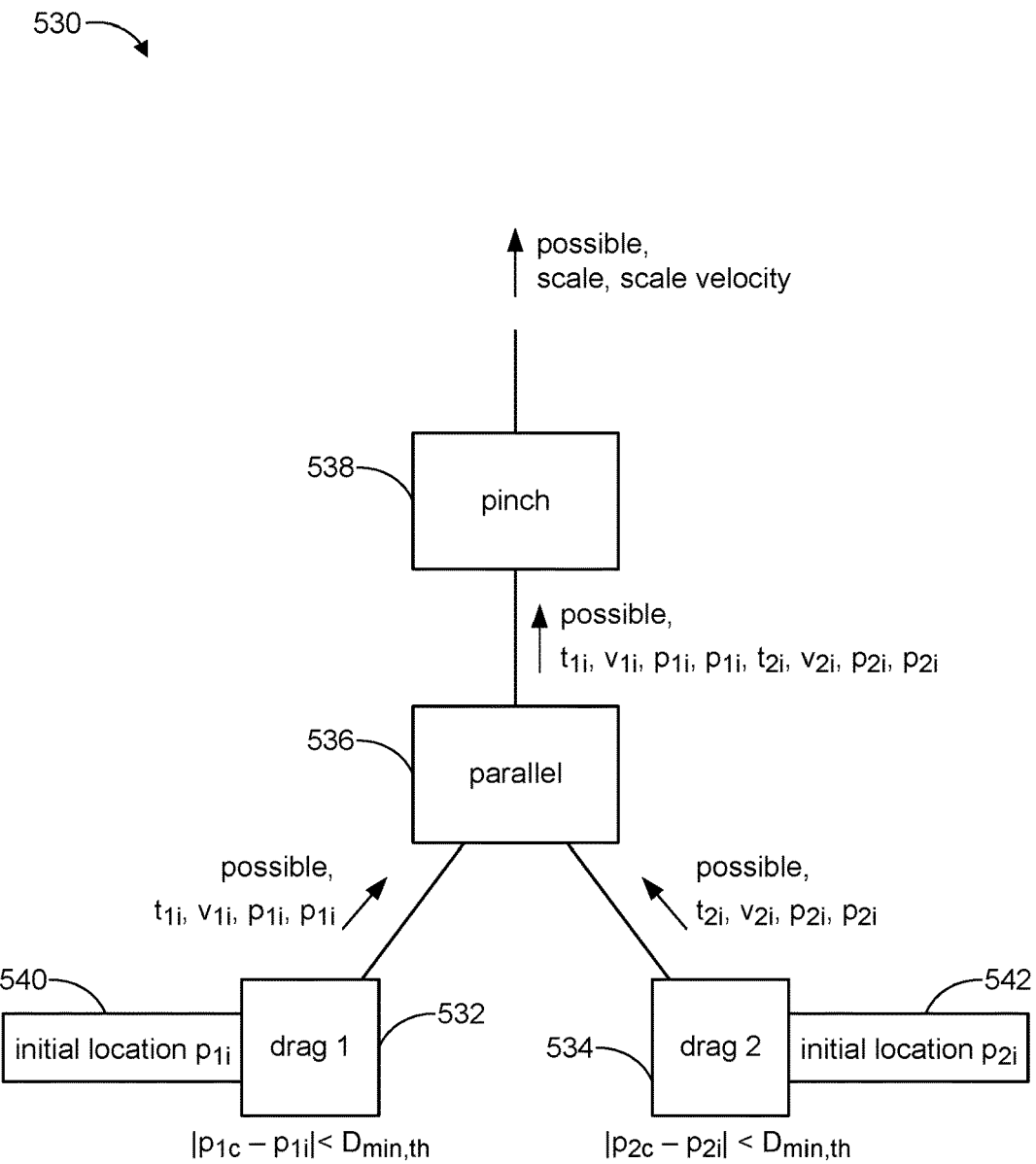
Figure 5O:
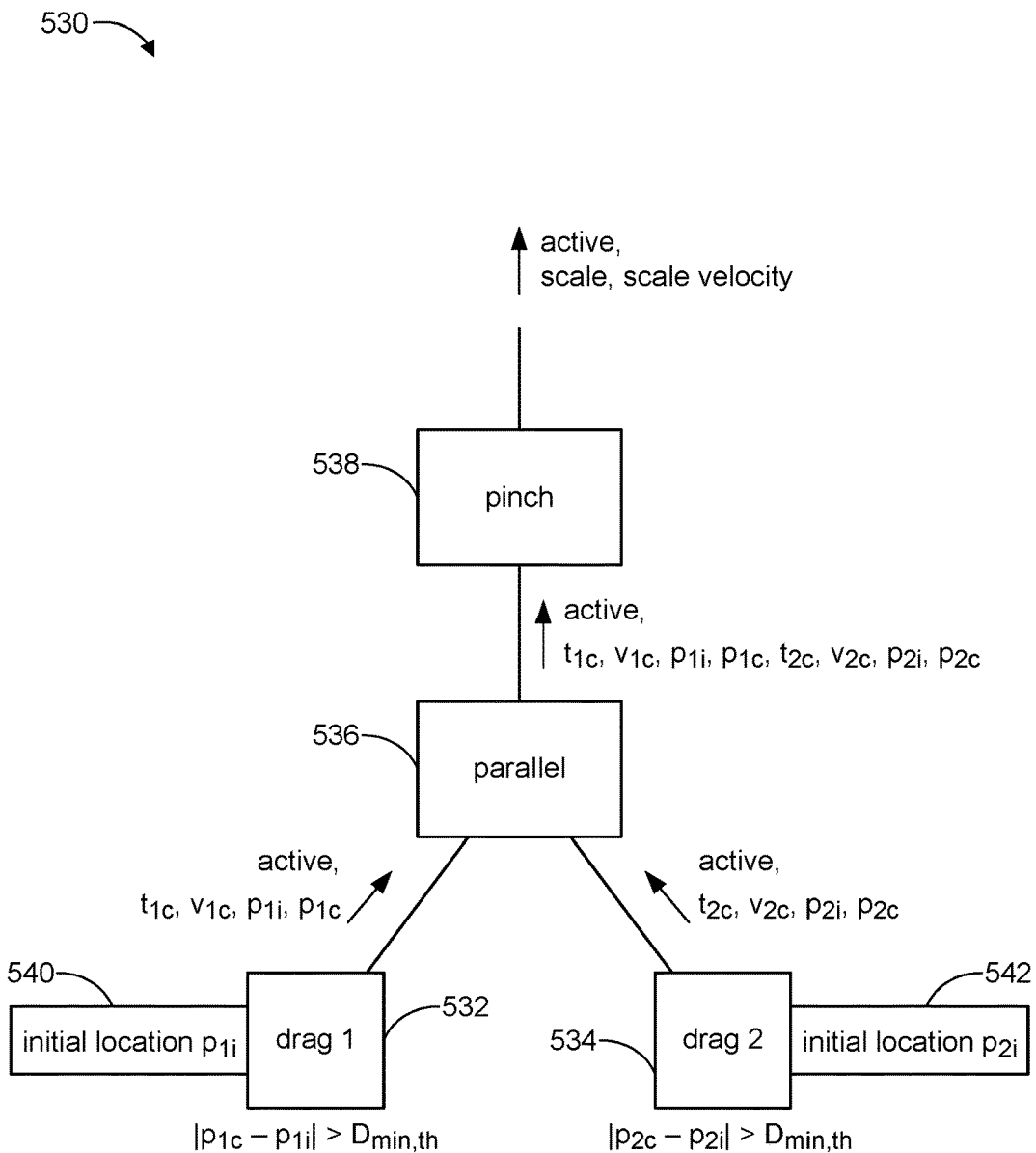
Figure 5P:
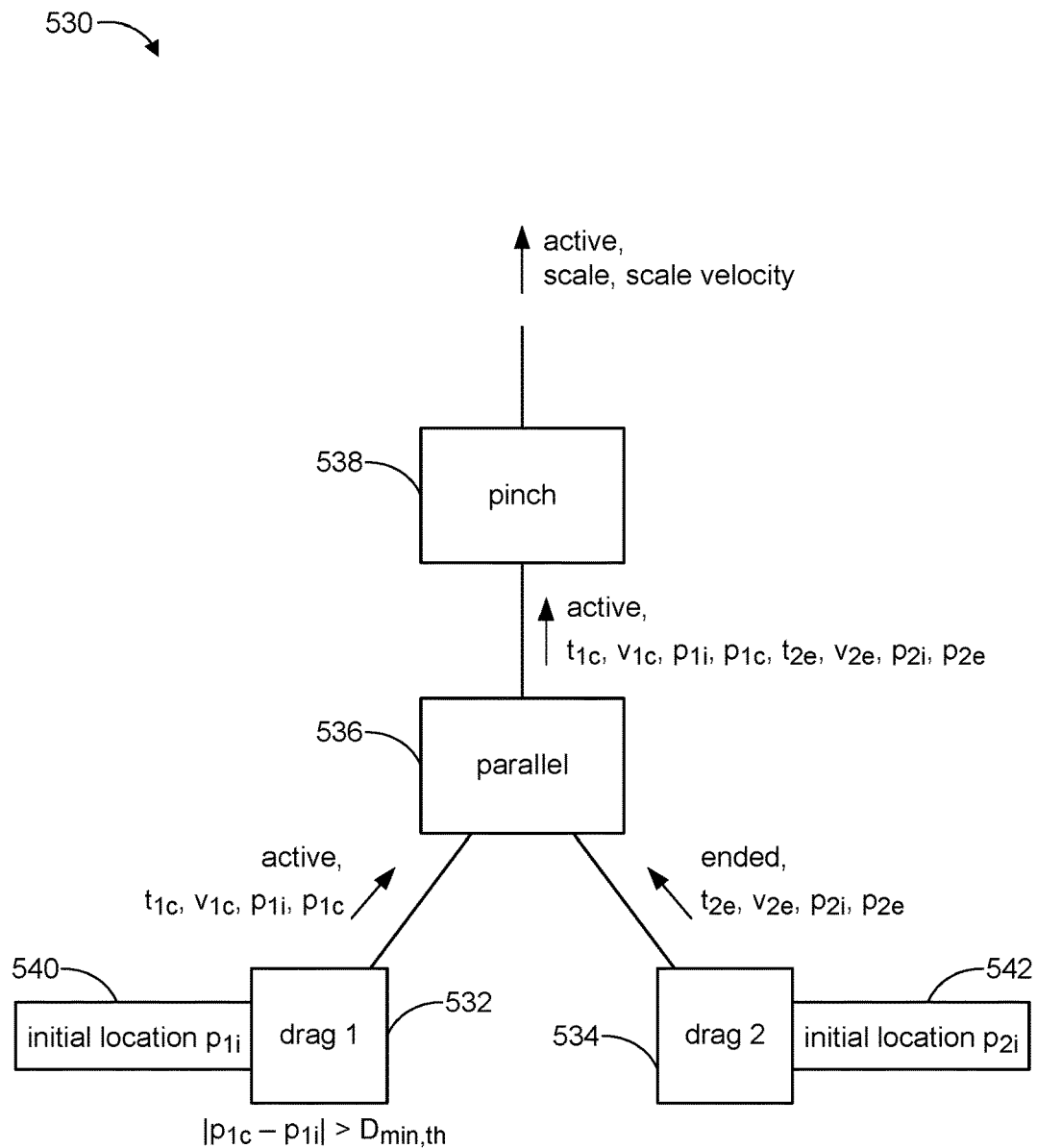
Figure 5Q:
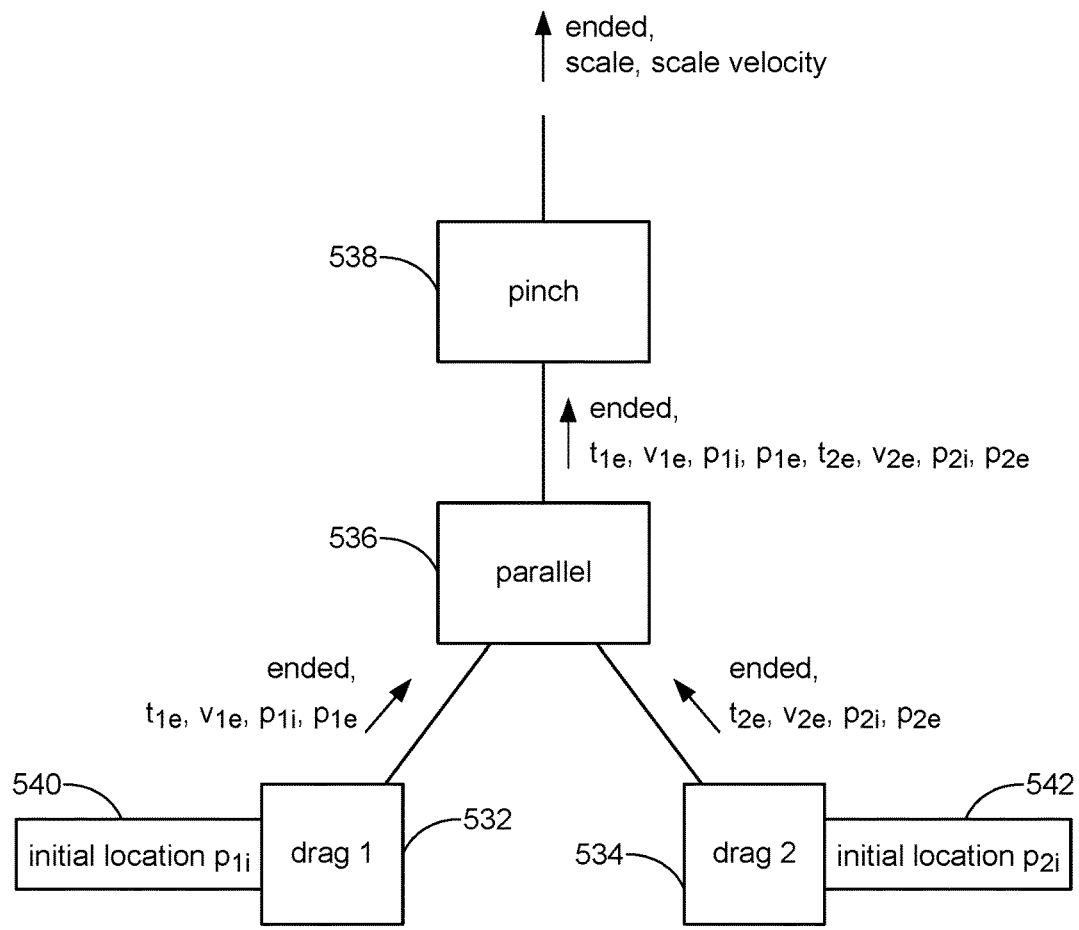
Figure 6A:
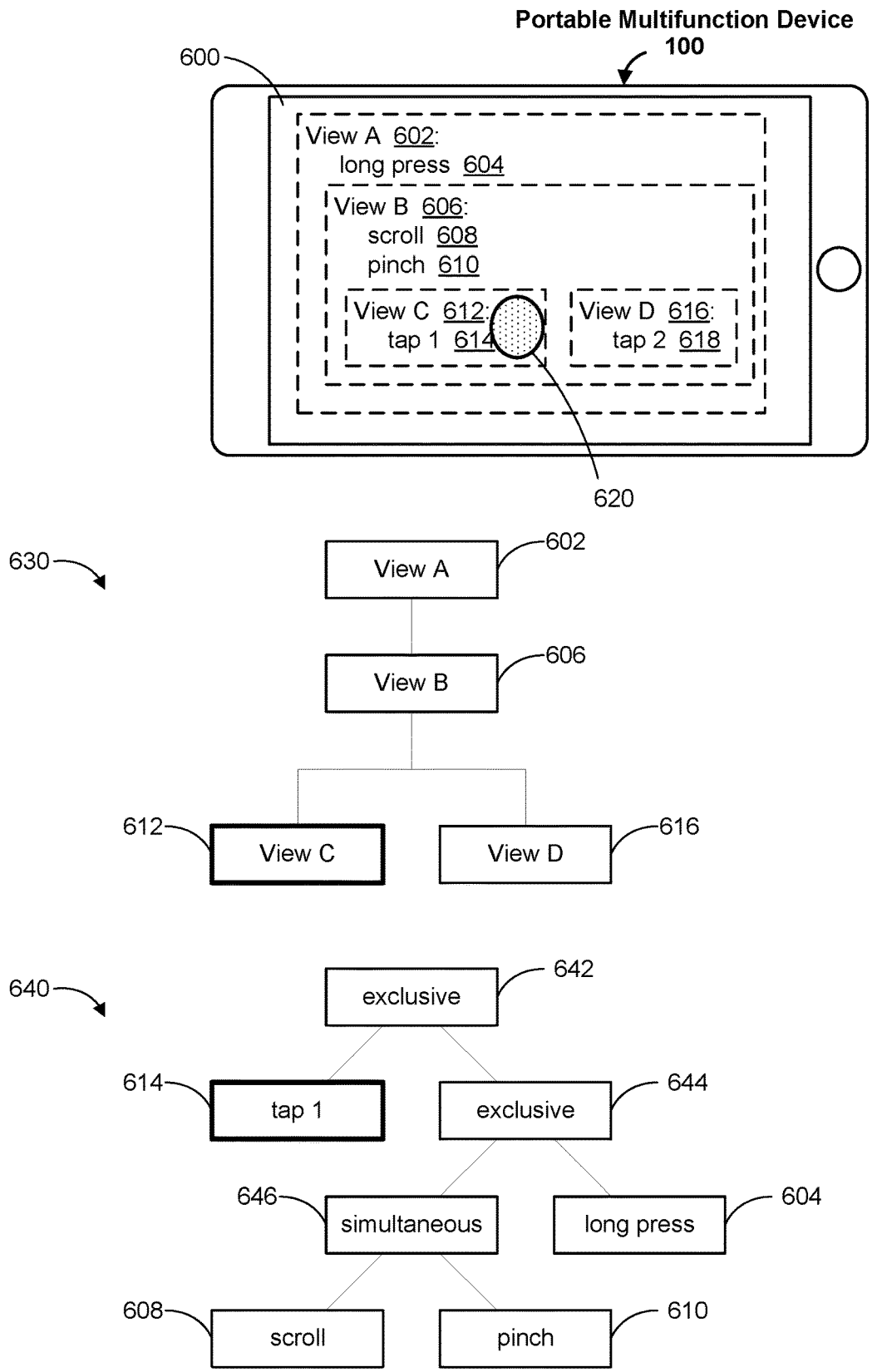
FIGS. 6A-6C illustrate examples of gesture recognition hierarchies generated from view hierarchies of views in a user interface in accordance with some embodiments.
Figure 6B:
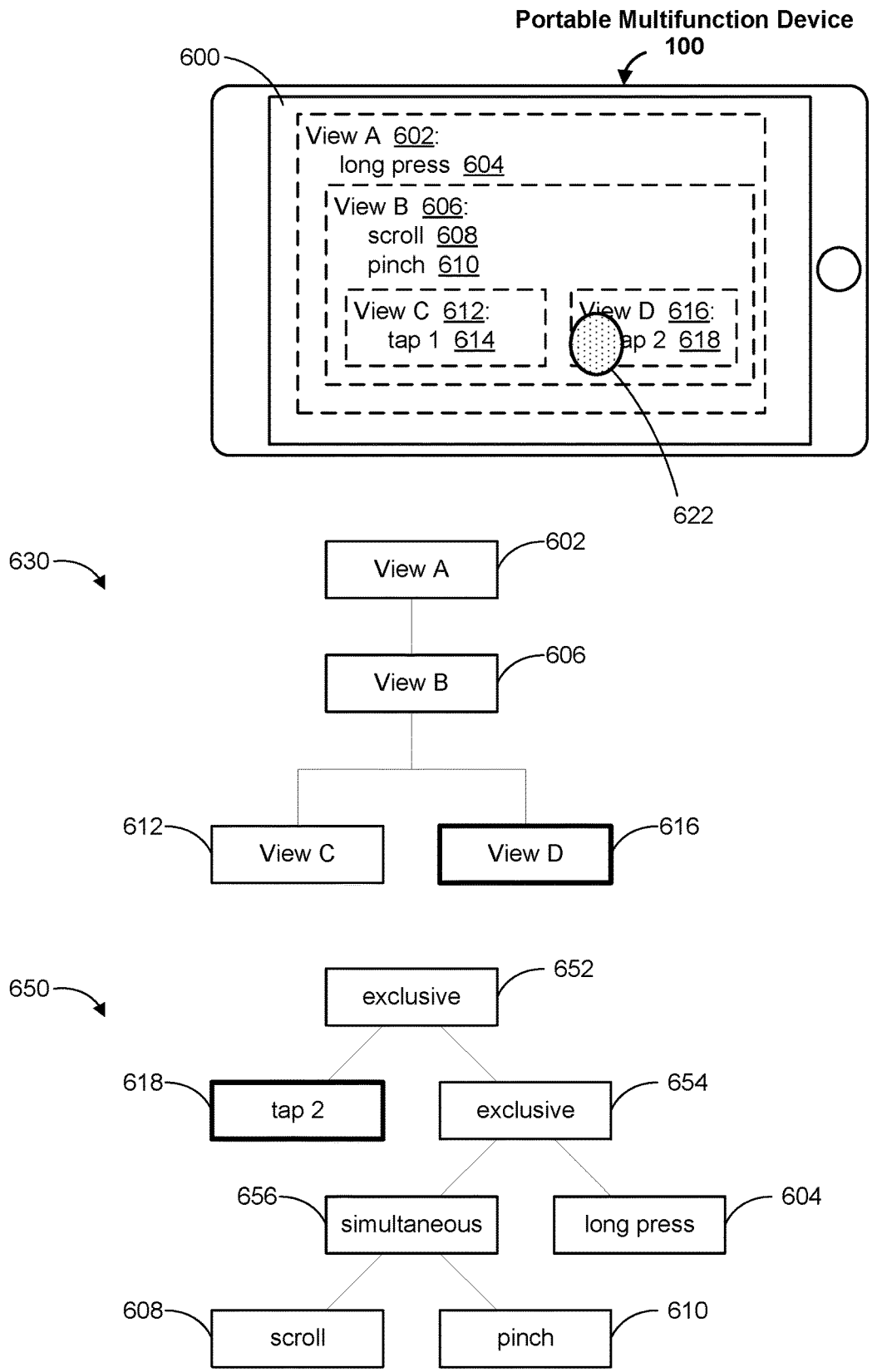
Figure 6C:
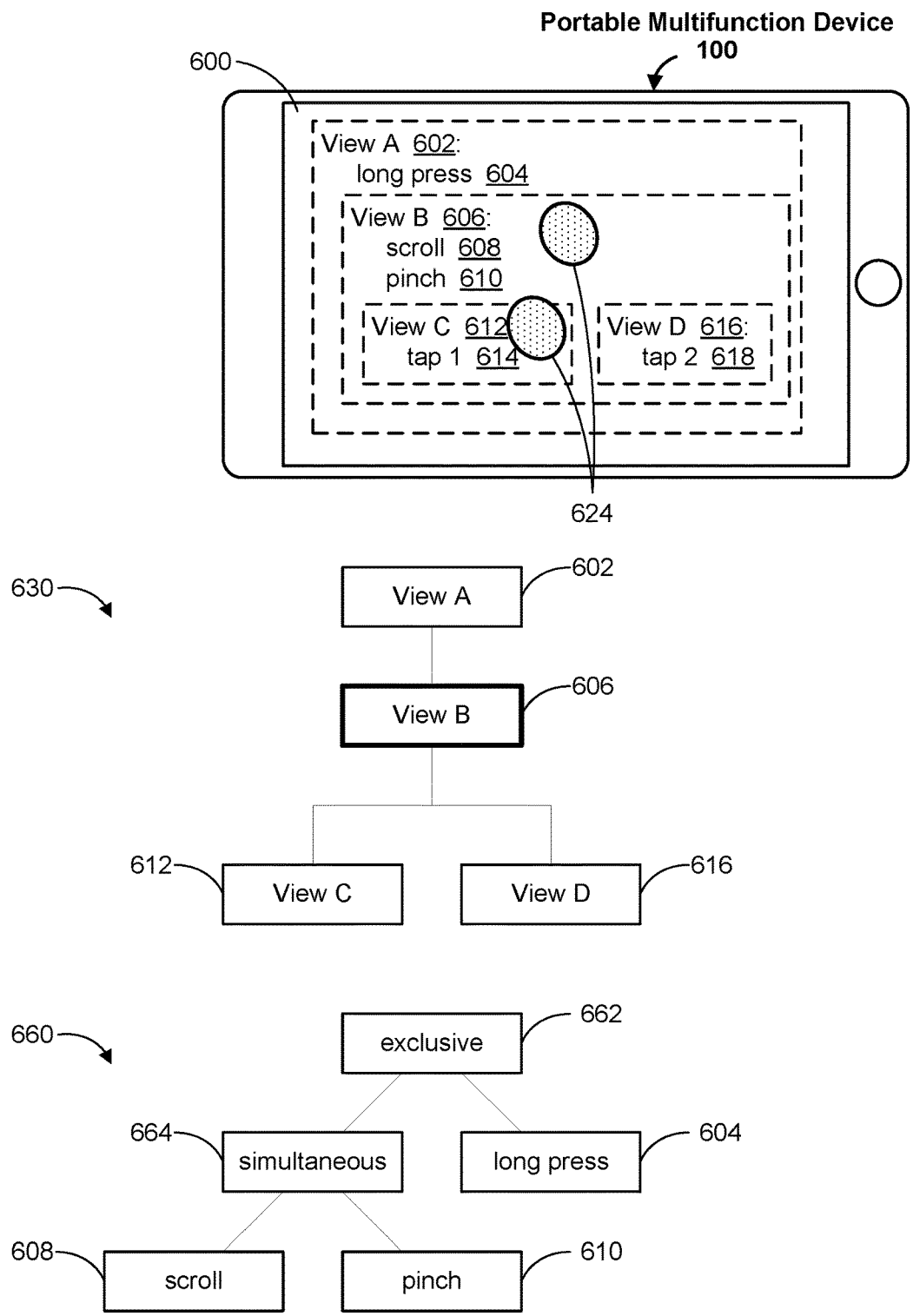
Figure 7A:
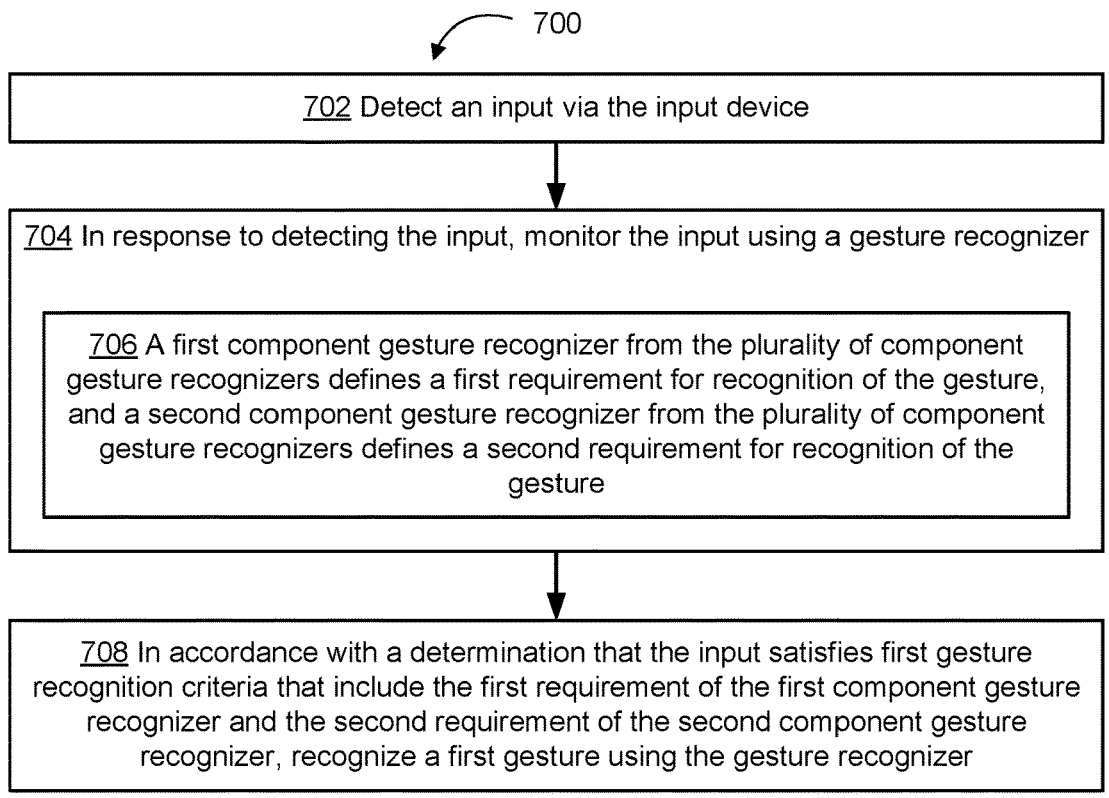

FIGS. 5M-5Q illustrate an example (two-input) pinch gesture recognizer 530 and its operation while processing inputs. In some embodiments, pinch gesture recognizer 530, or an instance thereof, is included in a particular view of a user interface, and is used to recognize two-input pinch gestures performed using touch inputs in the particular view of the user interface. FIG. 5M shows that pinch gesture recognizer 530 includes a plurality of component gesture recognizer that define requirements for a pinch gesture, including:

a first drag component ("drag 1") 532, which requires that the location of a touch input received on the touch-sensitive surface be known by monitoring for input events that include location information, similar to a spatial event listener, except that a drag component also monitors an amount of movement of a touch input; and a second drag component ("drag 2") 534, which behaves similarly to first drag component 532 but is a distinct drag component (or a distinct instance of a drag component) from first drag component 532.

Pinch gesture recognizer 530 also includes a parallel combiner 536. Parallel combiner 536 controls the conveyance of input events to first drag component 532 and second drag component 534. Specifically, parallel combiner assigns a different touch input to each drag component such that each drag component receives and processes input events only for its assigned touch input. The state of parallel combiner 536 is dependent on the respective states of the drag components, and the output values of parallel combiner 536 are the output values of the drag components, as described in more detail herein.

In addition, pinch gesture recognizer 530 includes a pinch component 538. Pinch component 536 determines a scale (e.g., which is used to control a scale of a displayed user interface or user interface element when a pinch gesture is detected), and optionally a scale velocity (e.g., which is used to continue to adjust the scale of the user interface or user interface element after a detected pinch gesture has ended).

FIG. 5M further illustrates receipt of two input events at pinch gesture recognizer 530 (e.g., from event dispatcher module 174) in response to multiple touch inputs being received at the device. Specifically, pinch gesture recognizer 530 receives a first input event ("event$_1$") in response to a first received touch input ("input$_1$") and a second input event ("event$_2$") in response to a second received touch input ("input$_2$"). Pinch component 538, which is the root node of pinch gesture recognizer 530, receives the input events and conveys both input events to parallel combiner 536. Parallel combiner 536 assigns the first touch input to first drag component 532 and conveys the first input event for the first touch input to first drag component 532. In addition, parallel combiner 536 assigns the second touch input to second drag component 532 and conveys the second input event for the second touch input to second drag component 532.

FIG. 5N illustrates the results of processing the input events shown in FIG. 5M by the component gesture recognizers in pinch gesture recognizer 530. In the example shown in FIG. 5N, the first input event is a spatial event that describes the first touch input, which is a newly-received touch input (e.g., the first input event has a phase value of "touch begin"). First drag component 532 has identified and stored the initial location 540 ("$p_{1i}$") of the first touch input. In addition, first drag component 532 monitors the amount of movement of the first touch input across the touch-sensitive surface by determining a distance between the current location ("$p_{1c}$") of the first touch input and the initial location ("$p_{1i}$") of the first touch input. At initial detection of the first touch input, when the current location ("$p_{1c}$") is equal to the initial location ("$p_{1i}$"), the touch input has not yet moved across the touch-sensitive surface, so the amount of movement ("$|p_{1c}-p_{1i}|$") is zero. Because the amount of movement is less than the minimum threshold amount ("$D_{min,th}$"), first drag component 532 is in the "possible" state to indicate that drag behavior (e.g., including movement of the input) may occur but has not yet been detected. In some embodiments, the "possible" state is an available state for a gesture recognition component that requires a minimum threshold amount of movement of the touch input. Such a component remains in the "possible" state while an input continues to be detected and before the detected input has moved by the minimum threshold amount (e.g., for subsequent input events having phase values of "touch stationary"), and transitions to the "active" state when the detected input has moved by the minimum threshold amount (subject to other requirements of the component, if any, also being satisfied).

First drag component 532 conveys, to parallel combiner 536, the current "possible" state of first drag component 532 and a plurality of values identified from (or determined based on information in) the first input event, including an initial timestamp of the first touch input ("$t_{1i}$"), an instantaneous velocity of the first touch input ("$v_{1i}$"), an initial location of the first touch input ("$p_{1i}$"), and a current location of the first touch input ("$p_{1i}$" at initial detection of the first touch input).

Similarly, the second input event is also a spatial event that describes an ongoing touch input. Second drag component has identified and stored the initial location 542 ("$p_{2i}$") of the second touch input. Because the amount of movement of the second touch input ("$|p_{2c}-p_{2i}|$") is less than the minimum threshold amount ("$D_{min,th}$"), second drag component 534 is in the "possible" state. Second drag component 534 conveys, to parallel combiner 536, the current "possible" state of second drag component 532 and a plurality of values identified from (or determined based on information in) the second input event, including an initial timestamp of the second touch input ("$t_{2i}$"), an instantaneous velocity of the second touch input ("$v_{2i}$"), an initial location of the second touch input ("$p_{2i}$"), and a current location of the second touch input ("$p_{2i}$" at initial detection of the second touch input).

Parallel combiner 536 receives the "possible" states and values from first drag component 532 and second drag component 534. Because both drag components are in the "possible" state, parallel combiner 536 is also in the "possible" state. Parallel combiner 536 conveys its current "possible" state and all of the values received from first drag component 532 and second drag component 534 to pinch component 538. In some embodiments, parallel combiner 536 receives from each drag component an array of the values from that drag component. In some embodiments, parallel combiner 536 combines the received arrays into a larger array that includes all of the values received from the drag components.

Pinch component 538 receives the "possible" state and values from parallel combiner 536. Because parallel combiner 536 is in the "possible" state, pinch component 538 is also in the "possible" state. Pinch component 538 determines and conveys a scale value, and optionally a scale velocity, based on the values received from parallel combiner 536 (e.g., based on the locations of each touch input relative to their initial positions). Because pinch component 538 is the root node of pinch gesture recognizer 530, the overall state of pinch gesture recognizer 530 is the "possible" state, and the overall output values of pinch gesture recognizer 530 are those of pinch component 538.

FIG. 5O illustrates an example of successful recognition of a pinch gesture. In particular, FIG. 5O illustrates the results of processing a second pair of input events that are received after the first and second input events described with respect to FIGS. 5M-5N. The second pair of input events include a third input event that is associated with the first touch input being maintained on and moved across the touch-sensitive surface by at least the minimum threshold distance and a fourth input event that is associated with the second touch input being maintained on and moved across the touch-sensitive surface by at least the minimum threshold distance. In the example illustrated in FIG. 5O, the third and fourth input events are spatial events with phase values of "touch movement." First drag component 532 has identified the third input event as a spatial event for the ongoing first touch input (as indicated by the "touch movement" phase value) and has determined that the amount of movement of the first touch input ("$p_{1c}$-$p_{1i}$") is greater than the minimum threshold amount ("$D_{min,th}$"). Accordingly, first drag component 532 has transitioned to the "active" state. First drag component 532 conveys, to parallel combiner 536, the current "active" state of first drag component 532 and values identified from (or determined based on information in) the third input event, including a current timestamp of the first touch input ("$t_{1c}$"), a current instantaneous velocity of the first touch input ("$v_{1c}$"), the initial location of the first touch input ("$p_{1i}$"), and a current location of the first touch input ("$p_{1c}$").

Similarly, second drag component 534 has identified the fourth input event as a spatial event for the ongoing second touch input (as indicated by the "touch movement" phase value) and has determined that the amount of movement of the second touch input ("$p_{2c}$-$p_{2i}$") is greater than the minimum threshold amount ("$D_{min,th}$"). Accordingly, second drag component 534 has transitioned to the "active" state. Second drag component 534 conveys, to parallel combiner 536, the current "active" state of second drag component 534 and values identified from (or determined based on information in) the fourth input event, including a current timestamp of the second touch input ("$t_{2c}$"), a current instantaneous velocity of the second touch input ("$v_{2c}$"), the initial location of the second touch input ("$p_{2i}$"), and a current location of the second touch input ("$p_{2c}$").

Because both drag components have transitioned to the "active" state, parallel combiner 536 has also transitioned to the "active" state. In some embodiments, a pinch gesture can be performed by moving only one touch input while the other touch input remains stationary. Accordingly, in some embodiments, parallel combiner 536 transitions to the "active" state in response to at least one of its child drag components transitioning to the "active" state (e.g., even while the other child drag component remains in the "possible" state). In FIG. 5O, parallel combiner 536 conveys its current "active" state and all of the values received from first drag component 532 and second drag component 534 to pinch component 538.

Because parallel combiner 536 is in the "active" state, pinch component 538 is also in the "active" state. Pinch component 538 determines and conveys a (current) scale value, and optionally a (current) scale velocity, based on the values received from parallel combiner 536 (e.g., based on the current locations of each touch input relative to their initial positions). Accordingly, the overall state of pinch gesture recognizer 530 is the "active" state, and the overall output values of pinch gesture recognizer 530 are those of pinch component 538.

FIG. 5P illustrates an example of continued successful recognition of the pinch gesture recognized in FIG. 5O. In particular, FIG. 5P illustrates the results of processing a third pair of input events that are received after the second pair of input events described with respect to FIG. 5O. The third pair of input events include a spatial event that is associated with the first touch input being maintained on the touch-sensitive surface at a location that is least the minimum threshold distance from its initial location and a spatial event that is associated with liftoff of the second touch input from the touch-sensitive surface (e.g., having a phase value of "touch end"). Accordingly, first drag component 532 remains in the "active" and conveys, to parallel combiner 536, the current "active" state and the associated values as described with respect to FIG. 5O.

Second drag component 534 has identified the spatial event as being associated with a completed touch input (as indicated by the "touch end" phase value") and accordingly has transitioned to the "ended" state. Second drag component 534 conveys its current "ended" state and the associated values identified from (or determined based on information in) the "touch ended" input event, including an ending timestamp of the second touch input ("$t_{2e}$"), an instantaneous velocity of the second touch input at the time of liftoff ("$v_{2e}$"), the initial location of the second touch input ("$p_{2i}$"), and the ending location of the second touch input at the time of liftoff ("$p_{2e}$").

In some embodiments, the pinch gesture recognizer remains in the "active" state as long as one touch input remains "active" even if the other touch input has "ended." That is, a pinch gesture recognizer that is "active" while a user performs a pinch gesture using two fingers in contact with a touch-sensitive surface remains "active" even after the user lifts one finger from the touch-sensitive surface as long as the other finger is maintained on the touch-sensitive surface. The user may place the lifted finger back down on the touch-sensitive surface to resume the pinch gesture. Accordingly, although second drag component 534 has transitioned to the "ended" state in FIG. 5P, parallel combiner 536 remains in the "active" state. Parallel combiner 536 conveys its current "active" state and all of the values received from first drag component 532 and second drag component 534 to pinch component 538.

Because parallel combiner 536 remains in the "active" state, pinch component 538 also remains in the "active" state, and determines and conveys a (current) scale value, and optionally a (current) scale velocity, based on the values received from parallel combiner 536. Accordingly, the overall state of pinch gesture recognizer 530 remains in the "active" state, and the overall output values of pinch gesture recognizer 530 are those of pinch component 538.

FIG. 5Q illustrates an example of completion of the pinch gesture recognized in FIGS. 5O-5P. In particular, FIG. 5Q illustrates the results of processing an additional input event that is received after the third pair of input events described with respect to FIG. 5 and that is associated with liftoff of the first touch input from the touch-sensitive surface (e.g., having a phase value of "touch end"). Accordingly, first drag component 534 has transitioned to the "ended" state. First drag component 534 conveys its current "ended" state and the associated values identified from (or determined based on information in) the "touch ended" input event, including an ending timestamp of the first touch input ("$t_{1e}$"), an instantaneous velocity of the first touch input at the time of liftoff ("$v_{1e}$"), the initial location of the first touch input ("$p_{1i}$"), and the ending location of the first touch input at the time of liftoff ("$p_{1e}$").

Because both drag components have transitioned to the "ended" state, parallel combiner 536 has also transitioned to the "ended" state. Parallel combiner 536 conveys its current "ended" state and all of the values received from first drag component 532 and second drag component 534 to pinch component 538. Accordingly, the overall state of pinch gesture recognizer 530 is the "ended" state, indicating that a pinch gesture has been recognized and has ended, and the overall output values of pinch gesture recognizer 530 are those of pinch component 538. The scale velocity is optionally used to continue to adjust the scale of the user interface or user interface element to which the pinch gesture was directed even after the pinch gesture has ended.

In some embodiments, a respective view of a user interface includes a rotation gesture recognizer having the same component gesture recognizers as the pinch gesture recognizer 530 described above, except that the pinch component 538 is replaced with a rotation component (not shown). Furthermore, operation of the rotation gesture recognizer and its component recognizers are the same as that described above for pinch gesture recognizer 530, except that the rotation component determines an angle, or rotation amount, and optionally an angular or rotation velocity, in accordance with the position values and optionally the velocity values received from the parallel component 536, when at least one of the drag components 532 of the rotation gesture recognizer is in the active state.

FIG. 6A-6C illustrate examples of gesture recognition hierarchies generated from a view hierarchy of views in a user interface based on received inputs.

FIG. 6A shows device 100 displaying user interface 600. User interface 600 includes a plurality of views 602 (labeled "View A"), 606 (labeled "View B"), 612 (labeled "View C"), and 616 (labeled "View D"). View 602 is the highest view in view hierarchy 630 and includes long press gesture recognizer 604. View 606 is a child view of view 602 in view hierarchy 630 and includes scroll gesture recognizer 608 and pinch gesture recognizer 610 (e.g., similar to pinch gesture recognizer 530, FIG. 5M). View 612 is a first child view of view 606 in view hierarchy 630 and includes a first tap gesture recognizer 614 (e.g., similar to tap gesture recognizer 500, FIG. 5A). View 616 is a second child view of view 606 in view hierarchy 630 and includes a second tap gesture recognizer 618 (e.g., similar to tap gesture recognizer 500, FIG. 5A). In some embodiments, second tap gesture recognizer 618 includes instances of the same component gesture recognizers are and first tap gesture recognizer 614, and thus those component gesture recognizers are reused two or more times in concurrently instantiated gesture recognizers. More generally, in some embodiments, two or more instances of a respective (or first) component gesture recognizer are included in concurrently instantiated gesture recognizers; and in some embodiments, two or more instances of each of a plurality of component gesture recognizers are included in concurrently instantiated gesture recognizers (e.g., in the gesture recognition hierarchy, discussed below, for a respective user interface 600).

FIG. 6A further illustrates a touch input 620 received at device 100. Device 100 (e.g., using hit view determination module 172) determines that view 612 is the hit view for touch input 620 (e.g., view 612 is the lowest view in view hierarchy 630 in which touch input 620 has occurred, and thus should receive priority for handling input events associated with touch input 620). Accordingly, view 612 is highlighted in view hierarchy 630. In some embodiments, the gesture recognizers 604, 608, 610, 614, and 618 are created (e.g., instantiated) and executed on device 100 without regard to whether a user input has been received. In some embodiments, one or more of the gesture recognizers 604, 608, 610, 614, and 618 are created and executed on the device in response to the device receiving a user input (e.g., touch input 620).

In response to receiving touch input 620, device 100 generates gesture recognition hierarchy 640 based on view hierarchy 630. In some embodiments, as shown in FIG. 6A, the generated gesture recognition hierarchy includes only the gesture recognizers of views that correspond to the location of the touch input (e.g., the hit view and all of its predecessors in view hierarchy). Accordingly, gesture recognition hierarchy 640 includes only the gesture recognizers of hit view 612, parent view 606 of view 612, and grandparent view 602 of view 612—namely, first tap gesture recognizer 614 of hit view 612, scroll gesture recognizer 608 and pinch gesture recognizer 610 of view 606, and long press gesture recognizer 604 of view 602. In some embodiments, the generated gesture recognition hierarchy includes gesture recognizers for all views in the view hierarchy (e.g., such a gesture recognition hierarchy would also include second tap gesture recognizer 618 of view 616, which does not correspond to the location of touch input 620).

In addition, because view 612 has been determined to be the hit view, the gesture recognizer(s) of hit view 612 have the highest priority for processing touch input 620, over the gesture recognizers of other views in the view hierarchy. Accordingly, gesture recognition hierarchy 640 assigns the highest priority to first tap gesture recognizer 614 using exclusive combiner 642. An exclusive combiner defines a relationship between multiple child (component) gesture recognizers by requiring that the left-hand-side child fail in order for the right-hand-side child to succeed. For exclusive combiners with more than two children, a respective child is allowed to succeed only when every child to its left has failed. Thus, because all of the gesture recognizers in gesture recognition hierarchy 640 other than tap gesture recognizer 614 are on the right-hand-side of exclusive combiner 542, gesture recognition hierarchy requires that first tap gesture recognizer 614 fail in order for any other gesture recognizer in hierarchy 640 to succeed. It is noted that the terms "right" and "left" in this discussion are distinct but interchangeable, and similarly the terms "right-hand" and "left-hand" in the present discussion are distinct but interchangeable. More generally, in some embodiments, each distinct input position of the exclusive combiner 642 or 644 is assigned a respective priority, and the child connected to a particular input of the exclusive combiner 642 or 644 is allowed to succeed only when all the children connected to lower priority inputs of the exclusive combiner 642 or 644 have failed.

Because view 606 is the parent of the hit view (e.g., the second-lowest view in view hierarchy 630 that corresponds to touch input 620), the gesture recognizers of view 606 have the second-highest priority for processing touch input 620. Accordingly, the two gesture recognizers of view 606 (e.g., scroll gesture recognizer 608 and pinch gesture recognizer 610) both have priority, defined by exclusive combiner 644, over other gesture recognizers in gesture recognition hierarchy 640 (e.g., long press gesture recognizer 604). In some embodiments, when a single view includes multiple gesture recognizers, a combiner is used to define a priority or other relationship between the multiple gesture recognizers. In the example shown in FIG. 6A, simultaneous combiner 646 is used to define a relationship between scroll gesture recognizer 608 and pinch gesture recognizer 610 of view 606 such that scroll gesture recognizer 608 and pinch gesture recognizer 610 are allowed to succeed simultaneously.

FIG. 6B is similar to FIG. 6A, except that FIG. 6B illustrates a touch input 622 received at device 100 such that view 616 is determined to be the hit view (instead of view 612 as in FIG. 6A). Accordingly, view 616 is highlighted in view hierarchy 630. In response to receiving touch input 622, device 100 generates gesture recognition hierarchy 650 based on view hierarchy 630. Gesture recognition hierarchy 650 includes the gesture recognizers of hit view 616, parent view 606 of view 616, and grandparent view 602 of view 616—namely, second tap gesture recognizer 618 of hit view 616 (instead of first tap gesture recognizer 614 of view 612), scroll gesture recognizer 608 and pinch gesture recognizer 610 of view 606, and long press gesture recognizer 604 of view 602. Because view 616 has been determined to be the hit view, second tap gesture recognizer 618 has the highest priority for processing touch input 622 over the gesture recognizers of other views in the view hierarchy. Accordingly, gesture recognition hierarchy 650 is similar to gesture recognition hierarchy 640 (FIG. A), except that second tap gesture recognizer 618 of view 616 replaces first tap gesture recognizer 614 of view 612.

FIG. 6C is similar to FIG. 6A, except that FIG. 6C illustrates a two-contact touch input 624 received at device 100. In some embodiments, the hit view for a multiple-contact touch input is determined based on a centroid of the multiple contacts. In the example shown in FIG. 6C, the hit view determined for touch input 624 is view 606 (the view corresponding to a location that is approximately halfway between the two contacts of touch input 624). Accordingly, view 606 is highlighted in view hierarchy 630. In response to receiving touch input 624, device 100 generates gesture recognition hierarchy 660. Because view 606 has been determined to be the hit view, scroll gesture recognizer 608 and pinch gesture recognizer 610 of view 606, which are allowed by simultaneous combiner 664 to succeed simultaneously, both have the highest priority for processing touch input 624 over the gesture recognizers of other views in the view hierarchy (e.g., long press gesture recognizer 604). Accordingly, simultaneous combiner is on the left-hand-side of exclusive combiner 662, while long press gesture recognizer 604 is on the right-hand-side. In other words, gesture recognition hierarchy 660 is similar to gesture recognition hierarchy 640 (FIG. A), except that first tap gesture recognizer 614 and its associated exclusive combiner 642 are omitted.

In some embodiments, the hit view for touch input 624 is determined to be view 612, because at least one contact of touch input 624 corresponds to view 612, and because view 612 is lower than view 606. In some such embodiments, gesture recognition hierarchy 660 also includes first tap gesture recognizer 614 (e.g., the gesture recognition hierarchy is the same as gesture recognition hierarchy 640, FIG. 6A).

FIGS. 7A-7E are flow diagrams illustrating method 700 of processing inputs using gesture recognizers assembled from component gesture recognizers in accordance with some embodiments. Method 700 is performed at an electronic device (e.g., device 300, FIG. 3, or portable multi-function device 100, FIG. 1A) with an input device (e.g., touch screen 112, FIG. 1A, touchpad 355 or keyboard/mouse 350, FIG. 3), optionally a display (e.g., touch screen 112, FIG. 1A, or display 340, FIG. 3), and optionally one or more sensors to detect intensity of contacts with an input device that includes a touch-sensitive surface (e.g., contact intensity sensor(s) 165, FIG. 1A). In some embodiments, the display is a touch-screen display with a touch-sensitive surface on or integrated with the display. In some embodiments, the display is separate from the touch-sensitive surface. Some operations in method 700 are, optionally, combined and/or the order of some operations is, optionally, changed.

As described below, method 700 provides an intuitive way for an electronic device to process a detected input using a modular approach that divides a larger set of input event handling requirements into smaller subsets of event handling requirements associated with and processed using component gesture recognizers that make up a gesture recognizer, such that the smaller subsets of event handling requirements can be more quickly processed than the larger set. This modular approach increases the number, extent, and complexity of gestures that can potentially be recognized. Reusing (instances of) modules across multiple gesture recognizers provides consistency in gesture recognition capabilities. In addition, in contrast to an approach that processes inputs using monolithic gesture recognizers (i.e., gesture recognizers that are not modular), this modular approach provides design flexibility in that modules can be added to or removed from a gesture recognizer, or individual modules in a gesture recognizer can be substituted with modified versions, without requiring an entirely new monolithic gesture recognizer to be designed. The modular approach also reduces the computational load imposed on an electronic device by touch and other inputs and gestures, which in turn improves device responsiveness and reduces latency. Reducing latency in responding to inputs also reduces user mistakes when operating/interacting with the device, such as duplicative or extraneous inputs made by the user while waiting for the device to respond to the user's earlier input(s). Reducing the number and/or extent of the inputs from a user enhances the operability of the device and makes the user-device interface more efficient, which, additionally, reduces power usage and improves battery life of the device by enabling the user to use the device more quickly and efficiently.

The device detects (702) an input via the input device (e.g., a touch input on the touch-sensitive surface, a mouse input using one or more buttons of a mouse, etc.).

In response to detecting the input, the device monitors (704) the input using a gesture recognizer. The gesture recognizer includes (706) a plurality of component gesture recognizers that define requirements for recognition of a gesture (e.g., the gesture recognizer is an assembled gesture recognizer, assembled using the plurality of component gesture recognizers from a set of available component gesture recognizers). A first component gesture recognizer from the plurality of component gesture recognizers defines a first requirement for recognition of the gesture (e.g., a requirement with respect to location, contact intensity, minimum duration, maximum duration, distance (optionally with a minimum and/or maximum distance requirement), etc.), and a second component gesture recognizer from the plurality of component gesture recognizers defines a second requirement for recognition of the gesture (e.g., a requirement with respect to location, contact intensity, minimum duration, maximum duration, distance (optionally with a minimum and/or maximum distance requirement), etc.). In some embodiments, the gesture recognizer is formed (e.g., created or instantiated) in response to the input being detected. In some embodiments, the gesture recognizer is associated with a view in a plurality of views of a software application executing on the electronic device, and the gesture recognizer is formed in accordance with a determination that the location of the detected input corresponds to the view with which the gesture recognizer is associated. In some embodiments, the gesture recognizer corresponds specifically to the aforementioned view, or comprises a component of the application that responds to touch inputs in the aforementioned view. Example gesture recognizers that have been assembled from a plurality of component gesture recognizers are shown in and described herein with respect to FIGS. 5A-5Q.

In accordance with a determination that the input satisfies first gesture recognition criteria that include the first requirement of the first component gesture recognizer and the second requirement of the second component gesture recognizer, the device recognizes (708) a first gesture using the gesture recognizer. In some embodiments, the set of available component gesture recognizers include component gesture recognizers that identify input events (e.g., touch events, mouse events, etc.) having particular properties (e.g., input events that include location information and/or translation (movement) information). Examples of component gesture recognizers that identify input events include a spatial event listener (such as spatial event listener 502, FIG. 5A), a pan event listener, and a drag event listener (such as drag event listeners 532 and 534, FIG. 5M), etc.).

In some embodiments, the set of available component gesture recognizers include component gesture recognizers for determining whether particular properties of an input (e.g., current location, current timestamp, current intensity, etc., optionally in conjunction with one or more previously-determined properties such as starting location, starting timestamp, etc.) satisfy particular requirements for recognition of a gesture (e.g., a distance requirement (see discussion of distance component 506, FIG. 5A), a (timing) duration requirement (see discussion of max duration component 504, FIG. 5A), or an intensity threshold requirement, etc.). In some embodiments, the set of available component gesture recognizers include wrappers that include one or more other component gesture recognizers and whose outputs depend on the results of the included component gesture recognizer (e.g., a repeating component gesture recognizer (such as repeater 522, FIG. 5G), as described in more detail herein) and/or on the results of other gesture recognizers or component gesture recognizers having a higher priority than the included component gesture recognizer (e.g., a pausing component gesture recognizer (such as pause-for-predecessor 508, FIG. 5A), as described in more detail herein).

In some embodiments, the set of available component gesture recognizers include combiners, where a respective combiner combines results (sometimes called component gesture recognizer outputs or recognition results, or inputs to the combiner) generated by two or more component gesture recognizers and defines a requirement for recognition of a gesture based on relationship between the component gesture recognizers whose results are combined using the combiner (e.g., a gating component gesture recognizer (such as gating combiners 510 and 512, FIG. 5A), a simultaneous component gesture recognizer (such as simultaneous combiner 646, FIG. 6A), an exclusive component gesture recognizer (such as exclusive combiners 642 and 644, FIG. 6A), a sequential component gesture recognizer, or a parallel component gesture recognizer (such as parallel combiner 536, FIG. 5M), etc., as described in more detail herein).

In some embodiments, determining whether the input satisfies the first gesture recognition criteria includes: determining, using the first component gesture recognizer, whether the input satisfies the first requirement defined by the first component gesture recognizer; determining, using the second component gesture recognizer, whether the input satisfies the second requirement defined by the first component gesture recognizer; and determining whether the input satisfies the first gesture recognition criteria based on the respective determinations made using the first component gesture recognizer and the second component gesture recognizer.

In some embodiments, the first component gesture recognizer has (710) a current state of a plurality of available states (e.g., determined based on whether the input satisfies the first requirement of the first component gesture recognizer); and the second component gesture recognizer has a current state of the plurality of available states (e.g., determined based on whether the input satisfies the second requirement of the second component gesture recognizer). In some embodiments, available states for a respective component gesture recognizer include "possible," "active," "ended," and "failed." Examples of the transitions of a component gesture recognizer between the available states are shown in and described herein with respect to FIGS. 5A-5Q. Having separate states for different component gesture recognizers comports with modular design of gesture recognizers, which simplifies event handling and reduces the computational load on the device when processing inputs. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the device determines (712) a current state (e.g., of the plurality of available states (e.g., "possible," "active," "ended," and "failed")) of the gesture recognizer based on the current state of the first component gesture recognizer and the current state of the second component gesture recognizer. In some embodiments, the overall state of the gesture recognizer is determined based on combiner rules. In one example, a gesture recognizer includes a first component gesture recognizer and a second component gesture recognizer that are associated using a gating component gesture recognizer (also called a gating combiner). In this example, the gating combiner is in a Failed state when the second component gesture recognizer is in a Failed state; and, when the second component gesture recognizer is not in a Failed state, the gating combiner passes through the state of the first component gesture recognizer (e.g., the gating combiner operates similarly to a logical AND gate). As described herein with reference to FIGS. 5A-5F, the current overall state of tap gesture recognizer 500 is determined based on the current state of gating combiner 512 (whose state is in turn determined based on other component gesture recognizers 502, 504, 506, 508, and 510 in tap gesture recognizer 500). In another example, as described herein with reference to FIG. 5G, the current overall state of double-tap gesture recognizer 520 is determined based on the current states of its component gesture recognizers 522 and 524. Determining an overall state of the gesture recognizer based on states of the component gesture recognizers comports with modular design of gesture recognizers, which simplifies event handling and reduces the computational load on the device when processing inputs. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, monitoring the input using the gesture recognizer includes (714): receiving, at the gesture recognizer, first information that describes the input at a first point in time (e.g., a touch event corresponding to the first point in time); processing the first information using the first component gesture recognizer to determine a current state of the first component gesture recognizer, of the plurality of available states, for the first point in time; and processing the first information using the second component gesture recognizer to determine a current state of the second component gesture recognizer, of the plurality of available states, for the first point in time, as described herein with reference to the results of processing of the first input event as illustrated in FIG. 5C. In some embodiments, monitoring the input using the gesture recognizer also includes receiving, at the gesture recognizer, second information that describes a change in the input at a second point in time later than the first point in time. In some embodiments, the gesture recognizer receives and processes the second information for the second point in time after the gesture recognizer has received and processed the first information. In some embodiments, monitoring the input using the gesture recognizer further includes: processing the second information using the first component gesture recognizer to determine a current state of the first component gesture recognizer, of the plurality of available states, for the second point in time (e.g., to update the state of the first component gesture recognizer from a previous state, such as its state for the first point in time); and processing the second information using the second component gesture recognizer to determine a current state of the second component gesture recognizer, of the plurality of available states, for the second point in time (e.g., to update the state of the second component gesture recognizer from a previous state, such as its state for the first point in time), as described herein with reference to the results of processing of the second, third, or fourth input events as illustrated in FIGS. 5D-5F, respectively. Monitoring an input over time using separate component gesture recognizers with states that evolve over time comports with modular design of gesture recognizers, which simplifies event handling and reduces the computational load on the device when processing inputs. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, one or more component gesture recognizers in the gesture recognizer include (716) one or more parameters (e.g., a point value that describes a location of the input, or a timestamp that describes a time associated with the input) that describe the input (e.g., initial location 516, or initial time 514, FIG. 5C). In some embodiments, monitoring the input using the gesture recognizer includes determining values of the one or more parameters using the one or more component gesture recognizers in the gesture recognizer. In some embodiments, the first gesture recognition criteria include a requirement that a respective parameter meet a respective threshold in order for the first gesture to be recognized. For example, the first gesture recognition criteria include a requirement (defined by a respective component gesture recognizer) that a distance traveled by the input (e.g., an amount of movement of a touch input across a touch-sensitive surface) meet a respective distance threshold (e.g., the input must move at least a first threshold amount, the input must not move more than a second threshold amount, or the input must move at least the first threshold amount but not more than the second threshold amount).

In some embodiments, the gesture recognizer generates/sends events to a software application in accordance with changes in the one or more parameters. In some embodiments, the gesture recognizer generates/sends one or more events to the software application prior to determining whether the input satisfies the first gesture recognition criteria. In some embodiments, a respective event of the one or more events includes a phase value corresponding to a current state of the gesture recognizer (e.g., "possible," "active," "ended," or "failed"). Using component gesture recognizers in a gesture recognizer to determine values of parameters that describe the input provides the gesture recognizer with information about the input that is needed for processing inputs, which simplifies event handling and reduces the computational load on the device when processing inputs. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the gesture recognizer is (718) a gesture recognition tree (e.g., a tree data structure) having a plurality of nodes, and each node of the gesture recognition tree includes a respective component gesture recognizer (e.g., as described herein with reference to FIGS. 5A-5Q). In some embodiments, monitoring the input using the gesture recognizer includes conveying information that describes the input at a respective point in time from component gesture recognizers at respective nodes having child nodes in the gesture recognition tree to component gesture recognizers at the child nodes in the gesture recognition tree (e.g., as described herein with reference to FIGS. 5B, 5G, 5J, and 5M). In some embodiments, a (parent) component gesture recognizer having multiple child nodes (e.g., a combiner) conveys information that describes the input (e.g., input events) to its child component gesture recognizers based on properties of the (parent) component gesture recognizer. Some combiners, such as simultaneous combiners and exclusive combiners, convey information about an input (e.g., input events) to all of their child component gesture recognizers (e.g., as described herein with reference to simultaneous combiner 646 and exclusive combiners 642 and 644, FIG. 6A). In some embodiments, a combiner (e.g., an exclusive combiner) sends a particular input event to all child component gesture recognizers of the combiner by sending the particular input event to one child at a time for processing of the input event by each child in turn.

Some combiners, such as sequential combiners and parallel combiners, convey information about an input to only a subset of their child component gesture recognizers. For example, a sequential combiner conveys respective information about an input (e.g., a respective input event) to (only) one respective child component gesture recognizer. While a respective input is detected, a sequential combiner first sends input events about the respective input to its first child. After the first child succeeds, the sequential combiner sends subsequent input events to its second child, and so on for each additional child. If any child fails, the sequential combiner fails. In another example, parallel combiners associate one or more of their child component gesture recognizers with one or more respective inputs and convey information about a respective input only to the associated child gesture recognizer. Where multiple touches are detected on a touch-sensitive surface, a first child gesture recognizer of a parallel combiner is associated with a first touch of the multiple touches, a second child gesture recognizer of the parallel combiner is associated with a second touch of the multiple touches, and so on for each touch of the multiple touches. In this example, input events describing the first touch are sent by the parallel combiner to the first child gesture recognizer (and not to the second or any other child gesture recognizers); similarly, input events describing the second touch are sent by the parallel combiner to the second child gesture recognizer (and not to the first or any other child gesture recognizers). An example of parallel combiner behavior is described herein with reference to parallel combiner 536, FIGS. 5M-5Q.

In some embodiments, monitoring the input using the gesture recognizer also includes determining states of component gesture recognizers at respective nodes in the gesture recognition tree based on the information that describes the input at the respective point in time and, in accordance with a determination that a respective node has one or more child nodes, based on respective states of respective component gesture recognizers at the one or more child nodes determined based on the information that describes the input at the respective point in time. In some embodiments, the state of a respective component gesture recognizer is further based on respective values determined using the respective component gesture recognizers at the one or more child nodes. That is, the state of a respective component gesture recognizer is determined based on one or more of: the information about the input (e.g., an input event), determined states (based on the information about the input) of its child component gesture recognizers, if any, and/or determined values of its child component gesture recognizers, if any.

Arranging component gesture recognizers in a tree structure enables an organized and orderly flow for input events to be processed, by defining relationships between the component gesture recognizers including, for example, setting priorities between component gesture recognizers, which simplifies input event handling and reduces the computational load on the device when processing inputs. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, monitoring the input using the gesture recognizer further includes (720) conveying the determined states of the component gesture recognizers at child nodes in the gesture recognition tree to component gesture recognizers at parent nodes of the child nodes in the gesture recognition tree. In some embodiments, determining whether the input satisfies the first gesture recognition criteria for recognizing the first gesture includes determining a state of the gesture recognition tree based on the determined states of the component gesture recognizers in the gesture recognition tree (e.g., as described herein with reference to FIGS. 5C-5F, 5H-5I, 5K-5L, and 5N-5Q). Determining states of parent component gesture recognizers based on states of child component gesture recognizers enables more complex input processing without increasing the amount of processing required at the parent component gesture recognizer. Dividing a larger set of processing requirements into smaller subsets of processing requirements simplifies event handling and reduces the computational load on the device when processing inputs. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, monitoring the input using the gesture recognizer includes (722) determining values of one or more component gesture recognizers at respective nodes in the gesture recognition tree based on the information that describes the input at the respective point in time. In some embodiments, the values are determined based on states and/or values of child component gesture recognizers. In some embodiments, determining a state of a respective component gesture recognizer at a respective node is further based on a determined value of a component gesture recognizer at a child node of the respective node, in accordance with a determination that the component gesture recognizer at the child node has a determined value.

For example, a component gesture recognizer that defines a threshold requirement for a parameter has a child component gesture recognizer that determines a value of the parameter, and the (parent) component gesture recognizer determines its state based on whether the determined value from the child component gesture recognizer satisfies the threshold requirement. In some embodiments, the (parent) component gesture recognizer also determines a value of a parameter, and in such cases the component gesture recognizer determines its value based on a determined value of its child component gesture recognizer (or based on respective values of two or more child component gesture recognizers). In another example, a component gesture recognizer (e.g., pinch component 538, FIG. 5N) determines a scale value based on a first location value received (directly or indirectly) from a first child component gesture recognizer (e.g., first drag component 532, FIG. 5N) and a second location value received from a second child component gesture recognizer (e.g., second drag component 534, FIG. 5N). In some embodiments, the first child component gesture recognizer is a root node of a first pan gesture recognizer, and the second child component gesture recognizer is a root node of a second pan gesture recognizer.

Determining states of parent component gesture recognizers based on information about the input (e.g., values of parameters that describe the input) determined by child component gesture recognizers enables more complex input processing without increasing the amount of processing required at the parent component gesture recognizer. Dividing a larger set of processing requirements into smaller subsets of processing requirements simplifies event handling and reduces the computational load on the device when processing inputs. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the plurality of component gesture recognizers in the gesture recognizer are (724) selected from a plurality of available component gesture recognizers that include: combiners that combine information from two or more component gesture recognizers and define requirements for recognition of a gesture based on relationships between the component gesture recognizers combined using the combiners; and input parameter recognizers that determine values of parameters that describe the input (e.g., location, timestamp, intensity) and/or define threshold requirements (e.g., lower and/or upper limits) for parameters that describe the input (e.g., threshold distance traveled by the input, threshold duration of the input, threshold contact intensity of the input). Using combiners to define and monitor relationships between component gesture recognizers, and input parameter recognizers to monitor information about the input (e.g., values of parameters that describe the input) and define threshold requirements for the input, enables more complex input processing while dividing a larger set of processing requirements into smaller subsets of processing requirements that can be more quickly processed than the larger set. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the gesture recognizer is (726) associated with an application (e.g., application 136-1, FIG. 1B), and the plurality of component gesture recognizers in the gesture recognizer are instances (e.g., application-specific instances) of respective component gesture recognizers in a plurality of available component gesture recognizers provided by an application-independent module (e.g., an application-independent library of component gesture recognizers, provided, for example, by an operating system or an application programming interface (API) on the device, such as application-independent software module 195, FIG. 1B). Providing a framework of available component gesture recognizers such that instances of the available component gesture recognizers can be used to form gesture recognizers reduces the burden on the device to support and execute different gesture recognition processes across different applications and improves consistency of gesture recognition functionality. This reduces the computational load imposed on the device, which in turn improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the gesture recognizer includes (728) a third component gesture recognizer (e.g., a combiner) that defines a third requirement for recognition of a gesture based on a relationship between the first component gesture recognizer and the second component gesture recognizer (e.g., exclusive, simultaneous, sequential, parallel, or gating combiners). In some embodiments, monitoring the input using the gesture recognizer includes monitoring the state of the first component gesture recognizer and the state of the second component gesture recognizer using the third component gesture recognizer to determine whether the first component gesture recognizer (e.g., the state of the first component gesture recognizer) and the second component gesture recognizer (e.g., the state of the second component gesture recognizer) satisfy the third requirement. In some embodiments, the first gesture recognition criteria include the third requirement that is based on the predefined relationship between the first component gesture recognizer and the second component gesture recognizer. Example combiners and their requirements/uses are described herein with reference to FIGS. 5A-5Q and 6A-6C. Using a third component gesture recognizer to define and monitor a relationship between first and second component gesture recognizers, each of which define and monitor a respective subset of event handling requirements for recognition of a gesture, increases the complexity of gestures that can potentially be recognized without increasing the computational load on the first and second component gesture recognizers. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the third component gesture recognizer is (730) an exclusive combiner, and the third requirement specifies that the first component gesture recognizer must fail in order for the second component gesture recognizer to succeed. In some embodiments, while the first component gesture recognizer is not in a failed or canceled state, a state of the third component gesture recognizer is based on a state of the first component gesture recognizer (e.g., without regard to a state of the second component gesture recognizer). In some embodiments, while the first component gesture recognizer is in a failed or canceled state, a state of the third component gesture recognizer is based on a state of the second component gesture recognizer. For example, when the first component gesture recognizer is in a state other than a failed or canceled state, the state of the third component gesture recognizer is based on the state of the first component gesture recognizer, and the third component gesture recognizer also includes an indication that the state of the third component gesture recognizer corresponds to the first component gesture recognizer. In another example, when the first component gesture recognizer is in a failed or canceled state, the state of the third component gesture recognizer is based on the state of the second component gesture recognizer, and the third component gesture recognizer also includes an indication that the state of the third component gesture recognizer corresponds to the second component gesture recognizer. Example exclusive combiners are also described herein with reference to FIGS. 6A-6C. Providing an exclusive combiner that requires its first (child) component gesture recognizer to fail in order for its second (child) component gesture recognizer to succeed allows for the assignment of different priorities to different gesture recognizers or component gesture recognizers without increasing the computational load of the gesture recognizers or component gesture recognizers to which the priorities are being assigned. This improves the variety of gestures that can be recognized while reducing the additional computational load typically imposed by monolithic gesture recognizers for increasingly diverse and complex gestures, which in turn improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the third component gesture recognizer is (732) a simultaneous combiner, and the third requirement requires, at a respective point in time, success of at least one of the first component gesture and the second component gesture recognizer in order for the third component gesture recognizer to succeed. In some embodiments, the simultaneous combiner allows both the first component gesture recognizer and the second component gesture recognizer to succeed simultaneously. For example, a simultaneous gesture recognizer that combines a tap gesture recognizer and a double-tap gesture recognizer allows the tap gesture recognizer to succeed when a tap input (e.g., an input having a duration that is less than a predefined threshold duration and an amount of movement that is less than a predefined threshold amount of movement) is recognized, and also allows the double-tap gesture recognizer to succeed when a second tap input that completes the double-tap gesture is recognized. Providing a simultaneous combiner that requires success of at least one (child) gesture recognizer or component gesture recognizer yet allows for multiple (child) gesture recognizers or component gesture recognizers to succeed improves the ability of the device to simultaneously recognize and process multiple gestures, and thus provide the user with additional control options, without requiring additional inputs or cluttering the user interface with additional displayed controls. This reduces the additional computation load typically imposed by processing multiple gestures simultaneously using monolithic gesture recognizers, which improves device responsiveness and reduces latency, and also enhances the operability of the device and makes the user-device interface more efficient (e.g., by helping the user to achieve an intended outcome and by reducing user mistakes when operating/interacting with the device).

In some embodiments, the third component gesture recognizer is a gating combiner, and the third requirement requires, at a respective point in time, success of the first component gesture and success of the second component gesture recognizer in order for the third component gesture recognizer to succeed. In other words, the gating combiner requires success of both the first component gesture recognizer and the second component gesture recognizer at least at one point in time (e.g., one component gesture recognizer may succeed before the other, but there must be at least one moment of overlap where both have succeeded) (e.g., the gating combiner operates as a logical AND gate). Example gating combiners are also described herein with reference to FIGS. 5A-5F.

In some embodiments, a respective component gesture recognizer is deemed to succeed when its respective requirement for gesture recognition is satisfied. For example, as discussed above with respect to FIGS. 5A-5F, a tap gesture recognizer requires that (a) a distance traveled by an input (e.g., an amount of movement of the input across a touch-sensitive surface) satisfy (e.g., be within) a predefined threshold distance and (b) a duration of the input (e.g., an amount of time during which the input is detected anywhere on the touch-sensitive surface) satisfy (e.g., be less than) a predefined threshold duration. In the tap gesture recognizer example, a gating combiner (e.g., gating combiner 512) is used to require that both requirements (a) and (b) are met in order for a tap gesture to be recognized. Stated another way, if the second component gesture recognizer (e.g., distance component recognizer 506) fails, the gating combiner (e.g., gating combiner 51) fails, and if the second component gesture recognizer has not failed, the gating combiner passes through as its output the state and any values output by the first component gesture recognizer (e.g., gating combiner 510).

In some embodiments, the third component gesture recognizer is a parallel combiner that requires, at a respective point in time, success of the first component gesture recognizer and success of the second component gesture. In one example, a parallel combiner is used in a pinch gesture recognizer to define a relationship between a first component gesture recognizer that is a first drag component gesture recognizer, and a second component gesture recognizer that is a second drag component gesture recognizer, each drag component gesture recognizer monitoring movement of a respective input. In the pinch gesture recognizer example, the parallel combiner requires success of the first pan gesture recognizer (e.g., based on a first touch input being detected) concurrent with success of the second pan gesture recognizer (e.g., based on a second touch input being detected concurrently with the first touch input). An example parallel combiner is described herein with reference to FIGS. 5M-5Q.

In some embodiments, the third component gesture recognizer is (734) a sequential combiner, and the third requirement requires, in order for the third component gesture recognizer to succeed, success of the first component gesture recognizer and, after the first component gesture recognizer succeeds, success of the second component gesture recognizer. In other words, the sequential combiner requires that its child component gesture recognizers succeed one after another in order for the sequential component gesture recognizer to succeed. For example, a drag gesture recognizer for recognizing a drag gesture that requires a long press followed by movement of the input may be assembled using a sequential combiner that has a long press gesture recognizer as its first child and a pan gesture recognizer as its second child. In some embodiments, success of the sequential combiner requires the later component gesture recognizer to succeed after the earlier component gesture recognizer has succeeded and ended. In some embodiments, success of the sequential combiner still occurs where the later component gesture recognizer succeeds after the earlier component gesture recognizer succeeds but before the earlier component gesture recognizer has ended. In some embodiments, the third requirement further requires that the second component gesture recognizer succeed within a predefined amount of time (e.g., a timeout period) from the end of the first component gesture recognizer.

In some embodiments, a repeating component gesture recognizer is similar to a sequential component gesture recognizer in requiring sequential success of its child gesture recognizers, except that the repeating component gesture recognizer has a single child component gesture recognizer that is reused or re-instantiated. In some embodiments, the child component gesture recognizer(s) of a repeating combiner are created sequentially (e.g., because the two child component gesture recognizers are a same type of component gesture recognizer (e.g., distinct instances of a same component gesture recognizer)). In some embodiments, a first child component gesture recognizer of the repeating combiner is created and associated with the repeating combiner, and used to process inputs and, after the first child succeeds and ends, the first child component gesture recognizer is destroyed, or removed from the gesture recognizer, and a second child component gesture recognizer (e.g., a second instance of the same type of component gesture recognizer as the first child) is created and associated with the repeating combiner, and subsequently used to process inputs.) An example repeating component gesture recognizer is described above with reference to repeater 522 in double-tap gesture recognizer 520, FIGS. 5G-5L.

Providing a sequential or repeating combiner that requires success, in turn, of multiple (child) gesture recognizers or component gesture recognizers allows for the formation of composite gestures through reuse of (or using instances of) such gesture recognizers or component gesture recognizers. This improves the variety of gestures that can be recognized while reducing the additional computation load typically imposed by monolithic gesture recognizers for increasingly diverse and complex gestures. This, in turn, improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the first requirement of the first component gesture recognizer requires (736) that values of a parameter that describes the input (e.g., any of location, distance moved, timestamp, duration, intensity) satisfy a specified threshold (e.g., the first requirement requires that the parameter value not exceed a maximum threshold, and/or the first requirement requires that the parameter value meet a minimum threshold, as described herein with reference to FIGS. 5A-5F). In some embodiments, the gesture recognizer includes a fourth component gesture recognizer that determines the values of the parameter that describes the input. In some embodiments, monitoring the input using the gesture recognizer includes monitoring the input using the fourth component gesture recognizer to determine the values of the parameter associated with the fourth component gesture recognizer, and the method includes conveying the parameter values determined using the fourth component gesture recognizer to the first component gesture recognizer for determining whether the first requirement is met. Using a component gesture recognizer that extracts particular information about an input and conveys the extracted information to another component gesture recognizer that determines whether a respective requirement for recognizing a gesture is met (e.g., based on the parameter value(s)) makes available information that is needed to process an input without increasing the computational load on the component gesture recognizer that is responsible for making the determination of whether its respective requirement is satisfied. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the gesture recognizer is (738) a tap gesture recognizer (e.g., tap gesture recognizer 500, FIG. 5A, which is described in more detail herein with respect to FIGS. 5A-5F). In some embodiments, the first component gesture recognizer is a distance component gesture recognizer that stores an initial location of the input corresponding to a point in time when the input was first detected and receives a current location of the input at a respective point in time. In some embodiments, the distance component gesture recognizer receives the current location of the input from a component gesture recognizer that identifies information about the input (e.g., an input event) that includes location information. In some embodiments, the distance component gesture recognizer extracts the current location of the input from information about the input (e.g., an input event) conveyed to the distance component gesture recognizer). In some embodiments, the first requirement defined by the first component gesture recognizer requires that a distance between the initial location of the input and the current location of the input be within a threshold distance. In some embodiments, the first component gesture recognizer determines whether the input satisfies the first requirement.

In some embodiments, the second component gesture recognizer is a (maximum) duration component gesture recognizer that stores an initial timestamp corresponding to the point in time when the input was first detected and receives a current timestamp corresponding to the respective (e.g., current) point in time. In some embodiments, the duration component gesture recognizer receives the current timestamp of the input from a component gesture recognizer that identifies information about the input (e.g., an input event) that includes timestamp information. In some embodiments, the duration component gesture recognizer extracts the current timestamp of the input from information about the input (e.g., an input event) conveyed to the duration component gesture recognizer. In some embodiments, the second requirement defined by the second component gesture recognizer requires that an amount of time between the initial timestamp and the current timestamp be within a threshold (e.g., a predefined threshold) amount of time. In some embodiments, the second component gesture recognizer determines whether the input satisfies the second requirement.

In some embodiments, the tap gesture recognizer further includes a location component gesture recognizer that determines that the input has a current location at the respective point in time (e.g., a spatial event listener). In some embodiments, the tap gesture recognizer further includes a first gating combiner that requires success of the second component gesture recognizer and success of the location component gesture recognizer in order to succeed. In some embodiments, the tap gesture recognizer further includes a second gating combiner that requires success of the first gating combiner and success of the first component gesture recognizer in order to succeed. In some embodiments, the tap gesture recognizer further includes a pausing component gesture recognizer that prevents success of the tap gesture recognizer while any other gesture recognizer or component gesture recognizer having a higher priority than the tap gesture recognizer is actively processing the input (and has not yet failed).

In some embodiments, the gesture recognizer is a double-tap gesture recognizer. In some embodiments, the double-tap gesture recognizer includes a repeating component gesture recognizer that includes a tap gesture recognizer (e.g., all of the component gesture recognizers of the tap gesture recognizer, as described herein). In some embodiments, the repeating component gesture recognizer conveys information to and receives processing results from the root node component gesture recognizer of the tap gesture recognizer. In some embodiments, a repeating component gesture recognizer requires repeated success of the included gesture recognizer or component gesture recognizer. In some embodiments, the repeating component gesture recognizer defines a number of times that the included gesture recognizer or component gesture recognizer must succeed in order for the repeating component gesture recognizer to succeed (e.g., two times, three times, four times, etc.). In some embodiments, the repeating component gesture recognizer defines a timing requirement, such as a maximum permitted delay between successes of the included gesture recognizer. In one example, the repeating component gesture recognizer in the double-tap gesture recognizer requires the included tap gesture recognizer to succeed two times; in such an example, the repeating component gesture recognizer may optionally require that the tap gesture recognizer succeed a second time within a predefined time since the tap gesture recognizer succeeded the first time.

In some embodiments, the gesture recognizer is a pan gesture recognizer, where the pan gesture recognizer includes a pan event listener (e.g., a component gesture recognizer that identifies information about the input that indicates that the input has moved (e.g., without requiring that the information about the input indicate a current location of the input)).

In some embodiments, the gesture recognizer is a long-press gesture recognizer. In some embodiments, the long-press gesture recognizer is similar to a tap gesture recognizer, except that the long-press gesture recognizer includes a minimum duration component gesture recognizer instead of a maximum duration component gesture recognizer. Specifically, in some embodiments the long-press gesture recognizer includes a location component gesture recognizer (e.g., a spatial event listener) as described herein. In some embodiments, the long-press gesture recognizer further includes a distance component gesture recognizer that stores an initial location of the input corresponding to a point in time when the input was first detected and receives a current location of the input at a respective point in time. The distance component gesture recognizer defines a requirement for recognition of a long-press gesture that a distance between the initial location of the input and the current location of the input be within a threshold distance.

In some embodiments, the long-press gesture recognizer further includes a minimum duration component gesture recognizer that stores an initial timestamp corresponding to the point in time when the input was first detected and receives a current timestamp corresponding to the respective point in time. In some embodiments, the minimum duration component gesture recognizer receives the current timestamp of the input from a component gesture recognizer that identifies information about the input that includes timestamp information. In some embodiments, the minimum duration component gesture recognizer extracts the current timestamp of the input from information about the input conveyed to the minimum duration component gesture recognizer. The minimum duration component gesture recognizer defines a requirement for recognition of a long-press gesture that an amount of time between the initial timestamp and the current timestamp be at least a threshold (e.g., a predefined threshold) amount of time.

In some embodiments, the long-press gesture recognizer includes a first gating combiner that requires success of the location gesture recognizer and success of the minimum duration component gesture recognizer in order to succeed. In some embodiments, the long-press gesture recognizer includes a second gating combiner that requires success of the first gating combiner and success of the distance component gesture recognizer in order to succeed.

In some embodiments, the gesture recognizer is a pinch gesture recognizer, where the pinch gesture recognizer includes a first drag component gesture recognizer that listens for events with location information and determines movement information based on the location information, and a second drag component gesture recognizer that listens for events with location information and determines movement information based on the location information. In some embodiments, the pinch gesture recognizer includes a parallel combiner that associates the first drag component gesture recognizer with a first input (e.g., a first contact on a touch-sensitive surface) and that associates the second drag component gesture recognizer with a second input (e.g., a second contact on the touch-sensitive surface). In some embodiments, the parallel combiner conveys information about the first input to the first drag component gesture recognizer but not the second drag component gesture recognizer, and receives state information and values of parameters that describe the first input from the first drag component gesture recognizer. In some embodiments, the parallel combiner conveys information about the second input to the second drag component gesture recognizer but not the first drag component gesture recognizer, and receives state information and values of the parameters that describe the second input from the second drag component gesture recognizer. In some embodiments, the pinch gesture recognizer includes a pinch component gesture recognizer that receives the state information and parameter values for both the first input and the second input and determines, based on the state information and parameter values, a scale value (e.g., for zooming a displayed user interface element). An example pinch gesture recognizer is illustrated in and described herein with reference to FIGS. 5M-5Q.

In some embodiments, the gesture recognizer is a rotate gesture recognizer. In some embodiments, a rotate gesture recognizer is similar to a pinch gesture recognizer, except that the rotate gesture recognizer includes a rotate component gesture recognizer instead of the pinch component gesture recognizer. In some embodiments, the rotate component gesture recognizer receives the state information and parameter values (e.g., location and movement information) for both the first input and the second input and determines, based on the state information and parameter values, an angle (e.g., for rotating a displayed user interface element) instead of a scale. Like the pinch gesture recognizer, the rotate gesture recognizer further includes a first drag component gesture recognizer that listens for events with location information and determines movement information based on the location information, a second drag component gesture recognizer that listens for events with location information and determines movement information based on the location information, and a parallel combiner that associates the first drag component gesture recognizer with a first input (e.g., a first contact on a touch-sensitive surface) and that associates the second drag component gesture recognizer with a second input (e.g., a second contact on the touch-sensitive surface).

With respect to any gesture recognizer, including any of the aforementioned example gesture recognizers, a user (e.g., an application developer) may add or remove modules to or from a gesture recognizer, or develop a modified version of any respective component gesture recognizer in the gesture recognizer and replace the respective component gesture recognizer with the modified version, so as to customize the gesture recognizer and thereby customize the requirements for recognition of a gesture by the gesture recognizer.

It should be understood that the particular order in which the operations in FIGS. 7A-7E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 700 described above with respect to FIGS. 7A-7E. For example, the inputs, states, values, user interfaces, component gesture recognizers, gesture recognizers, views, and view hierarchies described above with reference to method 700 optionally have one or more of the characteristics of the inputs, states, values, user interfaces, component gesture recognizers, gesture recognizers, views, and view hierarchies described herein with reference to other methods described herein (e.g., methods 800 and 900). For brevity, these details are not repeated here.

FIGS. 8A-8C are flow diagrams illustrating method 800 of generating gesture recognition hierarchies from view hierarchies of views in a user interface in accordance with some embodiments. Method 800 is performed at an electronic device (e.g., device 300, FIG. 3, or portable multifunction device 100, FIG. 1A) with a display (e.g., touch screen 112, FIG. 1A, or display 340, FIG. 3), an input device (e.g., touch screen 112, FIG. 1A, touchpad 355 or keyboard/mouse 350, FIG. 3), and optionally one or more sensors to detect intensity of contacts with an input device that includes a touch-sensitive surface (e.g., contact intensity sensor(s) 165, FIG. 1A). In some embodiments, the display is a touch-screen display with a touch-sensitive surface on or integrated with the display. In some embodiments, the display is separate from the touch-sensitive surface. Some operations in method 800 are, optionally, combined and/or the order of some operations is, optionally, changed.

As described below, method 800 provides an intuitive way for an electronic device to prioritize gesture recognizers to use in processing an input directed to a user interface of an application based on a view hierarchy that defines relationships between views in the user interface with which the gesture recognizers are associated. Forming a gesture recognition hierarchy between gesture recognizers based on the relationships between their associated views as defined in the view hierarchy facilitates processing inputs in a manner consistent with the displayed user interface and improves the responsiveness of the device, which in turn reduces latency. Reducing latency in responding to inputs reduces user mistakes when operating/interacting with the device, such as duplicative or extraneous inputs made by the user while waiting for the device to respond to the user's earlier input(s). Reducing the number and/or extent of the inputs from a user enhances the operability of the device and makes the user-device interface more efficient, which, additionally, reduces power usage and improves battery life of the device by enabling the user to use the device more quickly and efficiently.

The device displays (802), on the display, a user interface of an application (e.g., user interface 600, FIG. 6A). The user interface includes (804) a plurality of views (e.g., views 602, 606, 612, and 616, FIG. 6A) arranged in a view hierarchy (e.g., view hierarchy 630, FIG. 6A), which in some embodiments defines one or more relationships, such as parent-child relationships, between the plurality of views in the view hierarchy. The view hierarchy defines a first relationship (e.g., a view-hierarchy relationship) between a first view (e.g., view 612, FIG. 6A) and a second view (e.g., view 606, FIG. 6A) (e.g., the first view is a child view of the second view, the first view is a parent view of the second view, the first view and the second view are sibling views (both child views of a same parent view), etc.). The first view includes a first gesture recognizer (e.g., first tap gesture recognizer 614, FIG. 6A), and the second view includes a second gesture recognizer (e.g., scroll gesture recognizer 608, FIG. 6A).

The device detects (806), via the input device, an input (e.g., a touch input on the touch-sensitive surface) at a first location that corresponds to the displayed user interface.

The device processes (808) the input using a gesture recognition hierarchy (e.g., gesture recognition hierarchy 640) that includes the first gesture recognizer and the second gesture recognizer. A second relationship (e.g., a gesture-dependency relationship) between the first gesture recognizer and the second gesture recognizer (in the gesture recognition hierarchy) is determined based on the first relationship between the first view and the second view in the view hierarchy. In some embodiments, the gesture recognition hierarchy is formed in response to detecting an input (e.g., touch input 620), and based on a determination as to which view in the view hierarchy is the hit view (e.g., based on a determination that view 612 is the hit view). In some embodiments, the relationships between gesture recognizers in the gesture recognition hierarchy are defined based on the relationships between the views (corresponding to each gesture recognizer) in the view hierarchy with respect to the hit view, as described herein with reference to FIG. 6A.

In some embodiments, one or more views in the view hierarchy, other than the first view and the second view, include (810) respective gesture recognizers, and the gesture recognition hierarchy includes the respective gesture recognizers of the one or more other views. Specifically, in some embodiments, the view hierarchy includes a third view that includes a third gesture recognizer (e.g., view 602 that includes long press gesture recognizer 604, FIG. 6A), and the gesture recognition hierarchy includes the third gesture recognizer (e.g., gesture recognition hierarchy 640 includes long press gesture recognizer 604, FIG. 6A). In some embodiments, the gesture recognition hierarchy includes a respective gesture recognizer of a respective view in the view hierarchy without regard to whether the respective view corresponds to the first location (e.g., as described herein with reference to second tap gesture recognizer 618 of view 616, FIG. 6A). In some embodiments, the view hierarchy includes a hit view, determined based on the first location, and a set of views that are parent views of the hit view, and the gesture recognition hierarchy includes (in some embodiments only) respective gesture recognizers in the hit view and in the parent views of the hit view. In some embodiments, the gesture recognition hierarchy includes gesture recognizers of all views in the view hierarchy. Including, in the gesture recognition hierarchy, gesture recognizers of (all) other views in the view hierarchy facilitates comprehensive gesture processing that considers all possible gestures associated with a displayed user interface of an application on the device when processing inputs to the device. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the device identifies (812) a subset of views in the view hierarchy that correspond to the first location, where the identified subset includes the first view and the second view, and where the gesture recognition hierarchy includes the respective gesture recognizers of the identified subset of views (e.g., as described herein with reference to gesture recognition hierarchy 640, FIG. 6A). Specifically, in some embodiments, the view hierarchy includes a third view that includes a third gesture recognizer, where the third view does not correspond to the first location, and the gesture recognition hierarchy does not include the third gesture recognizer of the third view. In some embodiments, only gesture recognizers of views in the view hierarchy that correspond to the first location are candidates for recognizing an input detected at the first location. In some embodiments, the gesture recognition hierarchy includes gesture recognizers of views that correspond to the first location and does not include gesture recognizers of views that do not correspond to the first location. In some embodiments, views that correspond to the first location include a hit view, which is a lowest level view in the view hierarchy that corresponds to the first location and optionally, meets predefined criteria (e.g., includes at least one gesture recognizer, or includes at least one gesture recognizer capable of recognizing an input). In some embodiments, views that correspond to the first location also include one or more parent views of the hit view, and in some embodiments all parent views of the hit view. Including, in the gesture recognition hierarchy, gesture recognizers of (only) a subset of views in the view hierarchy that are associated with the location at which an input is detected facilitates gesture processing that considers gestures that are more likely to be relevant to the detected input without imposing the additional burden of considering gestures that are not associated with the location and thus less likely to be relevant to the detected input. This reduces the computational load on the device when processing inputs, which improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the view hierarchy includes (814) one or more views that do not correspond to the first location, where the one or more views include one or more gesture recognizers, and the gesture recognition hierarchy does not include the one or more gesture recognizers of the one or more views that do not correspond to the first location (e.g., as described herein with reference to second tap gesture recognizer 618 of view 616, FIG. 6A). Including, in the gesture recognition hierarchy, gesture recognizers of (only) a subset of views in the view hierarchy that are associated with the location at which an input is detected facilitates gesture processing that considers gestures that are more likely to be relevant to the detected input without imposing the additional burden of considering gestures that are not associated with the location and thus less likely to be relevant to the detected input. This reduces the computational load on the device when processing inputs, which improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the gesture recognition hierarchy (sometimes called a gesture recognition tree) includes (816) a component gesture recognizer (e.g., an exclusive combiner, such as exclusive combiner 642, FIG. 6A) that defines the second relationship between the first gesture recognizer and the second gesture recognizer by requiring that the first gesture recognizer fail in order for the second gesture recognizer to succeed. Using a separate component gesture recognizer (e.g., a combiner) to define and monitor a relationship between first and second gesture recognizers in a gesture recognition hierarchy improves the ability of an electronic device to distinguish between different gestures without increasing the computational load on the first and second gesture recognizers, which improves device responsiveness and reduces latency. In addition, using the separate component gesture recognizer reduces the need for case-by-case modification of the first and second gesture recognizers, which provides consistency in gesture recognition. These benefits enhance the operability of the device and make the user-device interface more efficient (e.g., by helping the user to achieve an intended outcome and by reducing user mistakes when operating/interacting with the device).

In some embodiments, the gesture recognition hierarchy includes (818) a component gesture recognizer that defines the second relationship between the first gesture recognizer and the second gesture recognizer in the gesture recognition hierarchy. In some embodiments, processing the input using the gesture recognition hierarchy includes: receiving, at the gesture recognition hierarchy, information that describes the input; conveying the information that describes the input to the component gesture recognizer; and conveying the information that describes the input from the component gesture recognizer to at least one of the first gesture recognizer and the second gesture recognizer based on the second relationship between the first gesture recognizer and the second gesture recognizer. In some embodiments, processing the input using the gesture recognition hierarchy also includes, in accordance with a determination that the information that describes the input is conveyed to the first gesture recognizer, processing the information that describes the input using the first gesture recognizer. In some embodiments, processing the input using the gesture recognition hierarchy further includes, in accordance with a determination that the information that describes the input is conveyed to the second gesture recognizer, processing the information that describes the input using the second gesture recognizer.

Alternatively, in some embodiments, the device conveys, at a first time, the information that describes the input from the component gesture recognizer to the first gesture recognizer but not the second gesture recognizer, and at a second time after the first time, in accordance with a determination that the first gesture recognizer has failed to recognize the input, the device conveys the information that describes the input from the component gesture recognizer to the second gesture recognizer. For example, as explained above with respect to operation 718 of method 700, some combiners convey the information that describes the input (e.g., one or more input events) to all of their child component gesture recognizers based on information conveyance rules for that combiner or combiner type. Other combiners convey the information to only some of their child component gesture recognizers, based on information conveyance rules for that combiner or combiner type, either by conveying information about a first input of multiple inputs only to a first child and information about a second input of the multiple inputs only to a second child, or by conveying information about one or more inputs to a second child only after the first child succeeds or otherwise has completed processing the information.

Conveying information from a combiner in a gesture recognition hierarchy to at least one of first and second gesture recognizers based on the relationship between the first and second gesture recognizers defined by the combiner reduces unnecessary processing of an input by gesture recognizers that are not currently relevant to the input. This reduces the computational load on the device, which improves device responsiveness and reduces latency, thereby enhancing the operability of the device and making the user-device interface more efficient (e.g., by helping the user to achieve an intended outcome and by reducing user mistakes when operating/interacting with the device).

In some embodiments, processing the information that describes the input using the first gesture recognizer determines (820) a current state of the first gesture recognizer, and processing the information that describes the input using the second gesture recognizer determines a current state of the second gesture recognizer. In some embodiments, the device conveys the current state of the first gesture recognizer from the first gesture recognizer to the component gesture recognizer; conveys the current state of the second gesture recognizer from the second gesture recognizer to the component gesture recognizer; and processes, using the component gesture recognizer, the information that describes the input, the current state of the first gesture recognizer, and the current state of the second gesture recognizer, to determine a current state of the component gesture recognizer. In some embodiments, different component gesture recognizers have different information processing rules, and thus how the states are processed to determine the current state is determined by the processing rules for the component gesture recognizer type of the component gesture recognizer. Examples of determining states of gesture recognizers based on states of component gesture recognizers are described herein with reference to FIGS. 5A-5Q. Determining the state of a component gesture recognizer that defines a relationship between two gesture recognizers based on the states of the gesture recognizers enables more complex input processing without increasing the amount of processing required at the gesture recognizers, which simplifies event handling and reduces the computational load on the device when processing inputs. This improves device responsiveness and reduces latency, thereby enhancing the operability of the device and making the user-device interface more efficient (e.g., by helping the user to achieve an intended outcome and by reducing user mistakes when operating/interacting with the device).

In some embodiments, the first view includes (822) a third gesture recognizer, and the gesture recognition hierarchy includes the third gesture recognizer and a component gesture recognizer that defines a third relationship between the first gesture recognizer and the third gesture recognizer in the gesture recognition hierarchy. In some embodiments, the device determines a gesture recognition state of the first view by performing a plurality of operations. In some embodiments, the operations include conveying information that describes the input to the component gesture recognizer, the first gesture recognizer, and the third gesture recognizer. In some embodiments, the operations include processing the information that describes the input using the first gesture recognizer to determine a current state of the first gesture recognizer, and conveying the current state of the first gesture recognizer from the first gesture recognizer to the component gesture recognizer. In some embodiments, the operations also include processing the information that describes the input using the third gesture recognizer to determine a current state of the third gesture recognizer, and conveying the current state of the third gesture recognizer from the third gesture recognizer to the component gesture recognizer. In some embodiments, the operations further include processing, using the component gesture recognizer, the information that describes the input, the current state of the first gesture recognizer, and the current state of the third gesture recognizer, to determine the gesture recognition state of the first view. For example, the gesture recognition state of hit view 612 in FIG. 6A is determined based on the (overall) processing results of gesture recognition hierarchy 640.

In some embodiments, if a view has only one gesture recognizer, then the (current) gesture recognition state of the view is the (current) gesture recognition state of the one gesture recognizer. In some embodiments, if a view has two or more gesture recognizers, then the two or more gesture recognizers are arranged in a gesture recognition hierarchy (e.g., a branch of a larger gesture recognition hierarchy that also includes gesture recognizers for other views) using one or more combiners that defines priority, or simultaneity, between the two or more gesture recognizers. In some embodiments, the gesture recognition state of the view is determined by the one or more combiners (e.g., by a combiner at a highest (root) node of the gesture recognition hierarchy for the view) based on the (current) states of the two or more gesture recognizers (e.g., a respective node determines its current state based on respective states of its child nodes in the gesture recognition hierarchy). For example, the gesture recognition state of view 606 in FIG. 6A is determined based on the processing results of simultaneous combiner 646 which defines the relationship between the two gesture recognizers, scroll gesture recognizer 608 and pinch gesture recognizer 610, of view 616.

Determining the gesture recognition state of a view based on the state of a component gesture recognizer that defines a relationship between two gesture recognizers in the view, where the state of the component gesture recognizer is in turn based on the states of the gesture recognizers, enables more complex input processing and improves the ability of the device to distinguish between different gestures without increasing the amount of processing required at the gesture recognizers. This simplifies event handling and reduces the computational load on the device when processing inputs, which in turn improves device responsiveness and reduces latency, thereby enhancing the operability of the device and making the user-device interface more efficient (e.g., by helping the user to achieve an intended outcome and by reducing user mistakes when operating/interacting with the device).

It should be understood that the particular order in which the operations in FIGS. 8A-8C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 800 described above with respect to FIGS. 8A-8C. For example, the inputs, states, values, user interfaces, component gesture recognizers, gesture recognizers, views, and view hierarchies described above with reference to method 800 optionally have one or more of the characteristics of the inputs, states, values, user interfaces, component gesture recognizers, gesture recognizers, views, and view hierarchies described herein with reference to other methods described herein (e.g., methods 700 and 900). For brevity, these details are not repeated here.

FIGS. 9A-9B are flow diagrams illustrating method 900 of processing inputs using gesture recognizers to which values of parameters that describe the inputs have been associated in accordance with some embodiments. Method 900 is performed at an electronic device (e.g., device 300, FIG. 3, or portable multifunction device 100, FIG. 1A) with an input device (e.g., touch screen 112, FIG. 1A, touchpad 355 or keyboard/mouse 350, FIG. 3), optionally a display (e.g., touch screen 112, FIG. 1A, or display 340, FIG. 3), and optionally one or more sensors to detect intensity of contacts with an input device that includes a touch-sensitive surface (e.g., contact intensity sensor(s) 165, FIG. 1A). In some embodiments, the display is a touch-screen display with a touch-sensitive surface on or integrated with the display. In some embodiments, the display is separate from the touch-sensitive surface. Some operations in method 900 are, optionally, combined and/or the order of some operations is, optionally, changed.

As described below, method 900 provides an intuitive way for an electronic device to monitor an input using a gesture recognition tree (sometimes called a gesture recognition hierarchy) in which multiple gesture recognizers are arranged. Transferring values of parameters that describe the input between gesture recognizers in the tree provides the gesture recognizers with information about the input that is needed for processing inputs without requiring each gesture recognizer to separately determine the information, which reduces the computational load on the device when processing inputs, thereby improving device responsiveness and reducing latency. Reducing latency in responding to inputs reduces user mistakes when operating/interacting with the device, such as duplicative or extraneous inputs made by the user while waiting for the device to respond to the user's earlier input(s). Reducing the number and/or extent of the inputs from a user enhances the operability of the device and makes the user-device interface more efficient, which, additionally, reduces power usage and improves battery life of the device by enabling the user to use the device more quickly and efficiently.

The device detects (902) an input via the input device (e.g., a touch input on the touch-sensitive surface).

In response to detecting the input, the device monitors (904) the input using a gesture recognition tree having a plurality of nodes (e.g., a gesture recognizer assembled from a plurality of component gesture recognizers) (e.g., any gesture recognizer or gesture recognition hierarchy described herein with reference to FIGS. 5A-5Q and 6A-6C). Each respective node of the gesture recognition tree corresponds (906) to a respective gesture recognizer (e.g., a gesture recognizer that includes a plurality of component gesture recognizers) or a respective component gesture recognizer (e.g., a combiner). In addition, one or more nodes include (e.g., store) one or more parameters that describe the input (e.g., location of initial detection of the input, current location, distance traveled (determined based on current location and initial location), velocity, contact intensity, initial timestamp (e.g., when the input was first detected), current timestamp).

Monitoring the input using the gesture recognition tree includes (908): processing the input using a first node of the plurality of nodes, including determining a value of a first parameter of the one or more parameters; conveying the first parameter from the first node to a second node of the plurality of nodes; and processing the input using the second node, including determining, based on the first parameter, whether the input satisfies a gesture recognition requirement defined by the second node. In some embodiments, the gesture recognition requirement defined by the second node is one of a set of gesture recognition criteria defined by the gesture recognition tree (e.g., a gesture recognizer). An example of processing inputs to determine values of parameters that describe the inputs and conveying the values to other nodes for further processing of the inputs is described herein with reference to FIGS. 5M-5Q.

In some embodiments, the one or more parameters that describe the input include (910) one or more of: a location at which the input was initially detected, a current location of the input, a distance traveled by the input (e.g., by a contact across a touch-sensitive surface), a velocity of the input (e.g., an instantaneous velocity, whether detected outright or derived from location and time information), a contact intensity (e.g., of a touch input), an initial timestamp corresponding to a time at which the input was first detected, and a current timestamp. For example, FIGS. 5M-5Q illustrate examples of conveyed parameters that include current timestamp, current velocity, initial location, and current location.

In some embodiments, the first parameter is (912) a location of the input, and the gesture recognition requirement defined by the second node requires that a distance between an initial location of the input and a current location of the input satisfy a threshold distance. In some embodiments, the threshold distance is satisfied when the distance between the initial location and the current location exceeds a threshold distance (e.g., the input must move at least a minimum distance in order for the gesture recognition requirement defined by the second node to be satisfied, and for a gesture associated with the second node to be recognized). In some embodiments, the threshold distance is satisfied when the distance between the initial location and the current location is within a threshold distance (e.g., the input must not move more than a maximum distance in order for the gesture recognition requirement defined by the second node to be satisfied, and for a gesture associated with the second node to be recognized). In some embodiments, processing the input using the first node includes determining, using the first node, the current location of the input. In some embodiments, processing the input using the second node includes determining, using the second node, whether the distance between the initial location of the input (e.g., stored by the second node) and the current location of the input conveyed from the first node satisfies the threshold distance.

In some embodiments, the first parameter is (914) a timestamp corresponding to a respective point in time at which the input is detected, and the gesture recognition requirement defined by the second node requires that an amount of time between an initial timestamp corresponding to a first point in time at which the input was first detected and a current timestamp corresponding to a second point in time at which the input is detected satisfy a threshold amount of time. In some embodiments, the threshold amount of time is satisfied when the amount of time between the initial timestamp and the current timestamp exceeds a threshold amount of time (e.g., the input must continue to be detected (e.g., remain on the touch-sensitive surface, for a touch input) for at least a minimum amount of time in order for the gesture recognition requirement defined by the second node to be satisfied, and for a gesture associated with the second node to be recognized). In some embodiments, the threshold amount of time is satisfied when the amount of time between the initial timestamp and the current timestamp is within a threshold amount of time (e.g., the input must not continue to be detected (e.g., remain on the touch-sensitive surface) for more than a maximum amount of time in order for the gesture recognition requirement defined by the second node to be satisfied, and for a gesture associated with the second node to be recognized). In some embodiments, processing the input using the first node includes determining, using the first node, the current timestamp corresponding to the second point in time at which the input is detected. In some embodiments, processing the input using the second node includes determining, using the second node, whether the amount of time between the initial timestamp of the input (e.g., stored by the second node) and the current timestamp of the input conveyed from the first node satisfies the threshold amount of time.

In some embodiments, the device processes (916) the input using one or more of the plurality of nodes in the gesture recognition tree to determine values of the one or more parameters without regard to whether a gesture has been recognized by the gesture recognition tree (e.g., as described herein with reference to FIG. 5N, which illustrates the states and values of pinch gesture recognizer 530 before a pinch gesture has been recognized). In some embodiments, values of the one or more parameters are determined prior to recognition of a gesture by the gesture recognition tree. For example, the values are determined even when a state of the gesture recognizer tree (e.g., an overall state determined based on respective states of the nodes in the gesture recognition tree, as described above with reference to method 700) is a state other than a gesture recognition state (e.g., a predefined "possible" state, which indicates that a particular gesture to be recognized by the gesture recognizer is possible). Determining values of parameters that describe an input while processing the input, without regard to whether a gesture has been recognized, reduces delay in processing the input and helps the device recognize gestures more quickly. Improving responsiveness of the device enhances the operability of the device and makes the user-device interface more efficient (e.g., by helping the user to achieve an intended outcome more quickly and by reducing user mistakes when operating/interacting with the device).

In some embodiments, in response to detecting the input, the device receives (918), at the gesture recognition tree, first information that describes the input, where the value of the first parameter is determined from the first information, and where determining whether the input satisfies the gesture recognition requirement defined by the second node includes comparing the value of the first parameter to a prior value determined from second information received at the gesture recognition tree prior to receiving the first information (e.g., as described herein with reference to FIGS. 5M-5Q, pinch gesture recognizer 530 compares current locations of respective inputs to initial locations to determine whether the inputs satisfy pinch gesture requirements). Determining whether an input satisfies a particular gesture recognition requirement by comparing a current value of a parameter that describes the input to a previous (e.g., initial) value of the parameter provides an efficient way to monitor the input over time, which reduces the computational load on the device when processing inputs. This improves device responsiveness and reduces latency, thereby enhancing the operability of the device and making the user-device interface more efficient (e.g., by helping the user to achieve an intended outcome and by reducing user mistakes when operating/interacting with the device).

It should be understood that the particular order in which the operations in FIGS. 9A-9B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 900 described above with respect to FIGS. 9A-9B. For example, the inputs, states, values, user interfaces, component gesture recognizers, gesture recognizers, views, and view hierarchies described above with reference to method 900 optionally have one or more of the characteristics of the inputs, states, values, user interfaces, component gesture recognizers, gesture recognizers, views, and view hierarchies described herein with reference to other methods described herein (e.g., methods 700 and 800). For brevity, these details are not repeated here.

The operations described above with reference to FIGS. 7A-7E, 8A-8C, and 9A-9B are, optionally, implemented by components depicted in FIGS. 1A-1B. For example, detection operations 702, 806, 902, monitoring operations 704, 904, recognizing operations 708, and processing operation 806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 one or more component event recognizers 181 to compare the event information to respective event definitions 184, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with an input device:
   detecting an input via the input device;
   in response to detecting the input, monitoring the input using a gesture recognizer, wherein the gesture recognizer includes a plurality of component gesture recognizers that define requirements for recognition of a gesture, wherein a first component gesture recognizer from the plurality of component gesture recognizers defines a first requirement for recognition of the gesture, and a second component gesture recognizer from the plurality of component gesture recognizers defines a second requirement for recognition of the gesture; and
   in accordance with a determination that the input satisfies first gesture recognition criteria that include the first requirement of the first component gesture recognizer and the second requirement of the second component gesture recognizer, recognizing a first gesture using the gesture recognizer.

2. The method of claim 1, wherein:
   the first component gesture recognizer has a current state of a plurality of available states; and
   the second component gesture recognizer has a current state of the plurality of available states.

3. The method of claim 2, including determining a current state of the gesture recognizer based on the current state of the first component gesture recognizer and the current state of the second component gesture recognizer.

4. The method of claim 2, wherein monitoring the input using the gesture recognizer includes:
   receiving, at the gesture recognizer, first information that describes the input at a first point in time;

processing the first information using the first component gesture recognizer to determine a current state of the first component gesture recognizer, of the plurality of available states, for the first point in time;

processing the first information using the second component gesture recognizer to determine a current state of the second component gesture recognizer, of the plurality of available states, for the first point in time;

receiving, at the gesture recognizer, second information that describes a change in the input at a second point in time later than the first point in time;

processing the second information using the first component gesture recognizer to determine a current state of the first component gesture recognizer, of the plurality of available states, for the second point in time; and processing the second information using the second component gesture recognizer to determine a current state of the second component gesture recognizer, of the plurality of available states, for the second point in time.

5. The method of claim 1, wherein one or more component gesture recognizers in the gesture recognizer include one or more parameters that describe the input; and monitoring the input using the gesture recognizer includes determining values of the one or more parameters using the one or more component gesture recognizers in the gesture recognizer.

6. The method of claim 1, wherein the gesture recognizer is a gesture recognition tree having a plurality of nodes, wherein each node of the gesture recognition tree includes a respective component gesture recognizer, and wherein monitoring the input using the gesture recognizer includes:

conveying information that describes the input at a respective point in time from component gesture recognizers at respective nodes having child nodes in the gesture recognition tree to component gesture recognizers at the child nodes in the gesture recognition tree; and determining states of component gesture recognizers at respective nodes in the gesture recognition tree based on the information that describes the input at the respective point in time and, in accordance with a determination that a respective node has one or more child nodes, based on respective states of respective component gesture recognizers at the one or more child nodes determined based on the information that describes the input at the respective point in time.

7. The method of claim 6, wherein monitoring the input using the gesture recognizer further includes:

conveying the determined states of the component gesture recognizers at child nodes in the gesture recognition tree to component gesture recognizers at parent nodes of the child nodes in the gesture recognition tree;

wherein determining whether the input satisfies the first gesture recognition criteria for recognizing the first gesture includes determining a state of the gesture recognition tree based on the determined states of the component gesture recognizers in the gesture recognition tree.

8. The method of claim 6, wherein monitoring the input using the gesture recognizer includes:

determining values of one or more component gesture recognizers at respective nodes in the gesture recognition tree based on the information that describes the input at the respective point in time wherein determining a state of a respective component gesture recognizer at a respective node is further based on a determined value of a component gesture recognizer at a child node of the respective node, in accordance with a determination that the component gesture recognizer at the child node has a determined value.

9. The method of claim 1, wherein the plurality of component gesture recognizers in the gesture recognizer are selected from a plurality of available component gesture recognizers that include:

combiners that combine information from two or more component gesture recognizers and define requirements for recognition of a gesture based on relationships between the component gesture recognizers combined using the combiners; and input parameter recognizers that determine values of parameters that describe the input and/or define threshold requirements for parameters that describe the input.

10. The method of claim 1, wherein the gesture recognizer is associated with an application, and the plurality of component gesture recognizers in the gesture recognizer are instances of respective component gesture recognizers in a plurality of available component gesture recognizers provided by an application-independent module.

11. The method of claim 1, wherein:

the gesture recognizer includes a third component gesture recognizer that defines a third requirement for recognition of a gesture based on a relationship between the first component gesture recognizer and the second component gesture recognizer;

monitoring the input using the gesture recognizer includes monitoring a state of the first component gesture recognizer and a state of the second component gesture recognizer using the third component gesture recognizer to determine whether the first component gesture recognizer and the second component gesture recognizer satisfy the third requirement; and the first gesture recognition criteria include the third requirement that is based on the relationship between the first component gesture recognizer and the second component gesture recognizer.

12. The method of claim 11, wherein the third component gesture recognizer is an exclusive combiner, and the third requirement specifies that the first component gesture recognizer must fail in order for the second component gesture recognizer to succeed.

13. The method of claim 11, wherein the third component gesture recognizer is a simultaneous combiner, and the third requirement requires, at a respective point in time, success of at least one of the first component gesture recognizer and the second component gesture recognizer in order for the third component gesture recognizer to succeed.

14. The method of claim 11, wherein the third component gesture recognizer is a sequential combiner, and the third requirement requires, in order for the third component gesture recognizer to succeed, success of the first component gesture recognizer and, after the first component gesture recognizer succeeds, success of the second component gesture recognizer.

15. The method of claim 1, wherein the first requirement of the first component gesture recognizer requires that values of a parameter that describes the input satisfy a specified threshold.

16. The method of claim 1, wherein the gesture recognizer is a tap gesture recognizer, wherein:

the first component gesture recognizer is a distance component gesture recognizer that stores an initial location of the input corresponding to a point in time when the input was first detected and receives a current location of the input at a respective point in time, wherein the first requirement defined by the first component gesture recognizer requires that a distance between the initial location of the input and the current location of the input be within a threshold distance; and the second component gesture recognizer is a duration component gesture recognizer that stores an initial timestamp corresponding to the point in time when the input was first detected and receives a current timestamp corresponding to the respective point in time, wherein the second requirement defined by the second component gesture recognizer requires that an amount of time between the initial timestamp and the current timestamp be within a threshold amount of time;

wherein the tap gesture recognizer further includes:
- a location component gesture recognizer that determines that the input has a current location at the respective point in time;
- a first gating combiner that requires success of the second component gesture recognizer and success of the location component gesture recognizer in order to succeed; and
- a second gating combiner that requires success of the first gating combiner and success of the first component gesture recognizer in order to succeed.

17. An electronic device, comprising:
an input device;
one or more processors; and
memory storing one or more programs, wherein the one or more programs are configured to be executed by the one or more processors, the one or more programs including instructions for:
detecting an input via the input device;
in response to detecting the input, monitoring the input using a gesture recognizer, wherein the gesture recognizer includes a plurality of component gesture recognizers that define requirements for recognition of a gesture, wherein a first component gesture recognizer from the plurality of component gesture recognizers defines a first requirement for recognition of the gesture, and a second component gesture recognizer from the plurality of component gesture recognizers defines a second requirement for recognition of the gesture; and
in accordance with a determination that the input satisfies first gesture recognition criteria that include the first requirement of the first component gesture recognizer and the second requirement of the second component gesture recognizer, recognizing a first gesture using the gesture recognizer.

18. The electronic device of claim 17, wherein:
the first component gesture recognizer has a current state of a plurality of available states; and
the second component gesture recognizer has a current state of the plurality of available states.

19. The electronic device of claim 18, wherein the one or more programs include instructions for determining a current state of the gesture recognizer based on the current state of the first component gesture recognizer and the current state of the second component gesture recognizer.

20. The electronic device of claim 18, wherein monitoring the input using the gesture recognizer includes:
receiving, at the gesture recognizer, first information that describes the input at a first point in time;
processing the first information using the first component gesture recognizer to determine a current state of the first component gesture recognizer, of the plurality of available states, for the first point in time;
processing the first information using the second component gesture recognizer to determine a current state of the second component gesture recognizer, of the plurality of available states, for the first point in time;
receiving, at the gesture recognizer, second information that describes a change in the input at a second point in time later than the first point in time;
processing the second information using the first component gesture recognizer to determine a current state of the first component gesture recognizer, of the plurality of available states, for the second point in time; and
processing the second information using the second component gesture recognizer to determine a current state of the second component gesture recognizer, of the plurality of available states, for the second point in time.

21. The electronic device of claim 17, wherein one or more component gesture recognizers in the gesture recognizer include one or more parameters that describe the input; and
monitoring the input using the gesture recognizer includes determining values of the one or more parameters using the one or more component gesture recognizers in the gesture recognizer.

22. The electronic device of claim 17, wherein the gesture recognizer is a gesture recognition tree having a plurality of nodes, wherein each node of the gesture recognition tree includes a respective component gesture recognizer, and wherein monitoring the input using the gesture recognizer includes:
conveying information that describes the input at a respective point in time from component gesture recognizers at respective nodes having child nodes in the gesture recognition tree to component gesture recognizers at the child nodes in the gesture recognition tree; and
determining states of component gesture recognizers at respective nodes in the gesture recognition tree based on the information that describes the input at the respective point in time and, in accordance with a determination that a respective node has one or more child nodes, based on respective states of respective component gesture recognizers at the one or more child nodes determined based on the information that describes the input at the respective point in time.

23. The electronic device of claim 22, wherein monitoring the input using the gesture recognizer further includes:
conveying the determined states of the component gesture recognizers at child nodes in the gesture recognition tree to component gesture recognizers at parent nodes of the child nodes in the gesture recognition tree;
wherein determining whether the input satisfies the first gesture recognition criteria for recognizing the first gesture includes determining a state of the gesture recognition tree based on the determined states of the component gesture recognizers in the gesture recognition tree.

24. The electronic device of claim 22, wherein monitoring the input using the gesture recognizer includes:
determining values of one or more component gesture recognizers at respective nodes in the gesture recognition tree based on the information that describes the input at the respective point in time
wherein determining a state of a respective component gesture recognizer at a respective node is further based on a determined value of a component gesture recognizer at a child node of the respective node, in accordance with a determination that the component gesture recognizer at the child node has a determined value.

25. The electronic device of claim 17, wherein the plurality of component gesture recognizers in the gesture recognizer are selected from a plurality of available component gesture recognizers that include:
   combiners that combine information from two or more component gesture recognizers and define requirements for recognition of a gesture based on relationships between the component gesture recognizers combined using the combiners; and
   input parameter recognizers that determine values of parameters that describe the input and/or define threshold requirements for parameters that describe the input.

26. The electronic device of claim 17, wherein the gesture recognizer is associated with an application, and the plurality of component gesture recognizers in the gesture recognizer are instances of respective component gesture recognizers in a plurality of available component gesture recognizers provided by an application-independent module.

27. The electronic device of claim 17, wherein:
   the gesture recognizer includes a third component gesture recognizer that defines a third requirement for recognition of a gesture based on a relationship between the first component gesture recognizer and the second component gesture recognizer;
   monitoring the input using the gesture recognizer includes monitoring a state of the first component gesture recognizer and a state of the second component gesture recognizer using the third component gesture recognizer to determine whether the first component gesture recognizer and the second component gesture recognizer satisfy the third requirement; and
   the first gesture recognition criteria include the third requirement that is based on the relationship between the first component gesture recognizer and the second component gesture recognizer.

28. The electronic device of claim 27, wherein the third component gesture recognizer is an exclusive combiner, and the third requirement specifies that the first component gesture recognizer must fail in order for the second component gesture recognizer to succeed.

29. The electronic device of claim 27, wherein the third component gesture recognizer is a simultaneous combiner, and the third requirement requires, at a respective point in time, success of at least one of the first component gesture recognizer and the second component gesture recognizer in order for the third component gesture recognizer to succeed.

30. The electronic device of claim 27, wherein the third component gesture recognizer is a sequential combiner, and the third requirement requires, in order for the third component gesture recognizer to succeed, success of the first component gesture recognizer and, after the first component gesture recognizer succeeds, success of the second component gesture recognizer.

31. The electronic device of claim 17, wherein the first requirement of the first component gesture recognizer requires that values of a parameter that describes the input satisfy a specified threshold.

32. The electronic device of claim 17, wherein the gesture recognizer is a tap gesture recognizer, wherein:
   the first component gesture recognizer is a distance component gesture recognizer that stores an initial location of the input corresponding to a point in time when the input was first detected and receives a current location of the input at a respective point in time, wherein the first requirement defined by the first component gesture recognizer requires that a distance between the initial location of the input and the current location of the input be within a threshold distance; and
   the second component gesture recognizer is a duration component gesture recognizer that stores an initial timestamp corresponding to the point in time when the input was first detected and receives a current timestamp corresponding to the respective point in time, wherein the second requirement defined by the second component gesture recognizer requires that an amount of time between the initial timestamp and the current timestamp be within a threshold amount of time;
   wherein the tap gesture recognizer further includes:
      a location component gesture recognizer that determines that the input has a current location at the respective point in time;
      a first gating combiner that requires success of the second component gesture recognizer and success of the location component gesture recognizer in order to succeed; and
      a second gating combiner that requires success of the first gating combiner and success of the first component gesture recognizer in order to succeed.

33. A non-transitory computer readable storage medium storing one or more programs, the one or more programs comprising instructions that, when executed by an electronic device with an input device, cause the electronic device to:
   detect an input via the input device;
   in response to detecting the input, monitor the input using a gesture recognizer, wherein the gesture recognizer includes a plurality of component gesture recognizers that define requirements for recognition of a gesture, wherein a first component gesture recognizer from the plurality of component gesture recognizers defines a first requirement for recognition of the gesture, and a second component gesture recognizer from the plurality of component gesture recognizers defines a second requirement for recognition of the gesture; and
   in accordance with a determination that the input satisfies first gesture recognition criteria that include the first requirement of the first component gesture recognizer and the second requirement of the second component gesture recognizer, recognize a first gesture using the gesture recognizer.

34. The non-transitory computer readable storage medium of claim 33, wherein:
   the first component gesture recognizer has a current state of a plurality of available states; and
   the second component gesture recognizer has a current state of the plurality of available states.

35. The non-transitory computer readable storage medium of claim 34, wherein the one or more programs include instructions that, when executed by the electronic device, cause the electronic device to determine a current state of the gesture recognizer based on the current state of the first component gesture recognizer and the current state of the second component gesture recognizer.

36. The non-transitory computer readable storage medium of claim 34, wherein monitoring the input using the gesture recognizer includes:
   receiving, at the gesture recognizer, first information that describes the input at a first point in time;
   processing the first information using the first component gesture recognizer to determine a current state of the first component gesture recognizer, of the plurality of available states, for the first point in time;
processing the first information using the second component gesture recognizer to determine a current state of the second component gesture recognizer, of the plurality of available states, for the first point in time;
receiving, at the gesture recognizer, second information that describes a change in the input at a second point in time later than the first point in time;
processing the second information using the first component gesture recognizer to determine a current state of the first component gesture recognizer, of the plurality of available states, for the second point in time; and
processing the second information using the second component gesture recognizer to determine a current state of the second component gesture recognizer, of the plurality of available states, for the second point in time.

37. The non-transitory computer readable storage medium of claim 33, wherein one or more component gesture recognizers in the gesture recognizer include one or more parameters that describe the input; and monitoring the input using the gesture recognizer includes determining values of the one or more parameters using the one or more component gesture recognizers in the gesture recognizer.

38. The non-transitory computer readable storage medium of claim 33, wherein the gesture recognizer is a gesture recognition tree having a plurality of nodes, wherein each node of the gesture recognition tree includes a respective component gesture recognizer, and wherein monitoring the input using the gesture recognizer includes:
conveying information that describes the input at a respective point in time from component gesture recognizers at respective nodes having child nodes in the gesture recognition tree to component gesture recognizers at the child nodes in the gesture recognition tree; and
determining states of component gesture recognizers at respective nodes in the gesture recognition tree based on the information that describes the input at the respective point in time and, in accordance with a determination that a respective node has one or more child nodes, based on respective states of respective component gesture recognizers at the one or more child nodes determined based on the information that describes the input at the respective point in time.

39. The non-transitory computer readable storage medium of claim 38, wherein monitoring the input using the gesture recognizer further includes:
conveying the determined states of the component gesture recognizers at child nodes in the gesture recognition tree to component gesture recognizers at parent nodes of the child nodes in the gesture recognition tree;
wherein determining whether the input satisfies the first gesture recognition criteria for recognizing the first gesture includes determining a state of the gesture recognition tree based on the determined states of the component gesture recognizers in the gesture recognition tree.

40. The non-transitory computer readable storage medium of claim 38, wherein monitoring the input using the gesture recognizer includes:
determining values of one or more component gesture recognizers at respective nodes in the gesture recognition tree based on the information that describes the input at the respective point in time wherein determining a state of a respective component gesture recognizer at a respective node is further based on a determined value of a component gesture recognizer at a child node of the respective node, in accordance with a determination that the component gesture recognizer at the child node has a determined value.

41. The non-transitory computer readable storage medium of claim 33, wherein the plurality of component gesture recognizers in the gesture recognizer are selected from a plurality of available component gesture recognizers that include:
combiners that combine information from two or more component gesture recognizers and define requirements for recognition of a gesture based on relationships between the component gesture recognizers combined using the combiners; and
input parameter recognizers that determine values of parameters that describe the input and/or define threshold requirements for parameters that describe the input.

42. The non-transitory computer readable storage medium of claim 33, wherein the gesture recognizer is associated with an application, and the plurality of component gesture recognizers in the gesture recognizer are instances of respective component gesture recognizers in a plurality of available component gesture recognizers provided by an application-independent module.

43. The non-transitory computer readable storage medium of claim 33, wherein:
the gesture recognizer includes a third component gesture recognizer that defines a third requirement for recognition of a gesture based on a relationship between the first component gesture recognizer and the second component gesture recognizer;
monitoring the input using the gesture recognizer includes monitoring a state of the first component gesture recognizer and a state of the second component gesture recognizer using the third component gesture recognizer to determine whether the first component gesture recognizer and the second component gesture recognizer satisfy the third requirement; and
the first gesture recognition criteria include the third requirement that is based on the relationship between the first component gesture recognizer and the second component gesture recognizer.

44. The non-transitory computer readable storage medium of claim 43, wherein the third component gesture recognizer is an exclusive combiner, and the third requirement specifies that the first component gesture recognizer must fail in order for the second component gesture recognizer to succeed.

45. The non-transitory computer readable storage medium of claim 43, wherein the third component gesture recognizer is a simultaneous combiner, and the third requirement requires, at a respective point in time, success of at least one of the first component gesture recognizer and the second component gesture recognizer in order for the third component gesture recognizer to succeed.

46. The non-transitory computer readable storage medium of claim 43, wherein the third component gesture recognizer is a sequential combiner, and the third requirement requires, in order for the third component gesture recognizer to succeed, success of the first component gesture recognizer and, after the first component gesture recognizer succeeds, success of the second component gesture recognizer.

47. The non-transitory computer readable storage medium of claim 33, wherein the first requirement of the first component gesture recognizer requires that values of a parameter that describes the input satisfy a specified threshold.

48. The non-transitory computer readable storage medium of claim 33, wherein the gesture recognizer is a tap gesture recognizer, wherein:
- the first component gesture recognizer is a distance component gesture recognizer that stores an initial location of the input corresponding to a point in time when the input was first detected and receives a current location of the input at a respective point in time, wherein the first requirement defined by the first component gesture recognizer requires that a distance between the initial location of the input and the current location of the input be within a threshold distance; and
- the second component gesture recognizer is a duration component gesture recognizer that stores an initial timestamp corresponding to the point in time when the input was first detected and receives a current timestamp corresponding to the respective point in time, wherein the second requirement defined by the second component gesture recognizer requires that an amount of time between the initial timestamp and the current timestamp be within a threshold amount of time;

wherein the tap gesture recognizer further includes:
- a location component gesture recognizer that determines that the input has a current location at the respective point in time;
- a first gating combiner that requires success of the second component gesture recognizer and success of the location component gesture recognizer in order to succeed; and
- a second gating combiner that requires success of the first gating combiner and success of the first component gesture recognizer in order to succeed.

* * * * *